US012668545B2

(12) United States Patent (10) Patent No.: US 12,668,545 B2

Mitra et al. (45) Date of Patent: Jun. 30, 2026

(54) GLASS CERAMIC HAVING SPECIFIC THERMAL EXPANSION CHARACTERISTICS

(71) Applicant: SCHOTT AG, Mainz (DE)

(72) Inventors: Ina Mitra, Stadecken-Elsheim (DE);
Olaf Claußen, Undenheim (DE);
Clemens Kunisch, Armsheim (DE);
Antoine Carré, Mainz (DE)

(73) Assignee: SCHOTT AG, Mainz (DE)

( * ) Notice: Subject to any disclaimer, the term of this patent is extended or adjusted under 35 U.S.C. 154(b) by 911 days.

(21) Appl. No.: 17/654,822

(22) Filed: Mar. 15, 2022

(65) Prior Publication Data

US 2022/0298062 A1 Sep. 22, 2022

(30) Foreign Application Priority Data

Mar. 16, 2021 (DE) .......................... 102021106419.8
Dec. 22, 2021 (DE) .......................... 102021134308.9

(51) Int. Cl.

| | |
|---|---|
| *C03C 10/00* | (2006.01) |
| *C03B 27/012* | (2006.01) |
| *C04B 35/14* | (2006.01) |
| *C04B 41/85* | (2006.01) |
| *C04B 111/32* | (2006.01) |

(52) U.S. Cl.

CPC ............ *C04B 35/14* (2013.01); *C03B 27/012* (2013.01); *C03C 10/0027* (2013.01); *C04B 41/85* (2013.01); *C03C 2203/10* (2013.01); *C03C 2203/52* (2013.01); *C03C 2214/20* (2013.01); *C04B 2111/32* (2013.01); *C04B*

*2235/3418* (2013.01); *C04B 2235/80* (2013.01); *C04B 2235/9607* (2013.01)

(58) Field of Classification Search

CPC ................. C04B 35/14; C04B 2111/32; C04B 2235/9607; C03B 27/012; C03C 10/0027; C03C 2214/20

See application file for complete search history.

(56) References Cited

U.S. PATENT DOCUMENTS

| | | | |
|---|---|---|---|
| 4,851,372 | A | 7/1989 | Lindig et al. |
| 5,591,682 | A | 1/1997 | Goto |
| 6,698,244 | B1 | 3/2004 | Römer et al. |
| 7,226,881 | B2 | 6/2007 | Goto |
| 7,645,714 | B2 | 1/2010 | Kawashima et al. |
| 8,043,985 | B2 | 10/2011 | Yagi et al. |
| 10,961,146 | B2 | 3/2021 | Eurokera |
| 2002/0023463 | A1 | 2/2002 | Siebers et al. |
| 2002/0026932 | A1 | 3/2002 | Mitra et al. |

(Continued)

FOREIGN PATENT DOCUMENTS

| | | |
|---|---|---|
| CN | 107667076 A | 2/2018 |
| CN | 110958992 A | 4/2020 |

(Continued)

OTHER PUBLICATIONS

Raw materials and production technology of flat glass_CN.

(Continued)

*Primary Examiner* — Cameron K Miller

(57) ABSTRACT

The present invention relates to a glass ceramic having improved thermal expansion characteristics and to the use thereof in a precision component.

22 Claims, 16 Drawing Sheets

Thermal expansion hysteresis between 50°C and -10°C of sample 1, 2 and 3
(cooling to -10°C; dwelltime 300 min at -10°C; heating to 50°C)

(56)                References Cited

U.S. PATENT DOCUMENTS

| | | |
|---|---|---|
| 2002/0183187 A1 | 12/2002 | Siebers et al. |
| 2004/0079518 A1 | 4/2004 | del Puerto et al. |
| 2005/0197242 A1 | 9/2005 | Mitra et al. |
| 2011/0098171 A1 | 4/2011 | Pedeboscq et al. |
| 2011/0207591 A1 | 8/2011 | Schreder et al. |
| 2012/0026474 A1 | 2/2012 | Nayfeh |
| 2015/0241796 A1 | 8/2015 | Ebert, Jr. et al. |
| 2017/0023502 A1 | 1/2017 | Engel et al. |
| 2018/0339933 A1 | 11/2018 | Mitra et al. |
| 2019/0194054 A1* | 6/2019 | Siebers .................. C03C 3/087 |
| 2019/0194062 A1 | 6/2019 | Wolfinger et al. |
| 2020/0207660 A1 | 7/2020 | Li et al. |
| 2022/0298062 A1 | 9/2022 | Mitra et al. |
| 2024/0092687 A1 | 3/2024 | Mitra et al. |

FOREIGN PATENT DOCUMENTS

| | | |
|---|---|---|
| DE | 19939771 A1 | 2/2001 |
| DE | 102004008824 B4 | 9/2005 |
| DE | 102010002188 A1 | 8/2011 |
| DE | 102015113548 A1 | 1/2017 |
| DE | 102018111144 A1 | 11/2018 |
| DE | 102018111330 A1 | 6/2019 |
| EP | 0587979 A1 | 3/1994 |
| EP | 1146018 A1 | 10/2001 |
| EP | 1291328 A2 | 3/2003 |
| EP | 1411391 A2 | 1/2004 |
| JP | 52-48129 A | 12/1977 |
| JP | 2002179437 A | 6/2002 |
| JP | 2002326837 A2 | 11/2002 |
| JP | 2007-197310 A | 8/2007 |
| WO | 2015124710 A1 | 8/2015 |

OTHER PUBLICATIONS

Raw materials and production technology of flat glass_EN machine translation.

Semi P37-1109—Specifictation for Extreme Ultraviolet Lithography Substrates and Blanks.

Din ISO 7884-1 Viskosität und viskosimetrische Festpunkte.

SPIE 7739—Proceedings of SPIE—Modeling of the thermal expansion behaviour of ZERODUR at arbitrary temperature profiles—Ralf Jedamzik et al. (Jul. 19, 2010).

Applied Optics—vol. 35, No. 10—Dimensional stability tests over time and temperature for several low-expansion glass ceramics—David B. Hall (Apr. 1, 1996).

Applied Optics—vol. 24, No. 20—Termal expansion and lenght stability of Zerodur in dependence on temperature and time—Otto Lindig und Wolfgang Pannhorst (Oct. 15, 1985).

Applied Optics—vol. 28, No. 19—R. Haug et al. (Oct. 1, 1989) p. 4052-4054.

ASTM C 1259 (2021).

* cited by examiner a   Sintered ceramic
b   Ti-doped SiO₂
c   Glass ceramic (prior art)
d   Glass ceramic (prior art)
e   Comparative ex.

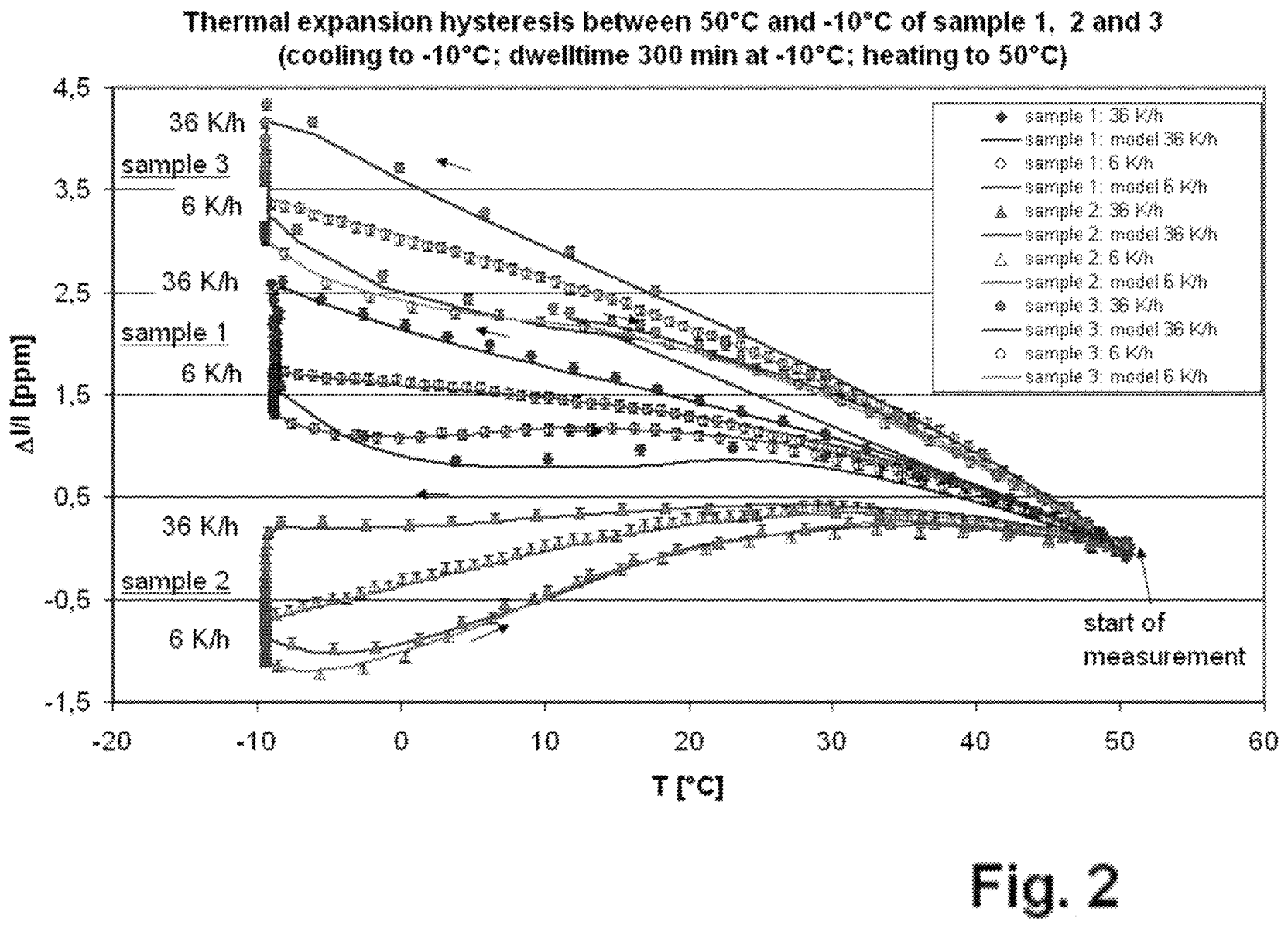

Thermal expansion hysteresis between 50°C and -10°C of sample 1, 2 and 3
(cooling to -10°C; dwelltime 300 min at -10°C; heating to 50°C)

sample 1: 36 K/h
sample 1: model 36 K/h
sample 1: 6 K/h
sample 1: model 6 K/h
sample 2: 36 K/h
sample 2: model 36 K/h
sample 2: 6 K/h
sample 2: model 6 K/h
sample 3: 36 K/h
sample 3: model 36 K/h
sample 3: 6 K/h
sample 3: model 6 K/h start of
measurement 36 K/h
sample 3
6 K/h 36 K/h
sample 1
6 K/h 36 K/h
sample 2
6 K/h

T [°C]

Δl/l [ppm]

Fig. 2

Comp. Ex. 7

Comp. Ex. 10

Comp. Ex. 9

Comp. Ex. 8

GLASS CERAMIC HAVING SPECIFIC THERMAL EXPANSION CHARACTERISTICS

The present invention relates to a glass ceramic having specific thermal expansion characteristics and simultaneously good meltability, and more environmentally friendly refining, shaping and ceramizability, and to the use of the glass ceramic according to the invention in a precision component.

BACKGROUND OF THE INVENTION

Materials and precision components having low thermal expansion or low CTE (coefficient of thermal expansion) are already known in the prior art.

Known materials for precision components having low thermal expansion in the temperature range around room temperature are ceramics, Ti-doped quartz glass and glass ceramics. Glass ceramics having low thermal expansion are especially lithium aluminium silicate glass ceramics (LAS glass ceramics), which are described, for example, in U.S. Pat. Nos. 4,851,372, 5,591,682, EP 587979 A, U.S. Pat. Nos. 7,226,881, 7,645,714, DE 102004008824 A, DE 102018111144 A. Further materials for precision components are cordierite ceramics or cordierite glass ceramics.

Such materials are frequently used for precision components that have to fulfil particularly strict demands in relation to their properties (for example mechanical, physical, optical properties). They are used especially in terrestrial and space-based astronomy and observation of the Earth, LCD lithography, microlithography and EUV lithography, metrology, spectroscopy and measurement technology. It is a particular requirement here for the components, according to the specific application, to have extremely low thermal expansion.

In general, the thermal expansion of a material is determined by a static method in which the length of a test specimen is determined at the start and at the end of the specific temperature interval, and the difference in length is used to calculate the average coefficient of expansion a or CTE (coefficient of thermal expansion). The CTE is then reported as the average for this temperature interval, for example for the temperature interval from 0° C. to 50° C., as CTE(0; 50) or $\alpha$(0; 50).

In order to meet the constantly growing demands, materials having a CTE better matched to the field of use of a component formed from the material have been developed. For example, the average CTE can be optimized not just for the standard temperature interval CTE(0; 50), but also, for example, for a temperature interval around the actual application temperature, for example the interval from 19° C. to 25° C., i.e. CTE(19; 25), for particular lithography applications. As well as the determination of the average CTE, it is possible to determine the thermal expansion of a test specimen in very small temperature intervals as well, and hence to represent them as a CTE-T curve. Such a CTE-T curve can preferably have a zero crossing at one or more temperatures, preferably at or close to the planned application temperature. At a zero crossing of the CTE-T curve, the relative change in length with changing temperature is particularly small. In the case of some glass ceramics, such a zero crossing of the CTE-T curve can be shifted to the application temperature of the component by suitable thermal treatment. As well as the absolute CTE value, the slope of the CTE-T curve around the application temperature should be as low as possible in order to bring about a lowest possible change in length of the component in the event of slight temperature changes. The above-described optimizations of the CTE or of thermal expansion, in the case of these specific zero-expansion glass ceramics, are generally effected with unchanged composition by variation of the ceramization conditions.

An adverse effect in the case of the known precision components and materials, especially in the case of glass ceramics such as LAS glass ceramics, is "thermal hysteresis", called "hysteresis" hereinafter for short. What is meant here by hysteresis is that the change in length of a test specimen in the case of heating at a constant heating rate differs from the change in length of the test specimen in the case of subsequent cooling at a constant cooling rate, even though the absolute value of cooling rate and heating rate is the same. If the change in length is presented as a graph as a function of the temperature for heating and cooling, the result is a classic hysteresis loop. The extent of the hysteresis loop also depends on the rate of temperature change. The faster the change in temperature, the more marked the hysteresis effect. Hysteresis effect makes it clear that the thermal expansion of a LAS glass ceramic depends on temperature and on time, i.e., for example, on the rate of temperature change, for which there have also been sporadic descriptions in the specialist literature, for example O. Lindig and W. Pannhorst, "Thermal expansion and length stability of ZERODUR® in dependence on temperature and time", APPLIED OPTICS, vol. 24, no. 20, October 1985; R. Haug et al., "Length variation in ZERODUR® M in the temperature range from −60° C. to +100° C.", APPLIED OPTICS, vol. 28, no. 19, October 1989; R. Jedamzik et al., "Modeling of the thermal expansion behavior of ZERO-DUR® at arbitrary temperature profiles", Proc. SPIE Vol. 7739, 2010; D. B. Hall, "Dimensional stability tests over time and temperature for several low-expansion glass ceramics", APPLIED OPTICS, vol. 35, no. 10, April 1996.

Since the change in length of a glass ceramic exhibiting thermal hysteresis is delayed or advanced with respect to the change in temperature, the material or a precision component manufactured therefrom has a troublesome isothermal change in length, meaning that, after a change in temperature, a change in length of the material occurs even at the time when the temperature is already being kept constant (called "isothermal hold"), until a stable state is attained. If the material is then reheated and cooled, the same effect occurs again.

With the LAS glass ceramics known to date, in spite of variation of the ceramization conditions with unchanged composition, it has not been possible to remedy the effect of thermal hysteresis without adverse effects on other properties.

In relation to the properties of materials, especially glass ceramics, for use in precision components, a relevant temperature range is from 0° C. to 50° C., especially from 10° C. to 35° C. or from 19° C. to 25° C., with a temperature of 22° C. generally being referred to as room temperature. Since many applications of precision components take place within the temperature range from greater than 0° C. to room temperature, materials having thermal hysteresis effects and isothermal changes in length are disadvantageous, since there can be optical faults, for example, in the case of optical components such as lithography mirrors and astronomical or space-based mirrors. In the case of other precision components made of glass ceramic that are employed in measurement technology (e.g. precision measurement scales, reference plates in interferometers), this can cause inaccuracies in measurement.

Some known materials such as ceramics, Ti-doped quartz glass and particular glass ceramics feature an average coefficient of thermal expansion CTE (0; 50) of $0\pm0.1\times10^{-6}$/K (corresponding to $0\pm0.1$ ppm/K). Materials having such a low average CTE within the temperature range mentioned are referred to as zero-expansion materials in the context of this invention. However, glass ceramics, especially LAS glass ceramics, having such an optimized average CTE generally have thermal hysteresis within the temperature range of 10° C. to 35° C. In other words, specifically in applications around room temperature (i.e. 22° C.), a disturbing hysteresis effect occurs in the case of these materials, which impairs the accuracy of precision components produced with such a material. Therefore, a glass ceramic material has been developed (see U.S. Pat. No. 4,851,372) that has no significant hysteresis at room temperature, although the effect has not been eliminated, but merely shifted to lower temperatures, such that this glass ceramic at temperatures of 10° C. or lower shows distinct hysteresis that can likewise still be troublesome. In order to characterize the thermal hysteresis of a material within a particular temperature range, in the context of this invention, therefore, the thermal characteristics of the materials are considered for different temperature points within this range. There are even glass ceramics that show no significant hysteresis at 22° C. and at 5° C., but these glass ceramics have an average CTE (0; 50) of >$0\pm0.1$ ppm/K, i.e. are not zero-expansion glass ceramics within the scope of the abovementioned definition.

A further demand on a glass ceramic material is good meltability of the glass components, and simple melt guiding and homogenization of the underlying glass melt in industrial scale production plants, in order—on completion of ceramization of the glass—to meet the high demands on the glass ceramic with regard to CTE homogeneity, internal quality—especially a low level of inclusions (especially bubbles), low level of streaks—and polishability etc.

The internal quality of the glass ceramic, especially features such as bubbles and streaks, is influenced by the effectiveness of the refining of the glass melt. Refining means the removal of gas bubbles from the glass melt. In order to achieve high freedom from extraneous gas and bubbles, what is required is thorough mixing and degassing of the molten batch. For this purpose, compounds, called chemical refining agents, are generally added to the melt, which decompose and release gases or are volatile at relatively high temperatures. A particularly effective refining agent for LAS glass ceramics is arsenic oxide ($As_2O_3$), a redox refining agent that releases $O_2$ as refining gas. This refining agent is particularly effective since—as published in DE 102010002188 A1—the release of the refining gas has two maxima at temperatures (at about 1250° C. and at about 1600° C.) that are within the temperature ranges of the melting of the glass components and of refining. However, $As_2O_3$ is highly toxic and is classified as carcinogenic.

In the field of zero-expansion LAS glass ceramics, in relation to $As_2O_3$, there have been efforts to switch to other chemical refining agents (e.g. U.S. Pat. No. 8,043,985 B2, DE 102010002188 A1). However, a general problem in the use of refining agents is that the refining agents added on the one hand do release refining gases through breakdown or on account of their volatility, but on the other hand also remain at least partly as a component in the glass phase and/or the crystal phase and hence partly determine the properties of the later glass ceramic. Also known, for example from DE 19939771 A, is the refining of glass melts with addition of different refining agents at very high temperatures in the range of 1700° C. to 2400° C.

It was thus an object of the invention to provide a glass ceramic refined in a more environmentally friendly manner and having improved expansion characteristics. A further object was to provide a glass ceramic producible on an industrial scale that has been refined in a more environmentally friendly manner and has zero expansion and reduced thermal hysteresis, especially within the temperature range of 10° C. to 35° C., and a precision component produced from said material.

The above object is achieved by the subject-matter of the claims. The present invention has various aspects:

In one aspect of the invention, an LAS glass ceramic is provided, which has an average coefficient of thermal expansion CTE in the range from 0 to 50° C. of not more than $0\pm0.1\times10^{-6}$/K and thermal hysteresis at least within the temperature range of 10-35° C. of <0.1 ppm and which comprises the following components (in mol % based on oxide):

| | |
|---|---|
| $SiO_2$ | 60-71 |
| $Li_2O$ | 7-9.4 |
| $MgO + ZnO$ | 0-<0.6 | at least one component selected from the group consisting of $P_2O_5$, $R_2O$, where $R_2O$ may be $Na_2O$ and/or $K_2O$ and/or $Cs_2O$ and/or $Rb_2O$, and RO, where RO may be CaO and/or BaO and/or SrO, and nucleating agent in a content of 1.5 to 6 mol %, where nucleating agent is at least one component selected from the group consisting of $TiO_2$, $ZrO_2$, $Ta_2O_5$, $Nb_2O_5$, $SnO_2$, $MoO_3$, $WO_3$, $HfO_2$, wherein the LAS glass ceramic contains not more than 0.05 mol % $As_2O_3$.

In a further aspect, the invention relates to the use of a glass ceramic according to the invention as substrate for a precision component.

In a further aspect, the invention relates to the use of an LAS glass ceramic according to the invention in a precision component, especially for use in metrology, spectroscopy, measurement technology, lithography, astronomy or observation of the Earth from space, for example as mirror or mirror substrate for segmented or monolithic astronomical telescopes or else as lightweight or ultralight mirror substrates, for example for space-based telescopes or as high-precision structure components for measurement of distance, for example in space, or optics for observation of the Earth, as precision components, such as standards for precision measurement technology, precision measurement scales, reference plates in interferometers, as mechanical precision parts, for example for ring laser gyroscopes, spiral springs for the clock industry, for example as mirrors and prisms in LCD lithography, and, for example, as mask holders, wafer stages, reference plates, reference frames and grid plates in microlithography and in EUV (extreme UV) microlithography, in which reflective optics are used, and additionally as mirrors and/or photomask substrates or reticle mask blanks in EUV microlithography.

In another aspect, the invention relates to a precision component comprising an LAS glass ceramic according to the invention.

The FIGURES Show:

FIG. 1 shows CTE-T curves of materials known from the prior art that have low thermal lengthwise expansion, for example for precision components.

FIG. 2 shows hysteresis characteristics of three glass ceramic samples ascertained by the same method, which is also used in the present invention. This figure comes from R. Jedamzik et al., "Modeling of the thermal expansion behavior of ZERODUR® at arbitrary temperature profiles", Proc. SPIE Vol. 7739, 2010.

Figure 1:
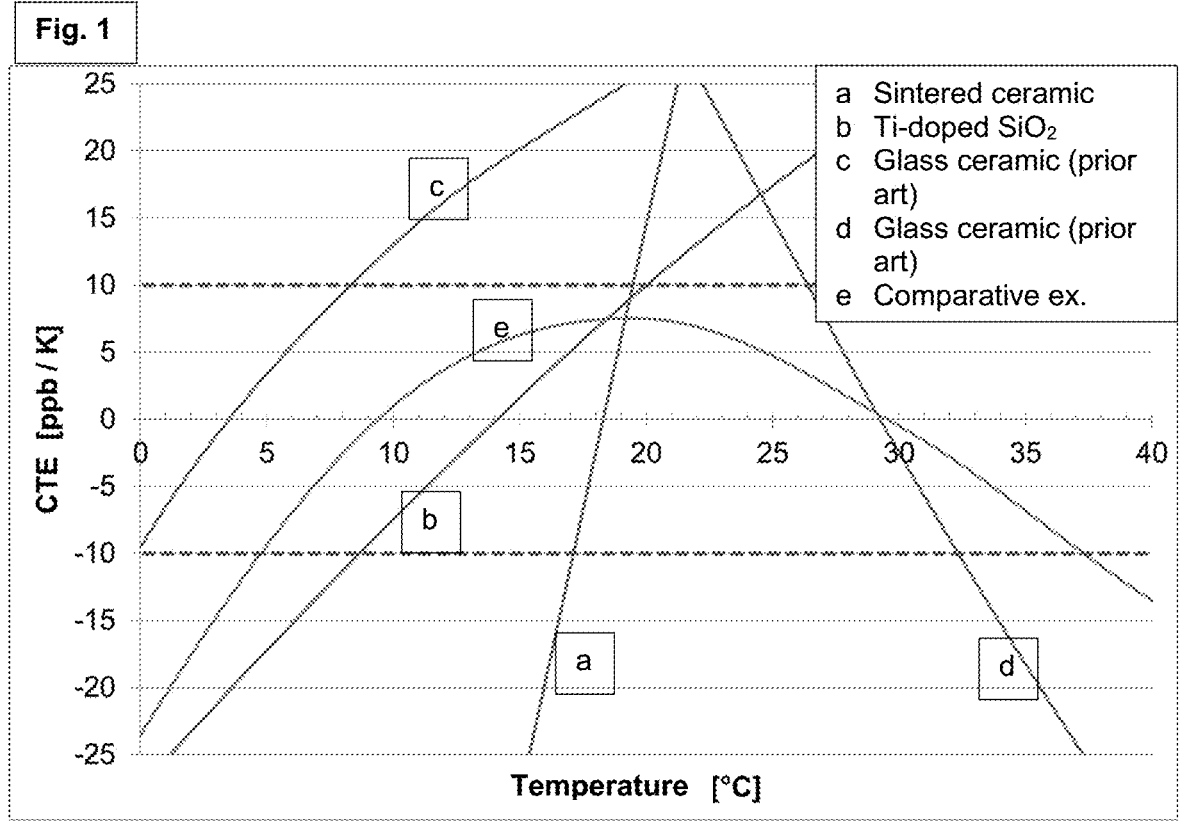
Figure 3:
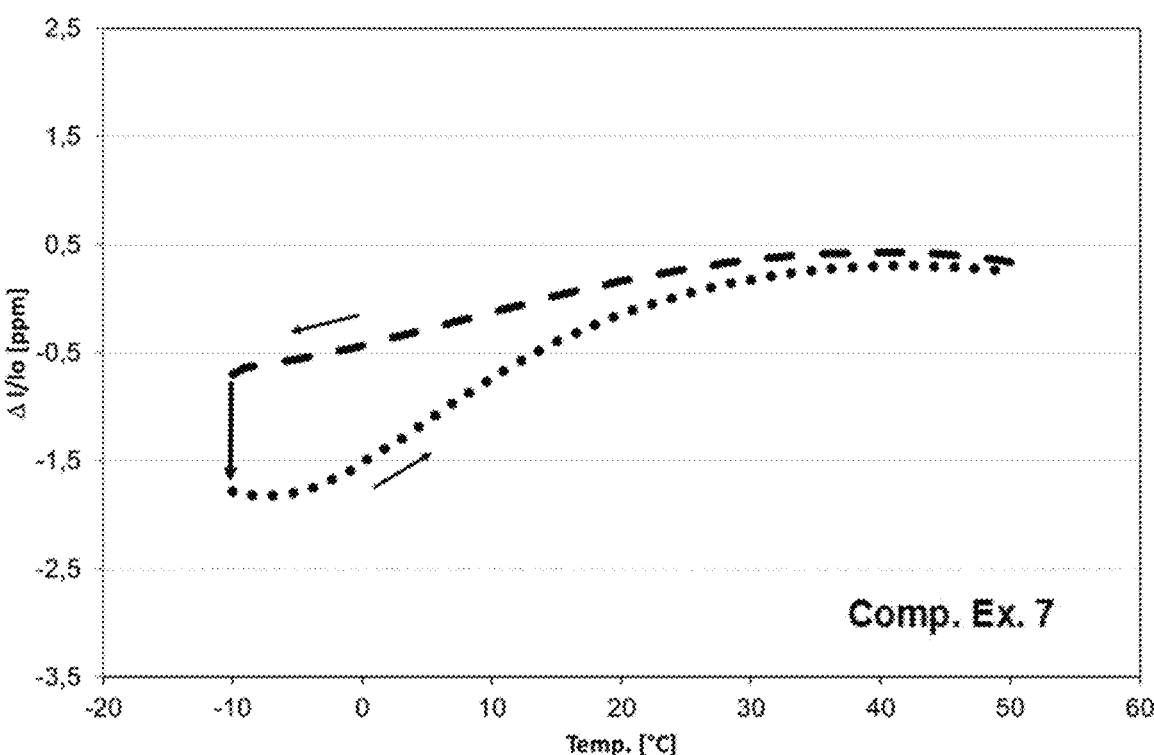
FIGS. 3 to 8 show hysteresis curves of known materials of glass ceramics which can be used for production of known precision components and which have thermal hysteresis at least within the temperature range of 10-35° C. of >0.1 ppm (dashed=cooling curve, dotted=heating curve).
Figure 4:
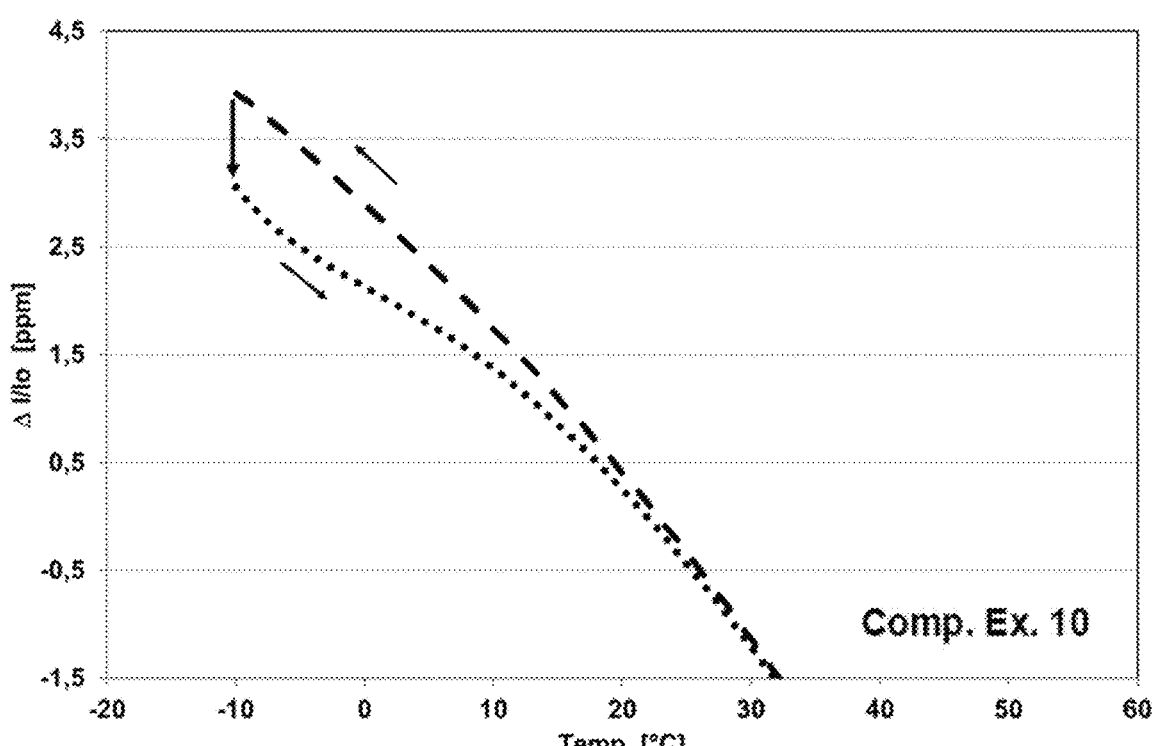
Figure 5:
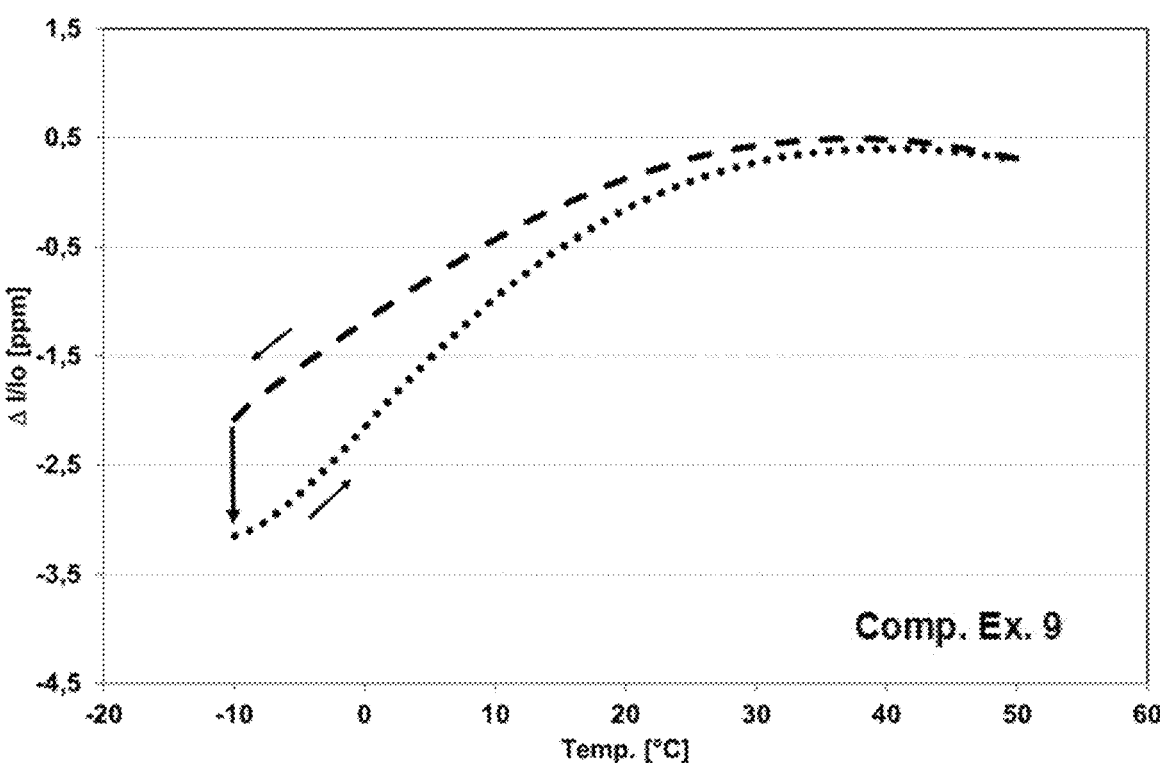

The invention provides an LAS glass ceramic having an average coefficient of thermal expansion CTE in the range from 0 to 50° C. of not more than 0±0.1×10⁻⁶/K and thermal hysteresis at least within the temperature range of 10° C.-35° C. of <0.1 ppm, and comprising the following components (in mol % based on oxide):

| | |
|---|---|
| $SiO_2$ | 60-71 |
| $Li_2O$ | 7-9.4 |
| MgO + ZnO | 0-<0.6 | at least one component selected from the group consisting of $P_2O_5$, $R_2O$, where $R_2O$ may be $Na_2O$ and/or $K_2O$ and/or $Cs_2O$ and/or $Rb_2O$, and RO, where RO may be CaO and/or BaO and/or SrO, and nucleating agent in a content of 1.5 to 6 mol %, where nucleating agent is at least one component selected from the group consisting of $TiO_2$, $ZrO_2$, $Ta_2O_5$, $Nb_2O_5$, $SnO_2$, $MoO_3$, $WO_3$, $HfO_2$, wherein the LAS glass ceramic contains not more than 0.05 mol % $As_2O_3$ as refining agent.

The invention for the first time provides an LAS glass ceramic (also called glass ceramic hereinafter) that combines multiple relevant properties: it has an average coefficient of thermal expansion CTE in the range from 0 to 50° C. of not more than 0±0.1×10⁻⁶/K, i.e. has zero expansion. It also has thermal hysteresis of <0.1 ppm at least within the temperature range from 10° C. to 35° C. A material having such a small hysteresis effect of <0.1 ppm within the temperature range mentioned is referred to hereinafter as "hysteresis-free". Since the extent of hysteresis, as already mentioned above, depends on the rate of temperature change used for ascertainment thereof, the statements relating to hysteresis in the context of the invention relate to a heating rate/cooling rate of 36 K/h, i.e. 0.6 K/min. In advantageous embodiments, the LAS glass ceramic may be hysteresis-free at least within the temperature range of 5° C. to 35° C. or at least 5° C. to 40° C., advantageously at least within the temperature range of >0° C. to 45° C., preferably at least within the temperature range of −5° C. to 50° C.

In addition, the zero-expansion and hysteresis-free glass ceramic according to the invention having an $As_2O_3$ content of not more than 0.05 mol % contains only a small amount of environmentally hazardous refining agent. Advantageously, the $As_2O_3$ content in the glass ceramic is 0.04 mol %, preferably 0.03 mol %, with preference 0.025 mol %, with preference 0.02 mol %, with preference 0.015 mol %. It is advantageous when the glass ceramic contains an amount of $As_2O_3$ as low as possible. Particularly preferred variants of the glass ceramic are essentially $As_2O_3$-free, with "essentially $As_2O_3$-free or As-free" meaning that the $As_2O_3$ component of the composition is not added deliberately as a component but is present as an impurity at most, with an impurity limit for $As_2O_3$ for $As_2O_3$-free glass ceramics of 0.01 mol %, preferably 0.005 mol %. In a specific embodiment, the glass ceramic is free of $As_2O_3$.

The features of CTE and thermal hysteresis are described in detail further down.

A glass ceramic is understood in accordance with the invention to mean inorganic nonporous materials having a crystalline phase and a vitreous phase, with the matrix, i.e. the continuous phase, generally being a glass phase. For production of the glass ceramic, first of all, the components of the glass ceramic are mixed, melted and refined, and what is called a green glass is cast. The green glass, after cooling, is crystallized in a controlled manner by reheating (called "controlled volume crystallization"). The chemical composition (analysis) of the green glass and of the glass ceramic produced therefrom are the same; the ceramization alters exclusively the internal structure of the material. Therefore, if reference is made hereinafter to the composition of the glass ceramic, the statements made are equally applicable to the precursor article of the glass ceramic, i.e. the green glass.

In the context of the invention, it has been recognized that the two components MgO and ZnO promote the occurrence of thermal hysteresis within the temperature range considered, and it is therefore essential for the provision of a zero-expansion LAS glass ceramic which is hysteresis-free at least within the temperature range of 10° C. to 35° C. to limit the content of MgO and ZnO as specified in the claim. By contrast, it has been assumed to date that these glass components in combination or each individually are specifically necessary in zero-expansion LAS glass ceramics in order to achieve zero expansion, and to make the shape of the CTE-T curve of the material "flat", i.e. with a low slope of the CTE-T curve within the relevant temperature range. There was thus a conflict of objectives in that an LAS glass ceramic could be either zero-expansion or hysteresis-free.

This conflict of objectives is resolved by the invention if not only the use of MgO and ZnO is largely dispensed with, but the contents of $SiO_2$ and $Li_2O$ are additionally chosen from the ranges defined by the invention. In the context of the invention, it has been found that, surprisingly, within the range defined by the contents for $SiO_2$ (60-71 mol %) and for $Li_2O$ (7-9.4 mol %), it is possible to obtain zero-expansion and hysteresis-free glass ceramics, even if the glass ceramic has been refined in a more environmentally friendly manner, meaning that it contains not more than 0.05 mol % $As_2O_3$ and is preferably essentially $As_2O_3$-free.

LAS glass ceramics contain a negatively expanding crystal phase which, in accordance with the invention, advantageously comprises or consists of high quartz solid solution, also called β-eucryptite, and a positively expanding glass phase. As well as $SiO_2$ and $Al_2O_3$, $Li_2O$ is a main constituent of the solid solution. If present, ZnO and/or MgO are likewise incorporated into the solid solution phase, and together with $Li_2O$ influence the expansion characteristics of the crystal phase. This means that the abovementioned specifications according to the invention (reduction, preferably exclusion, of MgO and ZnO and not more than 0.05 mol % of $As_2O_3$) have a significant effect on the nature and properties of the solid solution formed in the course of ceramization and the composition of the remaining glass phase. By contrast with the known zero-expansion glass ceramics in which MgO and ZnO in particular are used for establishment of the desired expansion characteristics of the glass ceramic, at least one component selected from the group consisting of $P_2O_5$, $R_2O$, where $R_2O$ may be $Na_2O$ and/or $K_2O$ and/or $Rb_2O$ and/or $Cs_2O$, and RO, where RO may be CaO and/or BaO and/or SrO, is used for this purpose in the context of the invention. Unlike MgO and ZnO, the alkaline earth metal oxides and alkali metal oxides mentioned, if present, however, remain in the glass phase and are not incorporated into the high quartz solid solution.

In the context of the invention, it has been found that it can be advantageous for the provision of a zero-expansion and hysteresis-free glass ceramic when the composition meets the condition that molar content of $SiO_2$+(5× molar content of $Li_2O$)≥106 or preferably 106.5, preferably molar content of $SiO_2$+(5× molar content of $Li_2O$)≥107 or ≥107.5. Alternatively or additionally, in respect of the condition "molar content of $SiO_2$+(5× molar content of $Li_2O$)", an advantageous upper limit of ≤115.5 or of ≤114.5 or of ≤113.5 may be applicable.

In an advantageous development, the glass ceramic may comprise the following components, individually or in any combination, in mol %:

| | |
|---|---|
| $Al_2O_3$ | 10 to 22 |
| $P_2O_5$ | 0 to 6 |
| MgO | 0 to 0.35 |
| ZnO | 0 to 0.5 |
| $R_2O$ | 0 to 6 |
| RO | 0 to 6 |
| $TiO_2 + ZrO_2$ | 1.5 to 6 |

Further preferably, the glass ceramic may include, within the scope of the abovementioned limits for the sums of $R_2O$, of RO and of $TiO_2+ZrO_2$, the following components individually or in any combination in mol %:

| | |
|---|---|
| $Na_2O$ | 0 to 3 |
| $K_2O$ | 0 to 3 |
| $Cs_2O$ | 0 to 2 |
| $Rb_2O$ | 0 to 2 |
| CaO | 0 to 5 |
| BaO | 0 to 4 |
| SrO | 0 to 3 |
| $TiO_2$ | 0 to 5 |
| $ZrO_2$ | 0 to 3 |

In an advantageous embodiment, the LAS glass ceramic comprises (in mol % based on oxide):

| | |
|---|---|
| $Al_2O_3$ | 10 to 22 |
| $P_2O_5$ | 0 to 6 |
| MgO | 0 to 0.35 |
| ZnO | 0 to 0.5 |
| $R_2O$ | 0 to 6 |
| RO | 0 to 6 |
| nucleating agent | 1.5 to 6, | where nucleating agent is preferably $TiO_2$ and/or $ZrO_2$.

In an advantageous embodiment, the LAS glass ceramic comprises (in mol % based on oxide):

| | |
|---|---|
| $Al_2O_3$ | 10 to 22 |
| $P_2O_5$ | 0 to 6 |
| MgO | 0 to 0.3 |
| ZnO | 0 to 0.4 |
| $R_2O$ | 0 to 6 |
| RO | 0 to 6 |
| nucleating agent | 1.5 to 6, | where nucleating agent is preferably $TiO_2$ and/or $ZrO_2$.

In a further advantageous embodiment, the LAS glass ceramic comprises (in mol % based on oxide):

| | |
|---|---|
| $SiO_2$ | 60.50 to 69 |
| $Li_2O$ | 8 to 9.4 |
| $Al_2O_3$ | 11 to 21 |
| $P_2O_5$ | 0.5 to 6 |
| MgO | 0 to 0.2 |
| ZnO | 0 to 0.3 |
| $R_2O$ | 0 to 4 |
| RO | 0.2 to 4.5 |
| $As_2O_3$ | 0.04 |
| nucleating agent | 2.5 to 5, | where nucleating agent is preferably $TiO_2$ and/or $ZrO_2$.

The glass ceramic contains a proportion of silicon dioxide ($SiO_2$) of at least 60 mol %, more preferably at least 60.5 mol %, also preferably at least 61 mol %, also preferably at least 61.5 mol %, further preferably at least 62.0 mol %. The proportion of $SiO_2$ is at most 71 mol % or less than 71 mol %, more preferably at most 70 mol % or less than 70 mol %, further preferably at most 69 mol %, also preferably at most 68.5 mol %. In the case of greater proportions of $SiO_2$, the batch is more difficult to melt and the viscosity of the melt is higher, which can lead to problems in the homogenization of the melts in industrial scale production plants. Therefore, a content of 71 mol %, preferably 70 mol %, should not be exceeded. If the viscosity of a melt is high, there is an increase in the processing temperature Va of the melt. Very high temperatures are required for the refining and homogenization of the melt, but these have the effect that the increasing aggressivity of the melt with temperature results in attack on the linings of the melting equipment. Moreover, even higher temperatures may be insufficient to produce a homogeneous melt, with the result that the green glass can have streaks and inclusions (especially bubbles and particles originating from the lining of the melting equipment), such that, after the ceramization, the demands on the homogeneity of the properties of the glass ceramic produced, for example the homogeneity of the coefficient of thermal expansion, are not met. Lower $SiO_2$ contents than the upper limit mentioned may be preferable for that reason.

The proportion of $Al_2O_3$ is advantageously at least 10 mol %, preferably at least 11 mol %, with preference at least 12 mol %, more preferably at least 13 mol %, also preferably at least 14 mol %, also preferably at least 14.5 mol %, further preferably at least 15 mol %. If the content is too low, no solid solution is formed, or not enough solid solution having low expansion is formed. The proportion of $Al_2O_3$ is advantageously at most 22 mol %, preferably at most 21 mol %, with preference at most 20 mol %, additionally preferably at most 19.0 mol %, more preferably at most 18.5 mol %. Too high an $Al_2O_3$ content leads to elevated viscosity and promotes the uncontrolled devitrification of the material.

The glass ceramic according to the invention may contain 0 to 6 mol % of $P_2O_5$. The phosphate content $P_2O_5$ of the glass ceramic may advantageously be at least 0.1 mol %, preferably at least 0.3 mol %, with preference at least 0.5 mol %, also preferably at least 0.6 mol %, more preferably at least 0.7 mol %, further preferably at least 0.8 mol %. $P_2O_5$ is essentially incorporated into the crystal phase of the glass ceramic and has a positive effect on the expansion characteristics of the crystal phase and hence of the glass ceramic. Moreover, melting of the components and refining characteristics of the melt are improved. But if too much $P_2O_5$ is present, the progression of the CTE-T curve within the temperature range of 0° C. to 50° C. does not show an advantageous flat progression. Therefore, advantageously not more than 6 mol %, preferably not more than 5 mol %, more preferably at most 4 mol %, further preferably less than 4 mol %, of $P_2O_5$ may be present in the glass ceramic. In individual embodiments, the glass ceramics may be free of $P_2O_5$.

In the context of the invention, particular sums and ratios of the components $SiO_2$, $Al_2O_3$ and/or $P_2O_5$, i.e. of the components that form the high quartz solid solution, may be beneficial for formation of a glass ceramic according to the invention.

The cumulative proportion in mol % of the $SiO_2$ and $Al_2O_3$ base constituents of the LAS glass ceramic is advantageously at least 75 mol %, preferably at least 78 mol %, with preference at least 79 mol %, more preferably at least 80 mol % and/or preferably at most 90 mol %, preferably at most 87 mol %, with preference at most 86 mol %, more preferably at most 85 mol %. If this sum is too high, the viscosity curve of the melt is shifted to higher temperatures, which is disadvantageous, as already elucidated above in connection with the $SiO_2$ component. If the sum is too low, too little solid solution is formed.

The cumulative proportion in mol % of the $SiO_2$, $Al_2O_3$ and $P_2O_5$ base constituents of the LAS glass ceramic is preferably at least 77 mol %, advantageously at least 81 mol %, advantageously at least 83 mol %, more preferably at least 84 mol % and/or preferably at most 91 mol %, advantageously at most 89 mol %, more preferably at most 87 mol %, and in one variant at most 86 mol %.

The ratio of the molar proportions of $P_2O_5$ to $SiO_2$ is preferably at least 0.005, advantageously at least 0.01, with preference at least 0.012 and/or preferably at most 0.1, more preferably at most 0.08, and in one variant at most 0.07.

As a further constituent, the glass ceramic contains lithium oxide ($Li_2O$) in a proportion of at least 7 mol %, advantageously at least 7.5 mol %, preferably at least 8 mol %, especially preferably at least 8.25 mol %. The proportion of $Li_2O$ is limited to at most 9.4 mol %, more preferably at most 9.35 mol %, additionally preferably at most or less than 9.3 mol %. $Li_2O$ is a constituent of the solid solution phase and makes an essential contribution to the thermal expansion of the glass ceramic. Said upper limit of 9.4 mol % should not be exceeded since the result is otherwise glass ceramics having a negative coefficient of thermal expansion CTE (0; 50). If the content of $Li_2O$ is less than 7 mol %, too little solid solution is formed and the CTE of the glass ceramic remains positive.

The glass ceramic may contain at least one alkaline earth metal oxide selected from the group consisting of CaO, BaO, SrO, with this group being referred to collectively as "RO". The components from the RO group remain essentially in the amorphous glass phase of the glass ceramic and may be important for the preservation of zero expansion of the ceramized material. If the sum of CaO+BaO+SrO is too high, the target CTE (0; 50) according to the invention is not attained. Therefore, the proportion of RO is advantageously at most 6 mol % or at most 5.5 mol %, preferably at most 5 mol %, advantageously at most 4.5 mol %, preferably at most 4 mol %, with preference at most 3.8 mol %, furthermore preferably at most 3.5 mol %, also preferably at most 3.2 mol %. If the glass ceramic contains RO, an advantageous lower limit may be at least 0.1 mol %, advantageously at least 0.2 mol %, with preference at least 0.3 mol %, also preferably at least 0.4 mol %. In individual embodiments, the glass ceramics may be free of RO.

The proportion of CaO may preferably be at most 5 mol %, advantageously at most 4 mol %, advantageously at most 3.5 mol %, advantageously at most 3 mol %, further preferably at most 2.8 mol %, more preferably at most 2.6 mol %. The glass ceramic may advantageously contain at least 0.1 mol %, advantageously at least 0.2 mol %, preferably at least 0.4 mol %, with preference at least 0.5 mol %, of CaO. The glass ceramic may advantageously contain the BaO component, which is a good glass former, in a proportion of at least 0.1 mol %, preferably at least 0.2 mol % and/or at most 4 mol %, advantageously at most 3 mol %, advantageously at most 2.5 mol %, preferably at most 2 mol %, with preference at most 1.5 mol %, also preferably at most 1.4 mol %. The glass ceramic may contain SrO in a proportion of at most 3 mol %, advantageously at most 2 mol %, preferably at most 1.5 mol %, with preference at most 1.3 mol %, with preference at most 1.1 mol %, more preferably at most 1 mol %, also preferably at most 0.9 mol % and/or preferably at least 0.1 mol %. In individual embodiments, the glass ceramics are free of CaO and/or BaO and/or SrO.

Sodium oxide ($Na_2O$) and/or potassium oxide ($K_2O$) and/or caesium oxide ($Cs_2O$) and/or rubidium oxide ($Rb_2O$) are optionally present in the glass ceramic, i.e. $Na_2O$-free and/or $K_2O$-free and/or $Cs_2O$-free and/or $Rb_2O$-free variants are possible. The proportion of $Na_2O$ may advantageously be at most 3 mol %, with preference at most 2 mol %, preferably at most 1.7 mol %, with preference at most 1.5 mol %, with preference at most 1.3 mol %, with preference at most 1.1 mol %. The proportion of $K_2O$ may advantageously be at most 3 mol %, preferably at most 2.5 mol %, with preference at most 2 mol %, with preference at most 1.8 mol %, with preference at most 1.7 mol %. The proportion of $Cs_2O$ may advantageously be at most 2 mol %, preferably at most 1.5 mol %, with preference at most 1 mol %, with preference at most 0.6 mol %. The proportion of $Rb_2O$ may advantageously be at most 2 mol %, preferably at most 1.5 mol %, with preference at most 1 mol %, with preference at most 0.6 mol %. In individual embodiments, the glass ceramics are free of $Na_2O$ and/or $K_2O$ and/or $Cs_2O$ and/or $Rb_2O$.

$Na_2O$, $K_2O$, $Cs_2O$, $Rb_2O$ may each independently be present in the glass ceramic in a proportion of at least 0.1 mol %, preferably at least 0.2 mol %, more preferably at least 0.5 mol %. The $Na_2O$, $K_2O$, $Cs_2O$ and $Rb_2O$ components remain essentially in the amorphous glass phase of the glass ceramic and may be important for the preservation of the zero expansion of the ceramized material.

Therefore, the sum $R_2O$ of the contents of $Na_2O$, $K_2O$, $Cs_2O$ and $Rb_2O$ may advantageously be at least 0.1 mol %, preferably at least 0.2 mol %, advantageously at least 0.3 mol %, with preference at least 0.4 mol %. A low $R_2O$ content of advantageously at least 0.2 mol % may contribute to increasing the temperature range within which the expansion of the glass ceramic shows a flat progression. The sum $R_2O$ of the contents of $Na_2O$, $K_2O$, $Cs_2O$ and $Rb_2O$ may advantageously be at most 6 mol %, preferably at most 5 mol %, with preference at most 4 mol %, with preference at most 3 mol %, with preference at most 2.5 mol %. When the sum of $Na_2O+K_2O+Cs_2O+Rb_2O$ is too low or too high, it may be possible that the target CTE (0; 50) according to the invention is not attained. In individual embodiments, the glass ceramics may be free of $R_2O$.

The glass ceramic may contain not more than 0.35 mol % of magnesium oxide (MgO). A further advantageous upper limit may be not more than 0.3 mol %, not more than 0.25 mol %, not more than 0.2 mol %, not more than 0.15 mol %, not more than 0.1 mol % or not more than 0.05 mol %. More preferably, the glass ceramics according to the invention are free of MgO. As already described above, the MgO component in the glass ceramic causes thermal hysteresis within the temperature range from 0° C. to 50° C. The less MgO is present in the glass ceramic, the lower the hysteresis within the temperature range mentioned will be.

The glass ceramic may contain not more than 0.5 mol % of zinc oxide (ZnO). A further advantageous upper limit may be not more than 0.45 mol %, not more than 0.4 mol %, not more than 0.35 mol %, not more than 0.3 mol %, not more than 0.25 mol %, not more than 0.2 mol %, not more than 0.15 mol %, not more than 0.1 mol % or not more than 0.05 mol %. More preferably, the glass ceramics according to the invention are free of ZnO. As already described above as a finding by the inventors, the ZnO component in the glass ceramic causes thermal hysteresis within the temperature range from 0° C. to 50° C. The less ZnO is present in the glass ceramic, the lower the hysteresis within the temperature range mentioned will be.

With regard to the freedom from hysteresis of the glass ceramic according to the invention, it is important that the condition that MgO+ZnO is less than 0.6 mol % is met. A further advantageous upper limit of for the sum of MgO+ZnO may be not more than 0.55 mol %, not more than 0.5 mol %, less than 0.5 mol %, not more than 0.45 mol %, not more than 0.4 mol %, not more than 0.35 mol %, not more than 0.3 mol %, not more than 0.25 mol %, not more than 0.2 mol %, not more than 0.15 mol %, not more than 0.1 mol % or not more than 0.05 mol %.

The glass ceramic also contains at least one crystal nucleating agent selected from the group consisting of $TiO_2$, $ZrO_2$ $Ta_2O_5$, $Nb_2O_5$, $SnO_2$, $MoO_3$, $WO_3$, $HfO_2$. Nucleating agents may be a combination of two or more of the components mentioned. The sum of the proportions of the nucleating agents is preferably at least 1.5 mol %, with preference at least 2 mol % or more than 2 mol %, more preferably at least 2.5 mol %, and in particular variants at least 3 mol %. An upper limit may be not more than 6 mol %, preferably not more than 5 mol %, with preference not more than 4.5 mol % or not more than 4 mol %. In particularly advantageous variants, the upper and lower limits mentioned are applicable to the sum of $TiO_2$ and $ZrO_2$.

The glass ceramic may contain titanium dioxide ($TiO_2$), preferably in a proportion of at least 0.1 mol %, advantageously at least 0.5 mol %, preferably at least 1.0 mol %, with preference at least 1.5 mol %, with preference at least 1.8 mol % and/or preferably at most 5 mol %, advantageously at most 4 mol %, more preferably at most 3 mol %, further preferably at most 2.5 mol %, with preference 2.3 mol %. $TiO_2$-free variants of the glass ceramic according to the invention are possible.

The glass ceramic may advantageously further contain zirconium oxide ($ZrO_2$) in a proportion of at most 3 mol %, preferably at most 2.5 mol %, further preferably at most 2 mol %, with preference at most 1.5 mol % or at most 1.2 mol %. $ZrO_2$ may preferably be present in a proportion of at least 0.1 mol %, more preferably at least 0.5 mol %, at least 0.8 mol % or at least 1.0 mol %. $ZrO_2$-free variants of the glass ceramic according to the invention are possible.

In some advantageous variants of the invention, individually or in sum, 0 to 5 mol % of $Ta_2O_5$ and/or $Nb_2O_5$ and/or $SnO_2$ and/or $MoO_3$ and/or $WO_3$ and/or $HfO_2$ may be present in the glass ceramic and, for example, as an additional or alternative nucleating agents or for modulation of the optical properties, for example refractive index. For modulation of the optical properties, it is possible in some advantageous variants, for example, for $Gd_2O_3$, $Y_2O_3$, $HfO_2$, $Bi_2O_3$ and/or $GeO_2$ to be present.

In order to provide a hysteresis-free and zero-expansion glass ceramic according to the invention in spite of the reduced $As_2O_3$ content or even without use of $As_2O_3$ in the desired internal quality, especially with low bubble count and few streaks, at least one chemical refining agent is used in an advantageous embodiment.

In an advantageous embodiment, the glass ceramic may include, as chemical refining agent, in place of $As_2O_3$ or in addition to the small proportion of $As_2O_3$ (not more than 0.05 mol %), at least one alternative redox refining agent and/or at least one evaporating refining agent and/or at least one decomposing refining agent. Since $As_2O_3$ is also a redox refining agent, in the context of the invention, redox refining agents that are used alternatively or additionally to $As_2O_3$ are referred to as "alternative redox refining agents".

In an advantageous variant, the total content of the chemical refining agents detectable in the glass ceramic (without the content of $As_2O_3$— if $As_2O_3$ is present in the glass ceramic) may be in the range of 0 mol % to 1 mol %. In an advantageous embodiment, the total content of the refining agents detectable in the glass ceramic (without $As_2O_3$) is more than 0.01 mol %, preferably at least 0.05 mol %, preferably at least 0.1 mol %, preferably at least 0.15 mol %, advantageously at least 0.2 mol % and/or at most 1 mol %, preferably at most 0.7 mol %, with preference at most 0.5 mol %, with preference at most 0.4 mol %. Some advantageous variants may also contain at most 0.3 mol %, preferably at most 0.25 mol % or at most 0.2 mol % of refining agent. The proportions of the respective components are detectable in an analysis of the glass ceramic. This is especially also true of all refining agents mentioned below except for the sulfate component described.

Redox refining agents contain multivalent or polyvalent ions that can occur in at least two oxidation states that are in a temperature-dependent equilibrium with one another, with release of a gas, usually oxygen, at high temperatures. Particular multivalent metal oxides may therefore be used as redox refining agents. In an advantageous variant, the alternative redox refining agent may be at least one component selected from the group consisting of $Sb_2O_3$, $SnO_2$, $CeO_2$, $MnO_2$, $Fe_2O_3$. In principle, however, further redox compounds are also suitable when they released their refining gas within the temperature range of relevance for the refining and are either converted to an oxide having a different valence state of the metal ion or to a metallic form. Numerous compounds of this kind are described, for example, in DE 19939771 A. Preference is given to an alternative redox refining agent that releases the refining gas, especially oxygen, at a temperature of less than 1700° C., for example $Sb_2O_3$, $SnO_2$, $CeO_2$.

An analysis of the glass ceramic can be used to determine the content of $As_2O_3$ and/or the content of the at least one alternative redox refining agent, from which experts are able to draw conclusions as to the type and amount of the refining agent used. The alternative redox refining agents may be added to the batch, for example, as oxides.

In an advantageous variant, the total content of the alternative redox refining agents may be in the range of 0 mol % to 1 mol %. In an advantageous execution, the total content of the alternative redox refining agents detectable in the glass ceramic is more than 0.01 mol %, preferably at least 0.05 mol %, preferably at least 0.1 mol %, preferably at least 0.15 mol %, advantageously at least 0.2 mol % and/or at most 1 mol %, preferably at most 0.7 mol %, with preference at most 0.5 mol %, with preference at most 0.4 mol %. Some advantageous variants may also contain at most 0.3 mol %, preferably at most 0.25 mol % or at most 0.2 mol % of alternative redox refining agent.

The glass ceramic may, as an alternative redox refining agent, contain 0 mol % to 1 mol % of antimony oxide ($Sb_2O_3$). In an advantageous embodiment, the glass ceramic contains $Sb_2O_3$ in a proportion of more than 0.01 mol %, preferably at least 0.05 mol %, advantageously at least 0.1 mol %, advantageously at least 0.15 mol %, preferably at least 0.2 mol % and/or preferably at most 1 mol %, advantageously at most 0.7 mol %, more preferably at most 0.5 mol %, further preferably at most 0.4 mol %, with preference at most 0.3 mol %. Since $Sb_2O_3$ is considered harmful to the environment, it may be advantageous to use as little $Sb_2O_3$ as possible for the refining. A preferred embodiment of the glass ceramic is essentially $Sb_2O_3$-free or Sb-free, with "essentially $Sb_2O_3$-free" meaning that $Sb_2O_3$ is not added to the composition deliberately as a raw material component, but is present as an impurity at most, with an impurity limit for $Sb_2O_3$-free glass ceramics of not more than 0.01 mol %, preferably not more than 0.005 mol %. In specific embodiments, the glass ceramic is $Sb_2O_3$-free.

The glass ceramic may, as an alternative redox refining agent, contain 0 mol % to 1 mol % of tin oxide ($SnO_2$). In an advantageous embodiment, the glass ceramic contains $SnO_2$ in a proportion of more than 0.01 mol %, preferably at least 0.05 mol %, advantageously at least 0.1 mol %, advantageously at least 0.15 mol %, preferably at least 0.2 mol %, preferably at least 0.3 mol % and/or preferably at most 1 mol %, advantageously at most 0.7 mol %, more preferably at most 0.6 mol %. In some variants, an advantageous upper limit may be at most 0.5 mol %, further preferably at most 0.4 mol %, with preference at most 0.3 mol %. If the content of $SnO_2$ is too high, it may be possible that the process of ceramization of the green glass is more difficult to control since $SnO_2$, in the case of relatively high contents, acts not only as a refining agent but also as a crystal nucleating agent. $SnO_2$-free or Sn-free variants of the glass ceramic according to the invention are possible and advantageous, meaning that no Sn-containing raw material has been added to the batch for the refining of the parent green glass, with an impurity limit for $SnO_2$ introduced by raw materials or the process of not more than 0.01 mol %, preferably not more than 0.005 mol %.

The glass ceramic may contain, as an alternative redox refining agent, 0 mol % to 1 mol % of $CeO_2$ and/or $MnO_2$ and/or $Fe_2O_3$. These components may each independently be present in a proportion of more than 0.01 mol %, preferably at least 0.05 mol %, advantageously at least 0.1 mol %, advantageously at least 0.15 mol %, preferably at least 0.2 mol % and/or preferably at most 1 mol %, advantageously at most 0.7 mol %, more preferably at most 0.5 mol %, further preferably at most 0.4 mol %, with preference at most 0.3 mol %. Preferred variants of the glass ceramic are free of $CeO_2$ and/or $MnO_2$ and/or $Fe_2O_3$, i.e. no Ce-containing raw material and/or Mn-containing raw material and/or Fe-containing raw material has been added for the refining of the parent green glass, with an impurity limit for $CeO_2$ and/or $MnO_2$ and/or $Fe_2O_3$ introduced by raw materials or the process of not more than 0.01 mol %, preferably not more than 0.005 mol %.

Evaporating refining agents are components that are volatile on account of their vapour pressure at high temperatures, such that the gas formed in the melt displays refining action.

In an advantageous variant, the evaporating refining agent may include a halogen component.

In an advantageous variant, the evaporating refining agent may comprise at least one halogen having refining action, especially selected from the group consisting of chlorine (Cl), bromine (Br) and iodine (I). The preferred halogen having refining action is chlorine. Fluorine is not a halogen having refining action since it is already volatile at low temperatures. The glass ceramic may nevertheless contain fluorine. However, the fluorine can lower the transparency of the glass ceramic, and so this component, if it should be present, is preferably limited to not more than 0.5 mol %, with preference not more than 0.3 mol %, with preference not more than 0.1 mol %. The glass ceramic is preferably free of fluorine.

The halogen having refining action may be added in different forms. In one embodiment, it is added to the batch as a salt with an alkali metal cation or alkaline earth metal cation or as aluminium-halogen. In one embodiment, the halogen is used as salt, and the cation in the salt corresponds to a cation present in oxide form in the glass ceramic. The halogen having refining action may be used in the form of a halogen compound, especially a halide compound. Suitable halide compounds are especially salts of chlorine anions, bromine anions and/or iodine anions with alkali metal cations or alkaline earth metal cations or aluminium cations. Preferred examples are chlorides such as LiCl, NaCl, KCl, $CaCl_2$, $BaCl_2$, $SrCl_2$, $AlCl_3$ and combinations thereof. Also possible are corresponding bromides and iodide such as LiBr, LiI, NaBr, NaI, KBr, KI, $CaI_2$, $CaBr_2$ and combinations thereof. Other examples are $BaBr_2$, $BaI_2$, $SrBr_2$, $SrI_2$ and combinations thereof.

In an advantageous variant, the total content of halogen having refining action (i.e. Cl and/or Br and/or I) may be in the range of 0 mol % to 1 mol %. In an advantageous embodiment, the total content of halogen having refining action detectable in the glass ceramic is more than 0.03 mol %, preferably at least 0.04 mol %, preferably at least 0.06 mol %, preferably at least 0.08 mol %, preferably at least 0.1 mol %, preferably at least 0.15 mol %, advantageously at least 0.2 mol % and/or at most 1 mol %, preferably at most 0.7 mol %, with preference at most 0.5 mol %, with preference at most 0.4 mol %. Some advantageous variants may also contain at most 0.3 mol %, preferably at most 0.25 mol % or at most 0.2 mol % of halogen having refining action. The contents mentioned are based on the amounts of halogen detectable in the glass ceramic. A person skilled in the art is familiar with using these FIGURES to calculate the amount of halogen or halide compound required for the refining.

The glass ceramic may contain 0 mol % to 1 mol % of chlorine (determined in atomic form and reported as Cl). In an advantageous embodiment, the glass ceramic contains Cl with a proportion of more than 0.03 mol %, advantageously at least 0.04 mol %, advantageously at least 0.05 mol %, advantageously at least 0.1 mol %, advantageously at least 0.15 mol %, preferably at least 0.2 mol % and/or preferably at most 1 mol %, advantageously at most 0.7 mol %, more preferably at most 0.5 mol %, further preferably at most 0.4 mol %, with preference at most 0.3 mol %. Some advantageous glass ceramics may be Cl-free, meaning that no Cl-containing raw material has been added to the batch for the refining of the parent green glass. Cl is present as an impurity at most, with the limit for the Cl impurity being not more than 0.03 mol %.

The same ranges and limits mentioned are applicable to Br as halogen having refining action. The same ranges and limits mentioned are applicable to I as halogen having refining action. Preferred variants of the glass ceramic are free of Br and/or I.

Alternatively or additionally to an evaporating refining agent and/or an alternative redox refining agent, the chemical refining agent may contain at least one decomposing refining agent. A decomposing refining agent is an inorganic compound that decomposes at high temperatures with release of refining gas, and the decomposition product has a sufficiently high gas pressure, especially of greater than $10^5$ Pa. The decomposing refining agent may preferably be a salt containing an oxo anion, especially a sulfate component. The decomposing refining agent preferably comprises a sulfate component. Decomposition of the component added in sulfate form releases $SO_2$ and $O_2$ gas at high temperatures, which contribute to refining of the melt.

A sulfate component may be added in different forms. In one embodiment, it is added to the batch as a salt with alkali metal or alkaline earth metal cation. In one embodiment, the sulfate is used in salt form and the cation in the salt corresponds to a cation present in oxide form in the glass ceramic. Sulfate sources used may, for example, advantageously be the following components: $Li_2SO_4$, $Na_2SO_4$, $K_2SO_4$, $CaSO_4$, $BaSO_4$, $SrSO_4$.

In the context of the invention, sulfate is determined as $SO_3$ in the material analysis. Since LAS glass ceramics, however, have only a very low solubility for sulfate, after the melting, the sulfate component (i.e. $SO_3$) in the melted product is no longer detectable by the standard x-ray fluorescence analysis. Therefore, in the case of sulfate-refined working examples (see below), a statement is made as to how many mol % of $SO_4^{2-}$ or mol % of $SO_3$ has been used, based on the synthesis of the glass melt. The fact that a sulfate component has been used as refining agent can be ascertained, for example, via an analysis of the residual gas content ($SO_2$) in the glass ceramic.

To an advantageous glass ceramic that has been refined with a sulfate component has been added, in the course of synthesis, via at least one appropriate sulfate compound, more than 0.01 mol %, preferably at least 0.05 mol %, advantageously at least 0.1 mol %, advantageously at least 0.15 mol %, preferably at least 0.2 mol % and/or preferably at most 1 mol %, advantageously at most 0.7 mol %, more preferably at most 0.5 mol %, further preferably at most 0.4 mol %, with preference at most 0.3 mol %, of $SO_3$. Sulfate-free (i.e. $SO_3$-free or $SO_4^{2-}$-free) refined glass ceramics are possible and advantageous. The proportion of refining-active sulfate added in the synthesis of a glass ceramic may thus be in the range of 0 mol % to 1 mol % of $SO_3$.

In one variant of the invention, the glass ceramic or parent glass may have been refined using a suitable metal sulfide as decomposing refining agent, as described, for example, in US 2011/0098171 A. In one embodiment, the cation in the sulfide corresponds to a metal present in oxide form in the glass ceramic. Examples of suitable metal sulfide are alkali metal sulfide, alkaline earth metal sulfide and/or aluminium sulfide, which release $SO_3$ under oxidizing conditions in the melt. For a metal sulfide to be able to fulfil the role as a refining agent, it is advantageously used in combination with an oxidizing agent, preferably a nitrate, and/or sulfate.

Advantageous glass ceramics having a reduced $As_2O_3$ content or advantageous $As_2O_3$-free glass ceramics may include a combination of chemical refining agents. Advantageous combinations may be as follows, with the respective glass ceramic including the refining agents mentioned preferably within the abovementioned limits for the individual components and/or the sums. Advantageous embodiments comprise:

$SnO_2$ and/or $Sb_2O_3$ each with max. 0.05 mol % $As_2O_3$; or $As_2O_3$-free combinations such as: $Sb_2O_3$ with $SnO_2$; $Sb_2O_3$ with Cl, $Sb_2O_3$ with $SO_3$; or $As_2O_3$-free and $Sb_2O_3$-free combinations such as: $SnO_2$ with Cl, $SnO_2$ with $SO_3$, Cl with $SO_3$.

Alternatively, glass ceramics refined with just one refining agent may also be advantageous, for example glass ceramics containing solely $Sb_2O_3$ or solely $SnO_2$ as refining agent.

Alternatively or additionally to the above-described refining of the melt with chemical refining agents, the principle of which consists in the addition of compounds that decompose and release gases or that are volatile at relatively high temperatures or that release gases in an equilibrium reaction at relatively high temperatures, it is advantageously also possible to use physical refining methods, for example lowering of the viscosity of the glass melt by increasing the temperature, vacuum refining, high-pressure refining etc.

In an advantageous variant of the invention, the batch may contain nitrates ($NO_3$) that act as oxidizing agents in the melting and refining process and ensure that oxidizing conditions exist in the melt, in order to increase the efficacy of the refining agents used, especially the alternative redox refining agents. In one embodiment, the nitrate is used in salt form and the cation in the salt corresponds to a cation present in oxide form in the glass ceramic. Examples of these may be: aluminium nitrate, alkali metal nitrate, alkaline earth metal nitrates, zirconium nitrates. Another advantageous nitrate source may be ammonium nitrate. It is possible to use one nitrate compound or a mixture of two or more nitrate compounds. If one nitrate compound or a mixture of nitrate compounds is present in the batch in order to assist the refining process, the sum of $NO_3^-$ is preferably at least 0.4 mol %, preferably at least 0.5 mol %, preferably at least 0.8 mol %, with preference at least 1 mol % and/or advantageously at most 5 mol %, preferably at most 4 mol %. In some advantageous variants, it is also possible to use at most 3 mol % of nitrate. It is no longer possible to detect any nitrate in the glass or in the glass ceramic on account of the volatility.

The above glass compositions may optionally contain additions of colouring oxides, for example $Nd_2O_3$, $Fe_2O_3$, $CoO$, $NiO$, $V_2O_5$, $MnO_2$, $CuO$, $CeO_2$, $Cr_2O_3$, rare earth oxides, in contents, each individually or in sum, of 0-3 mol %. Preferred variants are free of colouring oxides.

$B_2O_3$ can have an adverse effect on the transparency of the glass ceramic. Therefore, the content of this component in an advantageous variant is limited to <0.2 mol %, preferably at most 0.1 mol %. Preferred variants are free of $B_2O_3$.

In an advantageous embodiment of the present invention, the composition is free of components that are not mentioned above.

In an advantageous embodiment of the present invention, the glass ceramic according to the invention or the green glass consists preferably to an extent of at least 90 mol %, more preferably to an extent of at least 95 mol %, most preferably to an extent of at least 99 mol %, of the aforementioned components, and preferably of the $SiO_2$, $Al_2O_3$, $Li_2O$, $P_2O_5$, $R_2O$, $RO$ and nucleating agent components.

In an advantageous development of the glass ceramic, the latter is essentially free of one or more glass components selected from the group consisting of $MgO$, $ZnO$, $PbO$, $B_2O_3$, $CrO_3$, $F$, $Cd$ compounds.

According to the invention, what is meant by the expression "X-free" or "free of a component X" is that the glass ceramic essentially does not contain this component X, meaning that such a component is present in the glass as an impurity at most, but is not added to the composition as an individual component. With regard to any contamination, especially with $MgO$ and/or $ZnO$, in the case of $MgO$-free and/or $ZnO$-free variants, a limit of 0.03 mol %, preferably 0.01 mol %, should not be exceeded, based on an individual component in each case. For other glass components, higher impurity contents up to not more than 0.1 mol %, preferably not more than 0.05 mol %, advantageously not more than 0.01 mol %, advantageously not more than 0.005 mol %, for some components advantageously not more than 0.003 mol %, based on one component in each case, may be possible. X here represents any component, for example $PbO$. These limits mentioned do not relate to the refining agents, for which specific impurity limits have been described above.

The glass ceramics according to the invention have high quartz solid solution as main crystal phase. The main crystal phase is the crystalline phase having the greatest percentage by volume in the crystal phase. High quartz solid solution is a metastable phase which, depending on the crystallization conditions, changes its composition and/or structure or is transformed to a different crystal phase. The high quartz-containing solid solutions have very low thermal expansion, or even falling thermal expansion with rising temperature. In an advantageous execution, the crystal phase does not contain any β-spodumene or any keatite.

Advantageous executions of the LAS glass ceramic have a crystal phase content of less than 70% by volume and/or advantageously more than 45% by volume. The crystal phase consists of high quartz solid solution, which is also called β-eucryptite solid solution. The average crystallite size of the high quartz solid solution is advantageously <100 nm, preferably <80 nm, with preference <70 nm. The effect of the small crystallite size is that the glass ceramic is transparent and can also be better polished. In some advantageous variants, the average crystallite size of the high quartz solid solution can be ≤60 nm, preferably ≤50 nm. The crystal phase, the proportion thereof and the average crystallite size are determined in a known manner by means of x-ray diffraction analysis.

In one embodiment of the present invention, a transparent glass ceramic is produced. As a result of the transparency, it is possible to better assess many properties of such a glass ceramic, especially of course the internal quality thereof. The glass ceramics according to the invention are transparent, meaning that they have an internal transmission of at least 70% in the wavelength range from 350 to 650 nm. $B_2O_3$ and/or higher contents of fluorine can reduce transparency. Therefore, advantageous variants do not contain one or both of the components mentioned. Moreover, the glass ceramics produced in the context of the invention are free of pores and cracks. In the context of the invention, what is meant by "pore-free" is a porosity of less than 1%, preferably less than 0.5%, more preferably von less than 0.1%. A crack is a gap, i.e. discontinuity, in an otherwise continuous structure.

In order to enable the manufacture of a homogeneous glass ceramic in industrial scale production plants, it is advantageous when the processing temperature Va of the parent green glass of the glass ceramic (and hence of the glass ceramic) is advantageously not more than 1330° C., preferably not more than 1320° C. Some advantageous variants may have a processing temperature of not more than 1310° C. or not more than 1300° C. or less than 1300° C. The processing temperature Va is the temperature at which the melt has a viscosity of $10^4$ dPas. Homogeneity relates especially to the homogeneity of the CTE of the glass ceramic over a large volume, and a small number, preferably freedom from, inclusions such as bubbles and particles. This is a quality feature of the glass ceramic and is a prerequisite for use in precision components, especially in very large precision components.

The processing temperature is determined by the composition of the glass ceramic. Since the glass network-forming $SiO_2$ component in particular is regarded as a crucial component for increasing the viscosity and hence the processing temperature, the maximum $SiO_2$ content should be chosen in accordance with the above specifications.

CTE

The glass ceramics according to the invention have zero expansion (see Table 1), meaning that they have an average coefficient of thermal expansion CTE in the range from 0 to 50° C. of at most $0±0.1×10^{-6}$/K. Some advantageous variants even have an average CTE in the range from 0 to 50° C. of at most $0±0.05×10^{-6}$/K. For particular applications, it may be advantageous when the average CTE over a wider temperature range, for example in the range from –30° C. to +70° C., preferably in the range from −40° C. to +80° C., is at most 0±0.1×10⁻⁶/K, i.e. there is zero expansion.

For determination of the CTE-T curve of the glass ceramics and precision components according to the invention and of the comparative examples, the differential CTE(T) is first determined. The differential CTE(T) is defined as a function of temperature. The CTE is then defined according to the following formula (1):

$$CTE(T) = (1/l_0) \times (\partial l / \partial T) \tag{1}$$

For creation of a $\Delta l/l_0$-T curve or an expansion curve or plot of the change in length $\Delta l/l_0$ of a test specimen (glass ceramic or precision component) against temperature, it is possible to measure the temperature-dependent change in length of the length of a test specimen from the starting length $l_0$ at the starting temperature $t_0$ to the length $I_t$ at the temperature t. It is preferable here to choose small temperature intervals of, for example, 5° C. or 3° C. or 1° C. for determination of a measurement point. Such measurements may be conducted, for example, by dilatometry methods, interferometry methods, for example the Fabry-Perot method, i.e. the evaluation of the shift in the resonance peak of a laser beam injected into the material, or other suitable methods. In the context of the invention, the dilatometry method with a temperature interval of 1° C. on rod-shaped samples of the test specimens with length 100 mm and diameter 6 mm was chosen to ascertain the CTE. The chosen method of determining the CTE has an accuracy of preferably at least ±0.05 ppm/K, with preference of at least ±0.03 ppm/K. The CTE may of course also be determined by methods having an accuracy of at least ±0.01 ppm/K, with preference at least ±0.005 ppm/K or in some embodiments even of at least ±0.003 ppm/K or at least ±0.001 ppm/K.

The $\Delta l/l_0$-T curve is used to calculate the average CTE for a particular temperature interval, for example for the temperature range of 0° C. to 50° C.

A CTE-T curve is determined via the derivative of the $\Delta l/l_0$-T curve. The CTE-T curve can be used to determine the zero crossing, the slope of the CTE-T curve within a temperature interval. The CTE-T curve is used to determine the shape and position of any advantageous CTE plateau formed in some variants (see below and FIGS. 21, 23 and 25).

An advantageous embodiment of a precision component comprising a glass ceramic according to the invention (especially in the form of a substrate) has high CTE homogeneity. The value of CTE homogeneity ("total spatial variation of CTE") is understood to mean what is called the peak-to-valley value, i.e. the difference between the respective highest and lowest CTE values of the samples taken from a precision component. CTE homogeneity is thus based not on the CTE of the material of the component but on the spatial variation of the CTE over the section under consideration or the entire precision component. For determination of CTE homogeneity, a multitude of samples is taken from different sites in a precision component and the CTE value is determined for each, reported in ppb/K, where 1 ppb/K=0.001×10⁻⁶/K. CTE homogeneity, i.e. the spatial variation of the CTE, over the entire precision component, is advantageously at most 5 ppb/K, preferably at most 4 ppb/K, most preferably at most 3 ppb/K. A method of ascertaining CTE homogeneity and measures for achieving CTE homogeneity are described in WO 2015/124710 A, the disclosure-content of which is incorporated into this application in full.

Thermal Hysteresis

Figure 10:
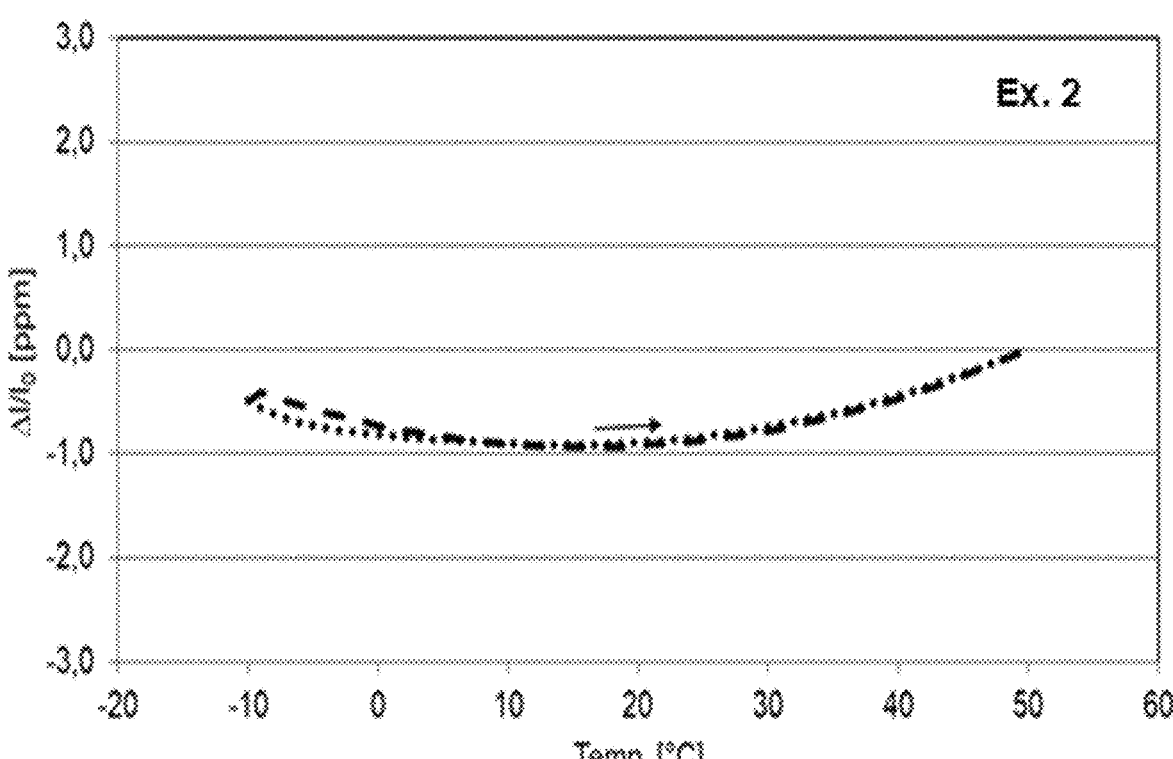
FIGS. 10 to 12 show hysteresis curves of glass ceramics according to the invention (compositions according to Ex. 2, Ex. 6 and Ex. 7 in Table 1), each of which can be used for production of a precision component according to the invention and which have thermal hysteresis at least within the temperature range of 10-35° C. of <0.1 ppm (dashed=cooling curve, dotted=heating curve).
Figure 11:
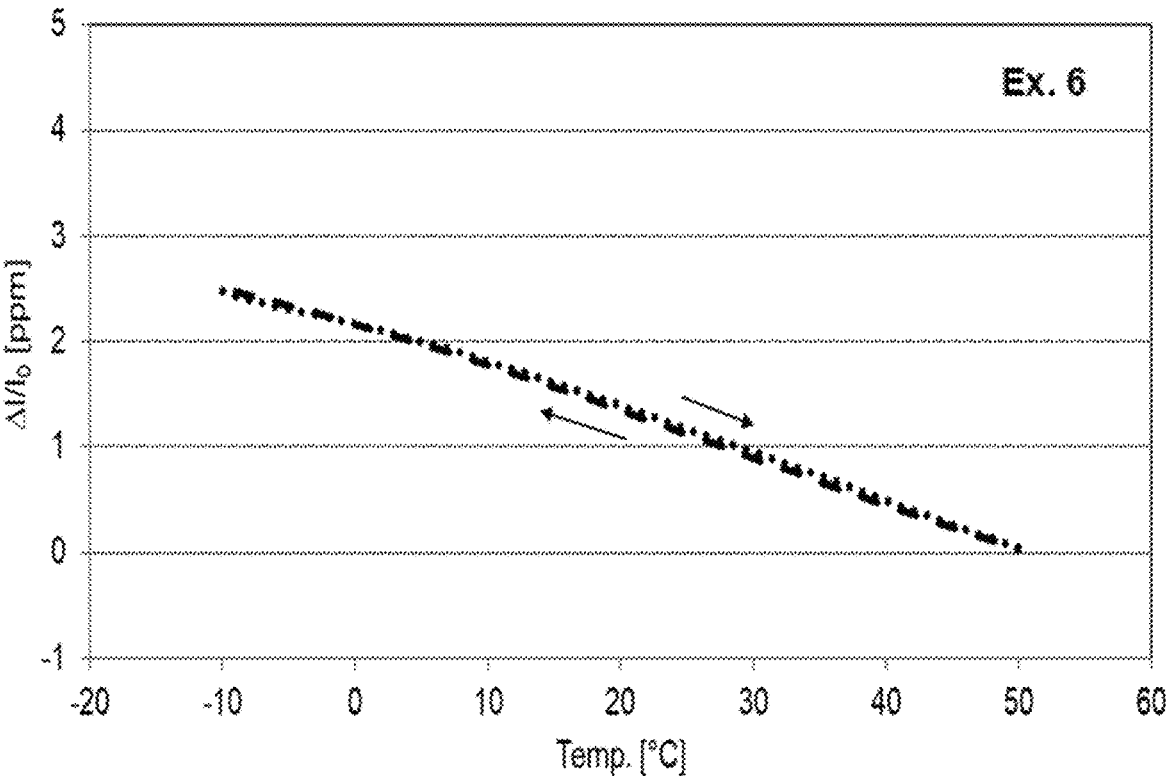
Figure 12:
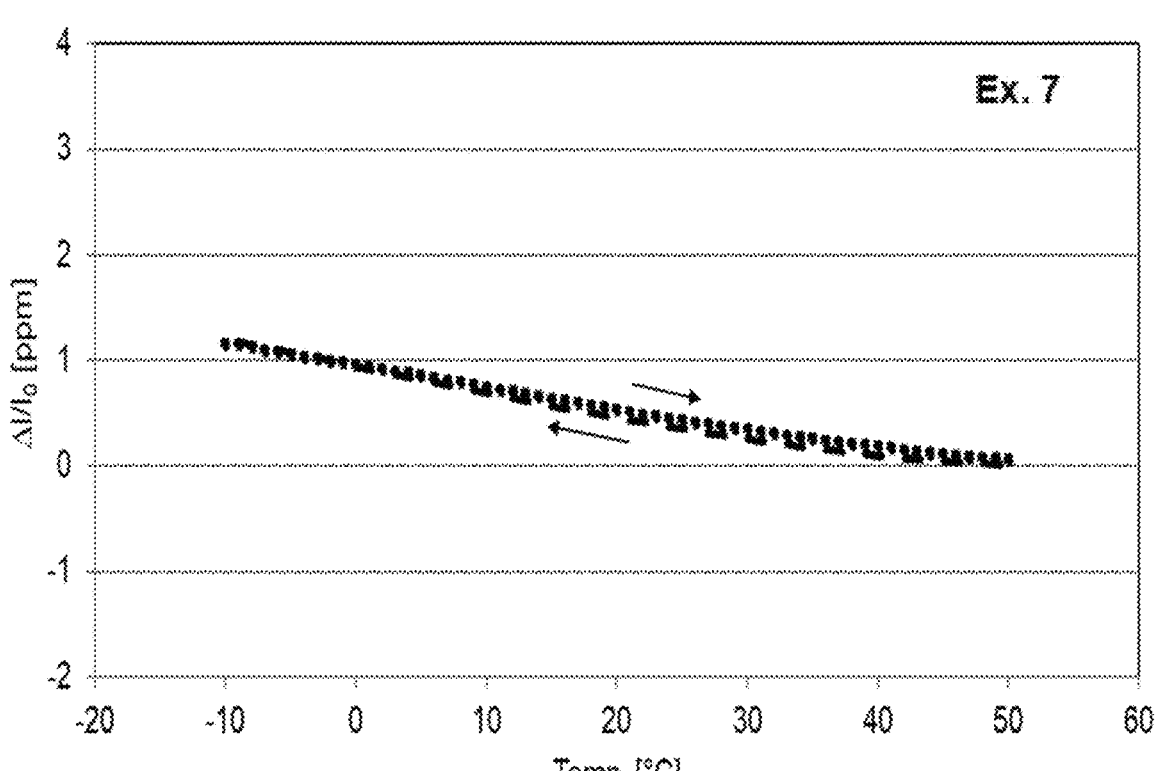

In the context of the invention, the glass ceramic, at least within the temperature range of 10° C. to 35° C., has thermal hysteresis of <0.1 ppm and is therefore hysteresis-free (see FIGS. 10 to 12). Thus, at any temperature within the temperature interval of 10° C. to 35° C., the glass ceramic, once it has been subjected to a change in temperature, shows an isothermal change in length of less than 0.1 ppm at a subsequently constant temperature.

In advantageous embodiment, this freedom from hysteresis is preferably at least within a temperature range from 5 to 35° C., preferably at least within the temperature range from 5 to 45° C., preferably at least within the temperature range from >0° C. to 45° C., with preference at least within the temperature range from −5° C. to 50° C. More preferably, the temperature range for the freedom from hysteresis is even broader, such that the material or component is also suitable for applications at temperatures up to at least 100° C. and advantageously also even higher. More preferably, the temperature range for the freedom from hysteresis is even broader. Preferred application temperatures are in the range of −60 to 100° C., more preferably of −40° C. to +80° C. Particular variants of the present invention relate to glass ceramics and precision components for application temperatures $T_A$, for example, in the range of 5° C. to 20° C. or $T_A$ of 22° C., 40° C., 60° C., 80° C. and 100° C., which are preferably hysteresis-free even at these temperatures as well.

Thermal hysteresis was determined for the glass ceramics and precision components according to the invention and for the comparative examples using a precision dilatometer capable of ascertaining the CTE with a reproducibility of ±0.001 ppm/K and ±0.003 ppm/K absolute, with a temperature interval of 1° C., on rod-shaped samples of length 100 mm and diameter 6 mm of the test specimens (i.e. sample of the precision component or sample of the glass ceramic), in accordance with the method and apparatus construction disclosed in DE 10 2015 113 548 A, the disclosure-content of which is incorporated into this application in full. For every sample examined, the change in length $\Delta l/l_0$ was determined as a function of temperature between 50° C. to −10° C., cooling at a cooling rate of 36 K/h. After an isothermal hold time of 5 hours at −10° C., the sample was heated at a heating rate of 36 K/h to 50° C., and the change in length $\Delta l/l_0$ was recorded as a function of temperature. The thermal hysteresis characteristics of a test specimen are considered at −5° C., 0° C., 5° C., 10° C., 22° C., 35° C., 40° C. These points are representative of the temperature range from −10° C. to 50° C., since hysteresis decreases with rising temperature within the temperature interval mentioned. Thus, a sample which is hysteresis-free at 22° C. or 35° C. also shows no hysteresis in the range up to 50° C.

For determination of thermal hysteresis at 10° C., the individual measurement values of the change in length for the five temperatures of 8° C., 9° C., 10° C., 11° C. and 12° C., i.e. two temperature points above and two temperature points below 10° C., were recorded both in the course of heating and in the course of cooling of the sample within the range of −10° C. to 50° C. at the rate of 36 K/h. The differences between the measurement values for heating curve and cooling curve at these five measurement points were used to form the average, which is listed in the tables as "Hyst.@10° C." in the unit [ppm].

For determination of thermal hysteresis at 35° C., correspondingly, the individual measurement values of change in length for the five temperatures 33° C., 34° C., 35° C., 36° C. and 37° C., i.e. two temperature points above and two temperature points below 35° C., were recorded both in the course of heating and in the course of cooling of the sample within the range of −10° C. to 50° C. at the rate of 36 K/h. The differences between the measurement values for heating curve and cooling curve of these five measurement points were used to form the average, which is listed in the tables as "Hyst.@35° C." in the unit [ppm].

The corresponding procedure was followed for the other abovementioned temperature points.

The FIGURES show thermal hysteresis curves of glass ceramics according to the invention (FIGS. 10 to 12) and of known glass ceramics (FIGS. 2 to 9). For better comparability, a range of 6 ppm was always chosen on the y axis for the representation in the FIGURES.

FIGS. 2 to 8 show the thermal hysteresis curves of known materials that are used for precision components. The cooling curves (dashed) and heating curves (dotted) are each clearly spaced apart from one another specifically at lower temperatures, i.e. they have a distinctly separate progression. At 10° C., the difference is more than 0.1 ppm, and depending on the comparative example up to about 1 ppm. In other words, the materials and the precision components manufactured therefrom show considerable thermal hysteresis within the relevant temperature range of at least 10 to 35° C.

Figure 6:
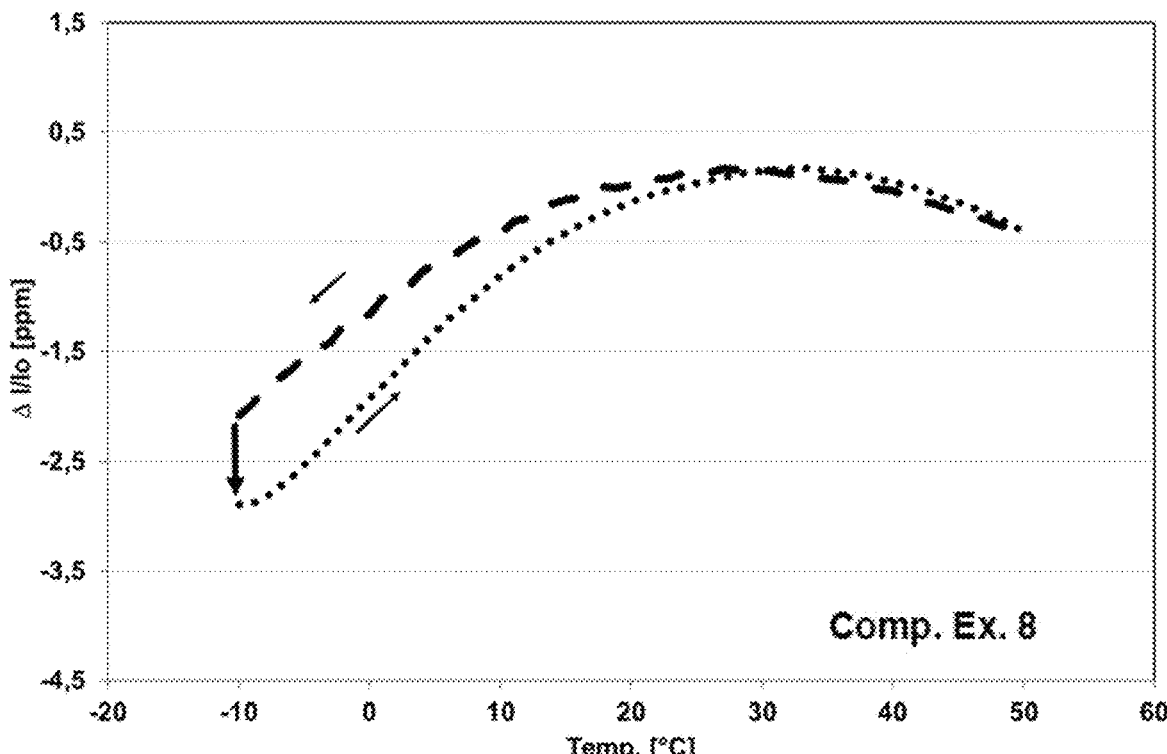
Figure 7:
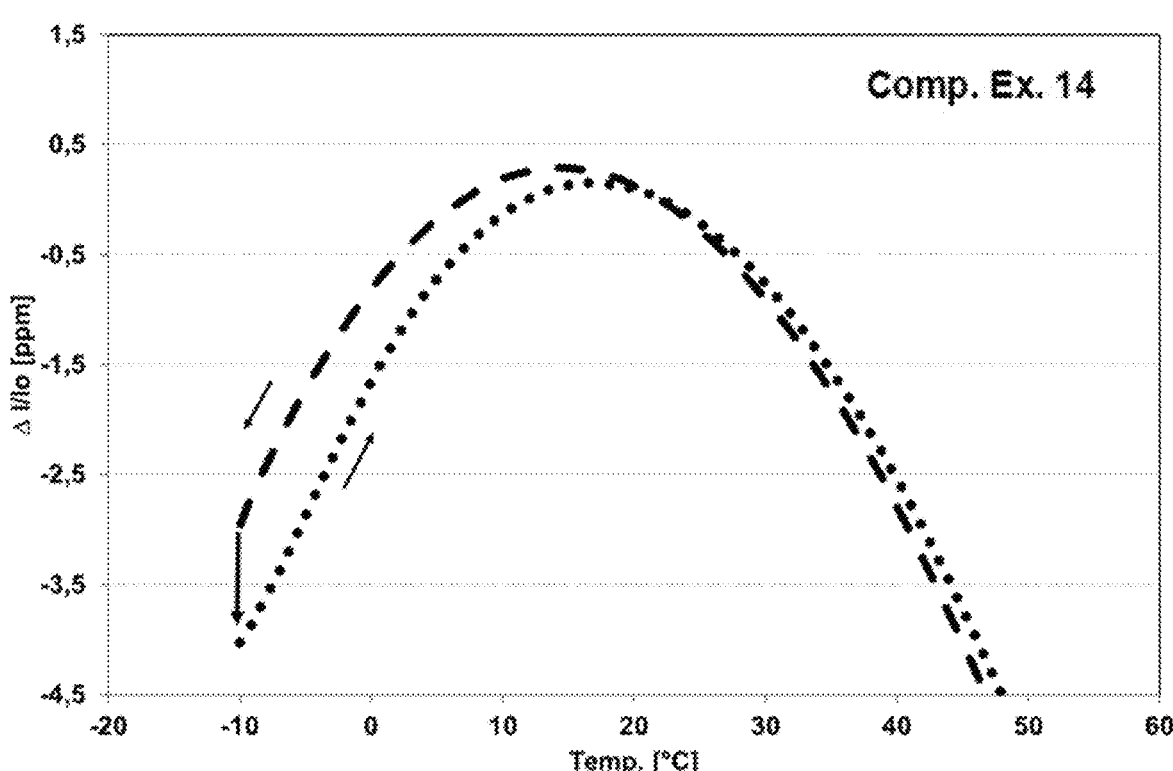
Figure 8:
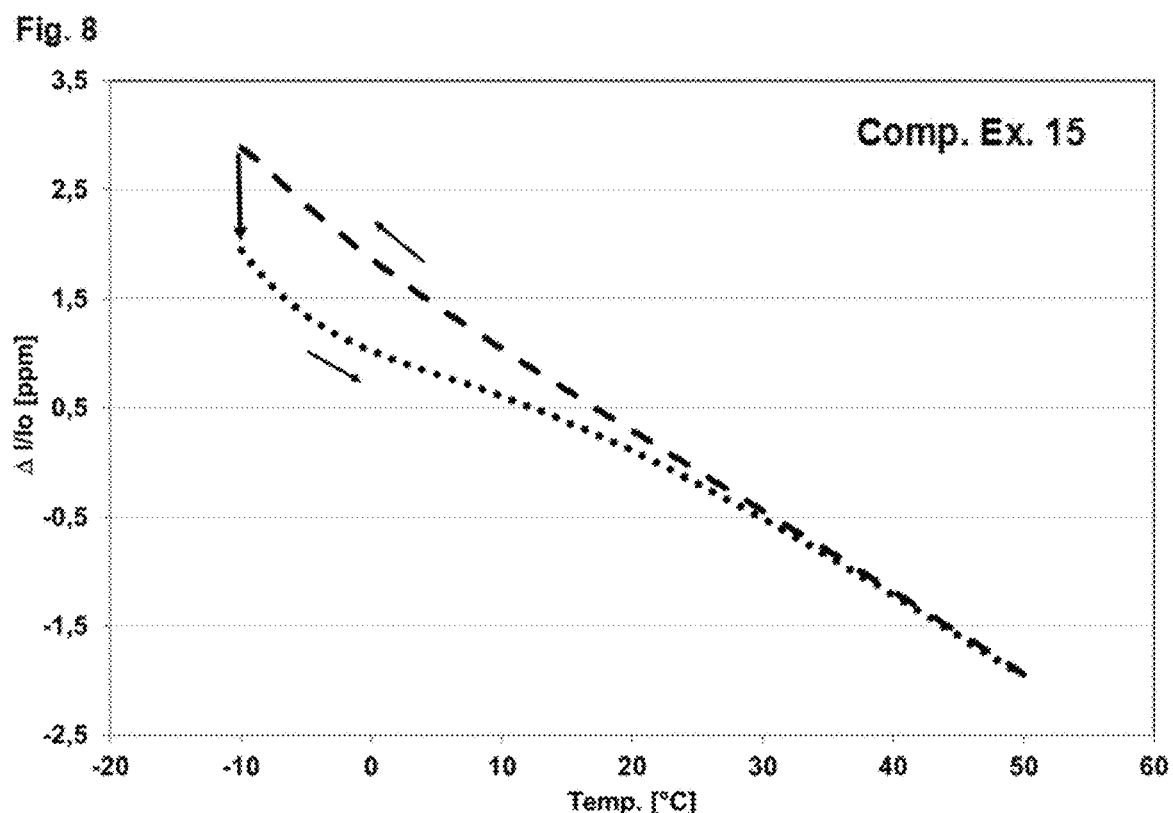
Figure 9:
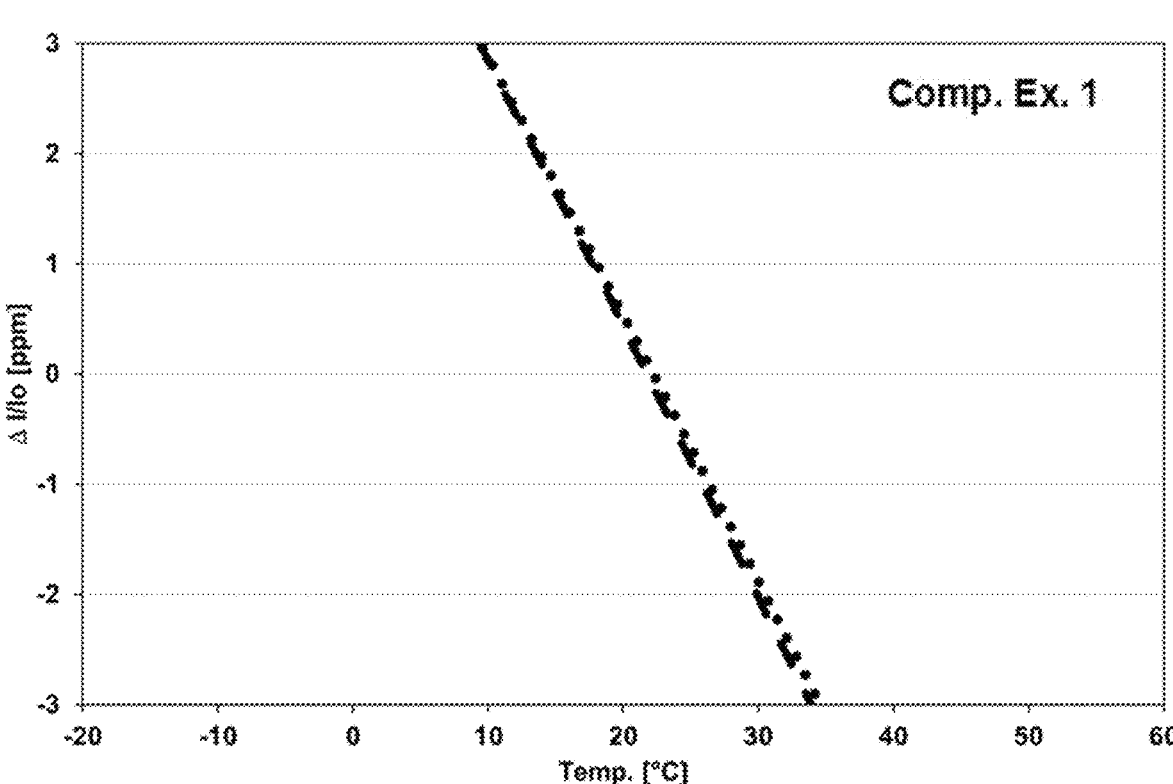
FIG. 9 shows the hysteresis curve (dashed=cooling curve, dotted=heating curve) of a prior art glass ceramic which can be used for production of a precision component and which has thermal hysteresis at least within the temperature range of 10-35° C. of <0.1 ppm, but the steep progression of the curve shows that the glass ceramic does not have zero expansion.

The LAS glass ceramics examined that are shown in FIGS. 2 to 5 (Comparative Examples 7, 9 and 10 in Table 2) all contain MgO and ZnO and have thermal hysteresis over wide ranges within the temperature interval of 10° C. to 35° C. FIGS. 6 and 7 show the hysteresis curves of LAS glass ceramics (Comparative Examples 8 and 14 in Table 2) that are MgO-free but ZnO-containing. Both materials show significantly increasing thermal hysteresis below 15° C. FIG. 8 shows the hysteresis curve of a LAS glass ceramic (Comparative Example 15 in Table 2) that is ZnO-free but MgO-containing. This material likewise shows significantly increasing thermal hysteresis below 15° C. As apparent in FIG. 9, this known material (Comparative Example 1 in Table 2) does not have thermal hysteresis, but the steep curve progression shows that it is not a zero-expansion material. The average CTE here is −0.24 ppm/K.

LAS glass ceramics and precision components according to the invention have a very low content of MgO and/or ZnO or are preferably free of MgO and ZnO. As apparent in FIGS. 10 to 12, the heating curves and cooling curves are superposed at least within the temperature range of 10° C. to 35° C., meaning that the glass ceramics are hysteresis-free. However, the materials are hysteresis-free not only within the range of 10° C. to 35° C., but likewise at least within the range of 5 to 35° C. or 5 to 45° C., preferably at least within the range of >0° C. to 45° C. Examples 6 and 7 from FIGS. 11 and 12 are also hysteresis-free at least within the temperature range of −5° C. to 50° C.

Further Expansion Properties

Advantageous Embodiments of the Invention have Further Advantageous Expansion Features:

For description of the expansion characteristics of a test specimen (glass ceramic or precision component), a TCL value is frequently reported, with TCL meaning "total change of length". In the context of the invention, the TCL value is reported for the temperature range of 0° C. and 50° C. It is ascertained from the normalized $\Delta l/l_0$-T curve (also $dl/l_0$-T curve in the FIGURES) of the respective test specimen, with "normalized" meaning that the change in length at 0° C. is 0 ppm. The $\Delta l/l_0$-T curve for the determination of TCL is created by the same method as described above in connection with the determination of CTE in the context of the invention.

The TCL value is the distance between the highest $dl/l_0$ value and the lowest $dl/l_0$ value within this temperature range:

$$TCL(0; 50° C.) = |dl/l_0 \text{max.}| + |dl/l_0 \text{min.}| \qquad (2)$$

where "dl" denotes the change in length at the respective temperature and "$l_0$" the length of the test specimen at 0° C. The calculation is based in each case on the absolute values of the $dl/l_0$ values.

FIGS. 16 to 19 show expansion curves of known materials, from which the $dl/l_0$ max. values and $dl/l_0$ min. values can each be read off for calculation of the TCL value (see also below). The expansion curves each show a curved progression within the temperature range of 0° C. to 50° C.

Figure 13:
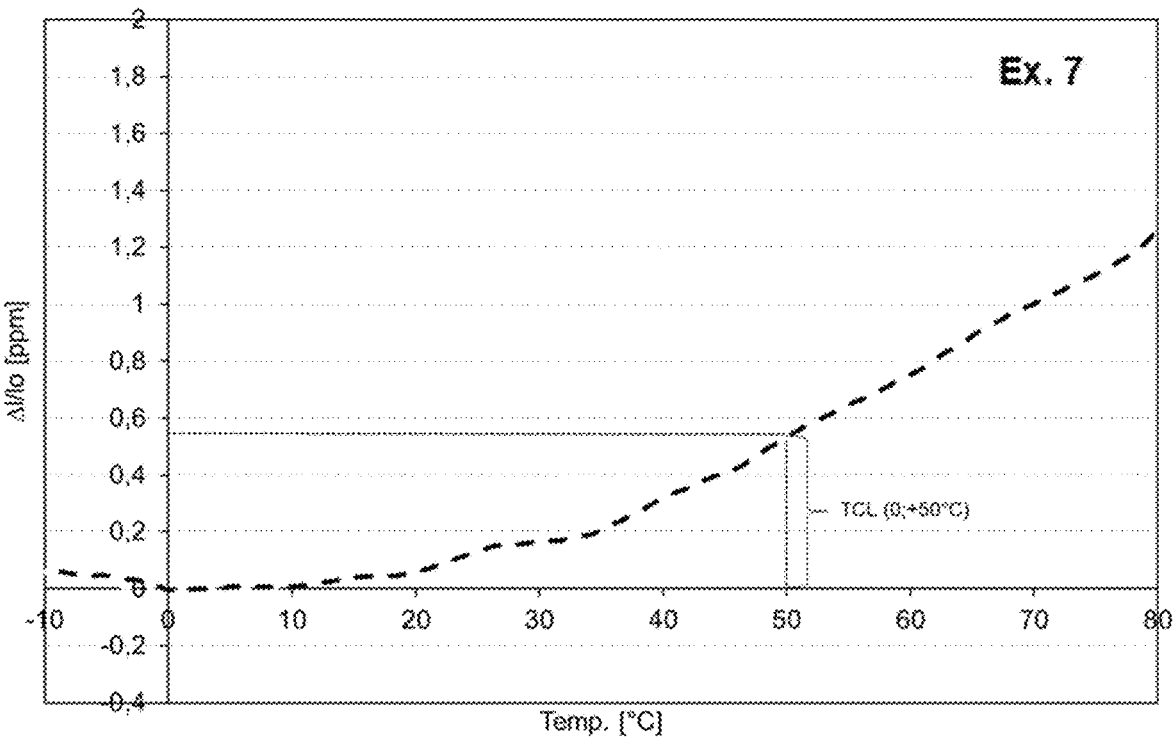
FIG. 13 shows a normalized $\Delta l/l_0$-T curve (also called $dl/l_0$ curves) of a glass ceramic according to the invention (composition according to Ex. 7 in Table 1) and reference lines for ascertaining the index F as a measure of the flatness of the expansion curve within the temperature range from 0° C. to 50° C.
Figure 14:
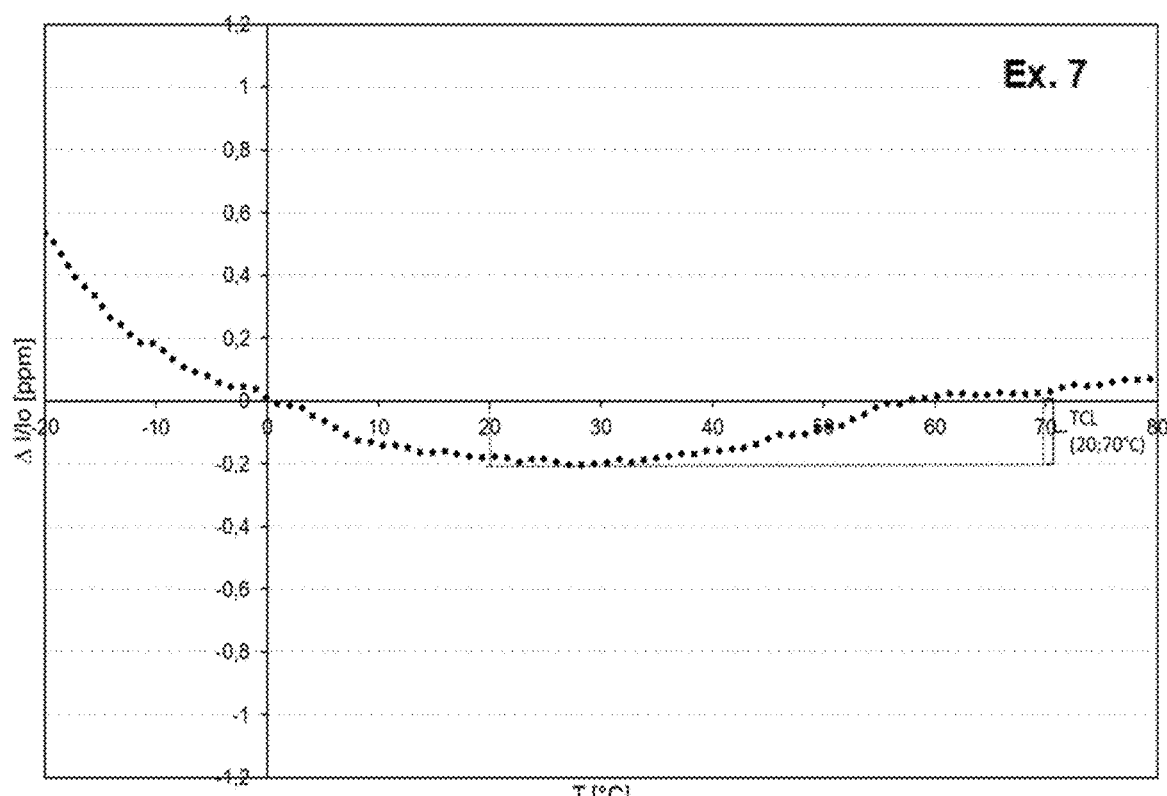
FIG. 14 shows another normalized $\Delta l/l_0$-T curve of a glass ceramic according to the invention (composition according to Ex. 7 in Table 1) based on a different ceramization and reference lines for ascertaining the alternative index $f_{(20; 70)}$ as a measure of the flatness of the expansion curve within the temperature range from 20° C. to 70° C.
Figure 15:
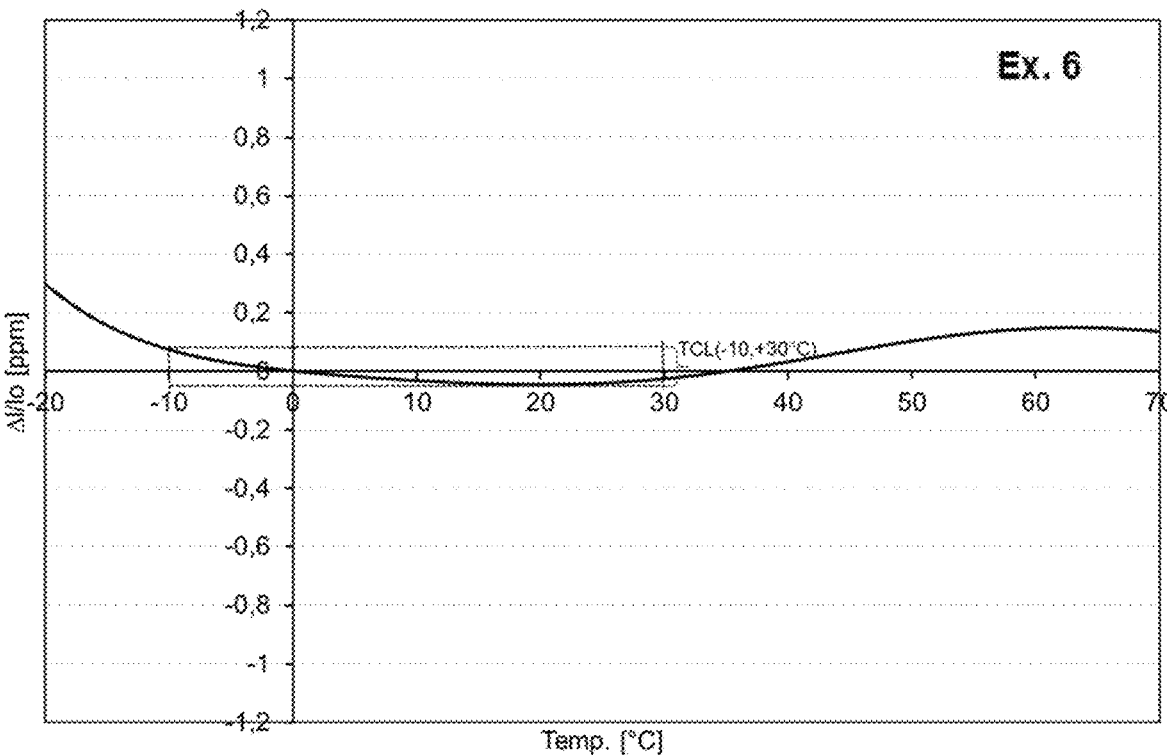
FIG. 15 shows a normalized $\Delta l/l_0$-T curve (also called $dl/l_0$ curves) of a glass ceramic according to the invention (composition according to Ex. 6 in Table 1) and reference lines for ascertaining the alternative index $f_{(10; 30)}$ as a measure of the flatness of the expansion curve within the temperature range from −10° C. to 30° C.

In the context of the present invention, by contrast, a flat progression of the expansion curves within the temperature range of 0° C. to 50° C. is an advantageous feature of the glass ceramic and of a precision component (see FIGS. 13 to 15). For some advantageous variants, depending on the field of use of the component, a flat progression of the expansion curve may also be desirable for another temperature range, especially within a range of (20; 40), (20; 70) and/or (−10; 30).

As a statement as to the extent to which the curved progression of the thermal expansion differs from a simple linear progression, for an advantageous embodiment of the invention, the index F is introduced as a measure of the flatness of the expansion curve, which enables a classification of CTE curves:

$$F=TCL(0; 50° C.)/|\text{expansion}(0; 50° C.)| \qquad (3)$$

The index F is calculated by forming the quotient of the TCL (0; 50) value [in ppm] (see above) and the difference in expansion between the temperature points of 0° C. and 50° C. [in ppm]. Since the expansion curve for the determination of TCL is normalized by definitions such that the change in length at 0° C. is 0 ppm, the "difference in expansion between the temperature points of 0° C. and 50° C." corresponds to the "expansion at 50° C.", as stated in the tables. The index F is calculated using the absolute value of the expansion at 50° C.

It is advantageous here when the index F for the respective material or component is <1.2, preferably <1.1, with preference at most 1.05. The closer the index F is to 1, the flatter the expansion curve.

It is apparent in FIGS. 13 to 15 that advantageous embodiments of the LAS glass ceramic have a flat progression of the expansion curve (e.g. F=1) within the temperature range of 0° C. to 50° C. and preferably also within the broader temperature range of −10° C. to 70° C. By comparison, FIGS. 16 to 20 show that known materials show a significantly steeper and more curved progression of the expansion curves within the considered temperature ranges.

FIG. 13 shows, by way of example, the expansion curve of an advantageous glass ceramic with reference to an advantageous ceramization (temperature not more than 830° C., duration 3 days) of Example 7. For the representation, a section of 2.4 ppm on the y axis was chosen. The highest expansion value ($dl/l_0$ max.) is at +50° C. ($dl/l_0$ is +0.57 ppm, i.e. |0.57 ppm|); the lowest expansion value ($dl/l_0$ min.) is 0 ppm. The difference in expansion between the temperature points of 0° C. and 50° C., corresponding to the absolute value of the "expansion at 50° C." is 0.57 ppm. This is used to calculate the index F for this material as follows: F (Example 7 from Table 1)=0.57 ppm/0.57 ppm=1.

FIG. 14 likewise shows an advantageously flat progression of the expansion curve within the temperature range of −10° C. to 80° C. for a different ceramization of a glass ceramic of Example 7 from Table 1 (temperature not more than 825° C., duration 3 days). Such advantageous expansion characteristics are also shown by FIG. 15 for Example 6.

Advantageous glass ceramics and precision components of the invention thus have, for example within the temperature range from 0° C. to 50° C., a very flat progression of their expansion curves, meaning that they not only have zero expansion in the considered temperature range but also have a low variation in the change in linear expansion and hence in the differential CTE within this range. As apparent in FIGS. 14 and 15, advantageous examples of the invention also have a flat progression of their expansion curves over an even broader temperature range (here by way of example from −10° C. to +70° C. or +80° C.). By comparison, see the significantly steeper progressions of the expansion curves of known materials based on the same temperature range in FIG. 20. The expansion characteristics can also be observed in other selected temperature ranges, especially (−10; 30), (20; 40), (20; 70), which is described further down.

By comparison with the advantageous embodiments of the glass ceramics and precision components, FIGS. 16 to 19 show the expansion characteristics of known materials and precision components manufactured therefrom, from each of which the index F can be calculated. The expansion characteristics of the materials or precision components, as shown in FIGS. 16 to 20, were ascertained with the same dilatometer under comparable conditions as the expansion characteristics of the advantageous embodiments of the glass ceramics shown in FIGS. 13 to 15. Overall, the known materials show a curved progression of the expansion curves.

Figure 16:
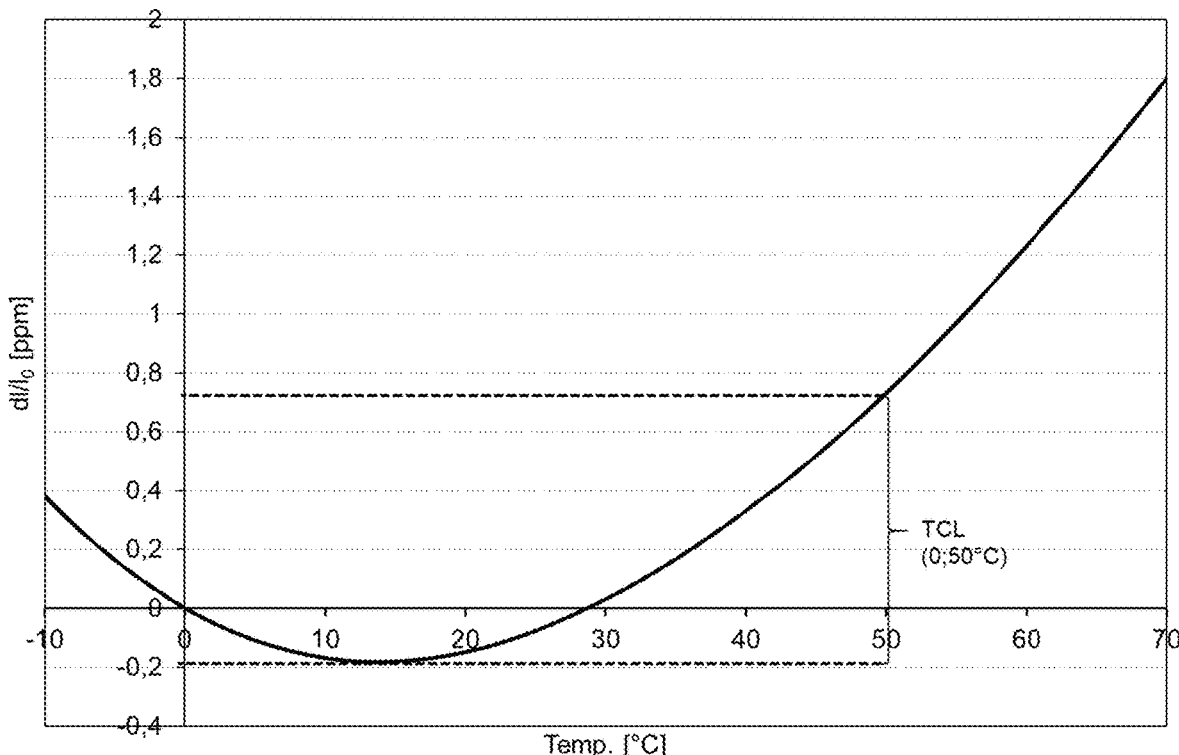
FIGS. 16 to 19 show normalized $\Delta l/l_0$-T curves of known materials that can be used for production of known precision components and reference lines for ascertaining the index F as a measure of the flatness of the expansion curve within the temperature ranges from −20° C. or −10° C. to 70° C. or 80° C.
Figure 17:
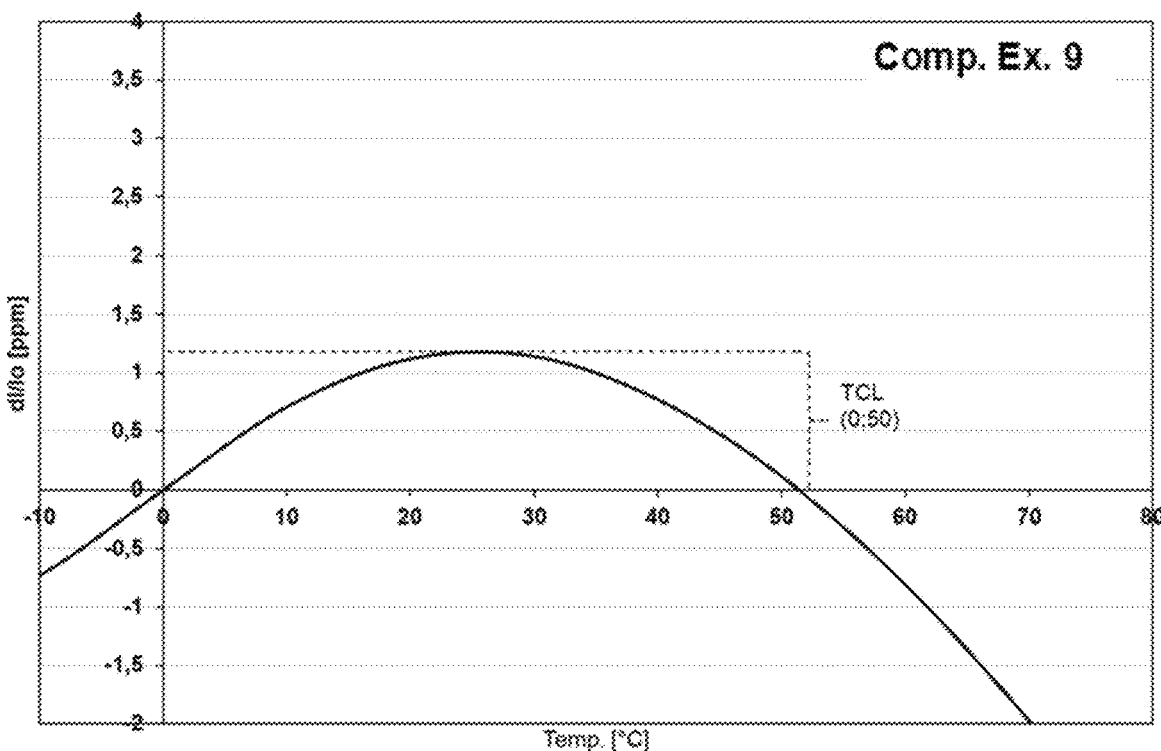
Figure 18:
Figure 18:
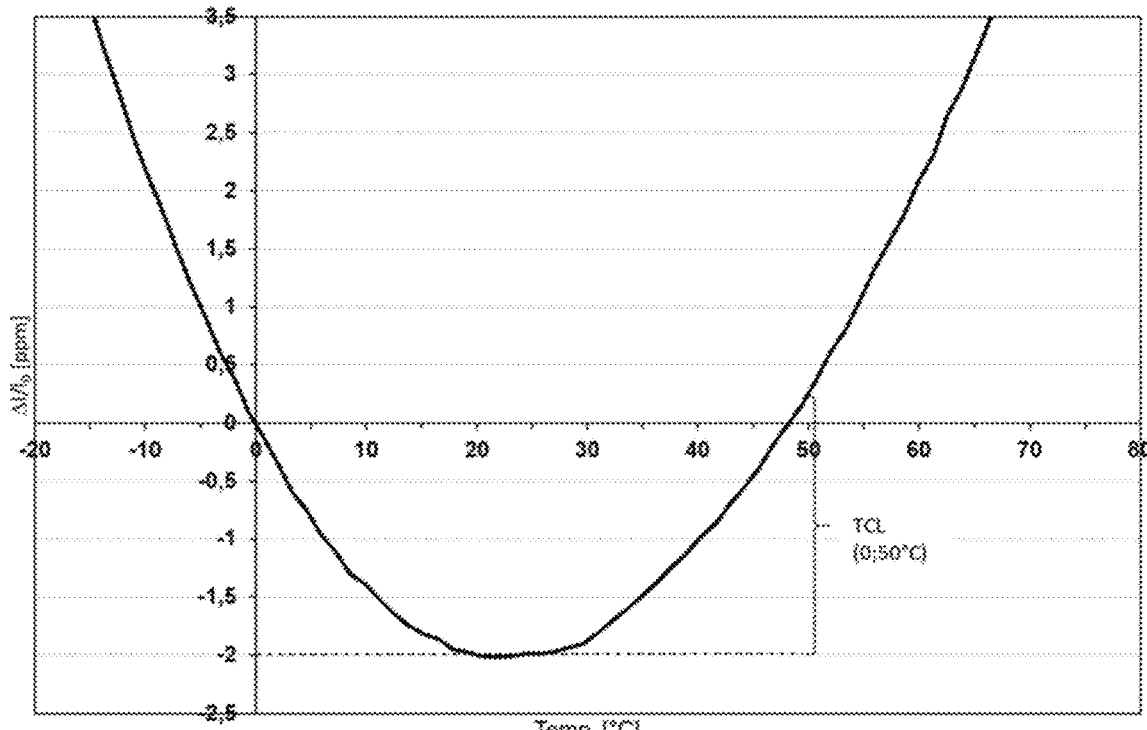
Figure 19:
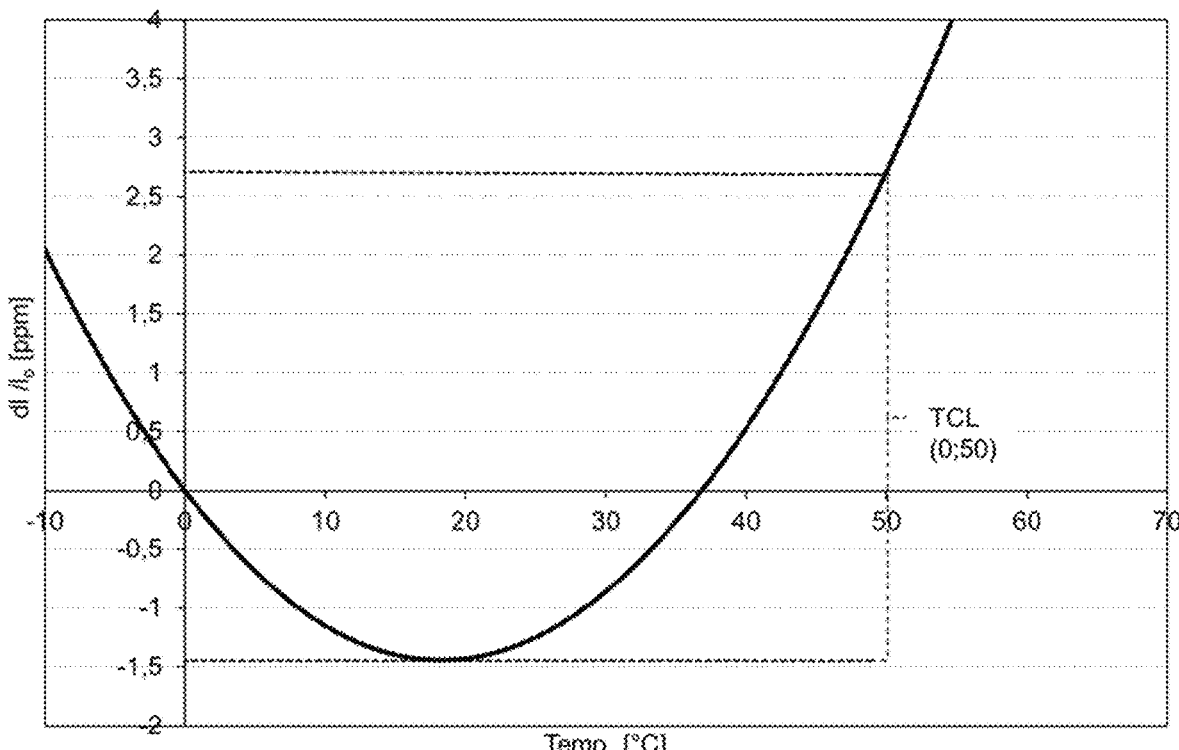
Figure 20:
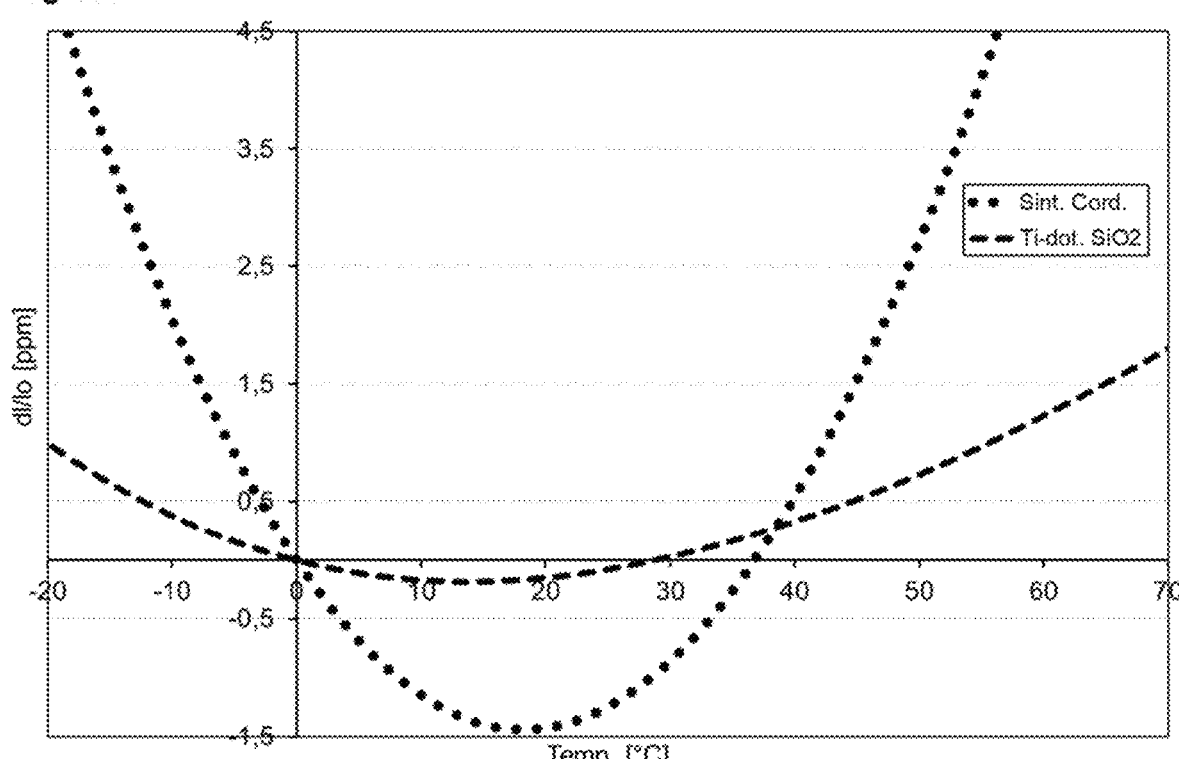
FIG. 20 shows normalized $\Delta l/l_0$-T curves of known materials within the temperature range from −20° C. to +70° C.

FIG. 16 shows the expansion curve of a commercially available titanium-doped quartz glass in the same $dl/l_0$ section as in FIGS. 13 to 15. As is apparent, the sum of the absolute values of the expansion value here at +50° C. ($dl/l_0$ max. is +0.73 ppm, i.e. |0.73 ppm|) and the expansion value at 14° C. ($dl/l_0$ min. is −0.19 ppm, i.e. |0.19 ppm'|) give a TCL(0; 50) value of around 0.92 ppm. The difference in expansion between the temperature points of 0° C. and 50° C., corresponding to the absolute value of the "expansion at 50° C.", is 0.73 ppm. These are used to calculate the index F for this material as follows: F (titanium-doped $SiO_2$)=0.92 ppm/0.73 ppm=1.26.

The index F is calculated correspondingly for a known LAS glass ceramic or for a corresponding precision component (see FIG. 17) as follows: F (known LAS glass ceramic)=1.19 ppm/0.11 ppm=10.82.

The index F is calculated correspondingly for a known cordierite glass ceramic or a corresponding precision component (see FIG. 18) as follows: F (known cordierite glass ceramic)=2.25 ppm/0.25 ppm=9.

The index F is calculated correspondingly for a known sintered cordierite ceramic or a corresponding precision component (see FIG. 19) as follows: F (known sintered cordierite ceramic)=4.2 ppm/2.71 ppm=1.55.

Glass ceramics having a flat progression of the expansion curves are very advantageous since it is then possible not just to optimize a precision component for the later application temperature, but also for it to have likewise low thermal expansion, for example, under higher and/or lower thermal loads, for example during production. Precision components for microlithography, EUV microlithography (also "EUV lithography" or "EUVL" for short) and metrology are typically used under standard cleanroom conditions, especially a room temperature of 22° C. The CTE may be matched to this application temperature. However, such components are subjected to various process steps, for example coating with metallic layers, or cleaning, structuring and/or exposure processes, in which temperatures may be higher or in some cases lower than those that prevail in the later use in a cleanroom. Advantageous glass ceramics and precision components manufactured therefrom that have an index F of <1.2 and hence optimized zero expansion not just at application temperature but also at possibly higher and/or lower temperatures in production are thus very advantageous. Properties such as freedom from hysteresis and an index F<1.2 are particularly advantageous if the precision component or a glass ceramic is used in EUV lithography, i.e. if, for example, the precision component is a EUVL mirror or EUVL mask blank or a corresponding substrate therefor, since particularly the mirrors or masks in EUV lithography are heated by the irradiation with high-energy radiation in a very inhomogeneous manner locally or in beam direction. For such use conditions, it is advantageous when the precision component or glass ceramic has a low slope of the CTE-T curve within a temperature range around the application temperature (see below).

It is a feature of advantageous glass ceramics and precision components that are even better optimized to a later application temperature at 20 or 22° C. that they have a relative change in length ($dl/l_0$) of ≤|0.10| ppm, preferably of ≤|0.09| ppm, particularly preferably of ≤|0.08| ppm and especially preferably of ≤|0.07| ppm within the temperature range from 20° C. to 30° C. and/or a relative change in length ($dl/l_0$) of ≤|0.17| ppm, preferably of ≤|0.15| ppm, particularly preferably of ≤|0.13| ppm and especially preferably of ≤|0.11| ppm within the temperature range from 20° C. to 35° C. Alternatively or additionally, it may be a feature of such optimized glass ceramics and precision components that they have a relative change in length ($dl/l_0$) of 10.301 ppm, preferably of ≤|0.25| ppm, particularly preferably of ≤|0.20| ppm and especially preferably of ≤|0.15| ppm within the temperature range from 20° C. to 40° C. The features relating to the relative change in length based on the different temperature intervals may preferably be inferred from the $dl/l_0$ curves of FIGS. 13 to 19. Of course a statement of relative change of length ($dl/l_0$) relates to the absolute value of the respective value.

A zero-expansion, hysteresis-free material having such advantageous expansion characteristics is particularly suitable for use as a substrate for an EUVL mirror or as an EUVL mirror which is heated up to different degrees in operation, for example as a result of the respective exposure mask, in regions of light and shadow. On account of the abovementioned low relative change in length, an EUVL mirror formed from the advantageous glass ceramic has lower local gradients (or local slopes) in the topography of the mirror surface than an EUVL mirror manufactured with known materials. The same is analogously applicable to EUVL mask blanks or EUVL masks or EUVL photomasks.

Especially in the case of a glass ceramic that shows a very flat progression of the expansion curve within the considered temperature range that is close to 0 ppm or fluctuates around 0 ppm—which constitutes advantageous expansion characteristics overall—it may be advantageous, alternatively or additionally to the index F, to introduce a further measure of the flatness of the expansion curve in which the expansion curve is considered not in the temperature range of (0; 50) but within a different temperature interval (T.i.), preferably within the temperature range of (20; 40), (20; 70) and/or (−10; 30). This enables the classification of the expansion characteristics in relation to the later fields of use.

The alternative index $f_{T.i.}$ has the unit (ppm/K) and is defined as:

$$f_{T.i.} = TCL_{(T.i.)}/\text{width of the temperature interval} (T.i.) \qquad (4)$$

where T.i. describes the considered temperature interval in each case.

The $TCL_{(T.i.)}$ value is the distance between the highest $dl/l_0$ value and the lowest $dl/l_0$ value within the considered temperature range (T.i.) in each case, where the expansion curve for the determination of the $TCL_{(T.i.)}$ is also normalized by definition such that the change in length is 0 ppm at 0° C. In other words, for example:

$$TCL_{(20;40° C.)} = |dl/l_0\text{max.}| + |dl/l_0\text{min.}| \qquad (5)$$

where "dl" denotes the change in length at the particular temperature and "$l_0$" the length of the test specimen at 0° C. The calculation is based in each case on the absolute values of the $dl/l_0$ values.

The alternative index $f_{T.i.}$ is calculated according to (4) by forming the quotient from the $TCL_{(T.i.)}$ value [in ppm] (see above) and the width of the temperature interval (T.i.) reported in [K] in which the difference in expansion is being considered. The width of the temperature interval considered between 20° C. and 40° C. is 20 K. If, by contrast, the progression of the expansion curve is considered within the interval T.i.=(20; 70) or (−10; 30), the divisor for formula (4) is 50 K and 40 K respectively.

In an advantageous embodiment the glass ceramic has an alternative index $f_{(20; 40)}$<0.024 ppm/K and/or an alternative index $f_{(20; 70)}$<0.039 ppm/K and/or an alternative index $f_{(−10; 30)}$<0.015 ppm/K.

Glass ceramics having a very flat progression of the expansion curves are very advantageous since it is then possible to optimize a precision component not just for the later application temperature but also, for example, for higher and/or lower thermal loads that can be expected. The alternative index $f_{T.i.}$ is suitable for defining a suitable material in accordance with the specifications required for particular component applications and for providing a corresponding precision component. Specific precision components and the uses thereof are described further down and are hereby incorporated as well.

In an advantageous embodiment of the glass ceramic or a component produced therefrom, it may be advantageous when the alternative index $f_{(20; 40)}$ is <0.024 ppm/K, preferably <0.020 ppm/K, preferably <0.015 ppm/K. A hysteresis-free, zero-expansion component having such expansion characteristics in the temperature range of (20; 40) has particularly good usability as precision component for microlithography and EUV microlithography at room temperature. Examples of such advantageous glass ceramics can be seen in FIGS. 14 and 15.

In an advantageous embodiment of the glass ceramic or a component produced therefrom, it may be advantageous when the alternative index $f_{(20; 70)}$ is <0.039 ppm/K, preferably <0.035 ppm/K, preferably <0.030 ppm/K, preferably <0.025 ppm/K, preferably <0.020 ppm/K. A hysteresis-free, zero-expansion component having such expansion characteristics within the temperature range of (20; 70) likewise has particularly good usability as precision component for microlithography and EUV microlithography. It is particularly advantageous when the component likewise has low thermal expansion even under high thermal loads that can occur, for example, during the production of the precision component, but also locally or over an area in operation. Further details of the thermal loads that occur in the EUVL precision components have already been described above in connection with the index F, to which reference is made here for avoidance of repetitions. One example of such an advantageous glass ceramic is shown in FIG. 14.

In an advantageous embodiment of the glass ceramic or a component produced therefrom, it may be advantageous when the alternative index $f_{(−10; 30)}$ is <0.015 ppm/K, preferably <0.013 ppm/K, preferably <0.011 ppm/K. A hysteresis-free, zero-expansion component having such expansion characteristics in the temperature range of (−10; 30) has particularly good usability as precision component, especially as mirror substrates for applications in which even lower temperatures than room temperature can occur, for example as mirror substrates in astronomy or observation of the Earth from space. Corresponding components are described further down. One example of such an advantageous glass ceramic is shown in FIG. 15.

A particularly advantageous embodiment of a glass ceramic or a component produced therefrom has an expansion curve for which at least 2 of the alternative indices $f_g$ are applicable.

A particularly advantageous embodiment of a glass ceramic or a component produced therefrom has an expansion curve for which Index F and at least one of the alternative indices $f_{(T.i.)}$ are applicable.

FIGS. 21 to 25 show that advantageous embodiments of the LAS glass ceramic and of the precision component have a CTE "plateau". A glass ceramic having a plateau, i.e. having optimized zero expansion over a broad temperature range, offers the same advantages that have already been described above in connection with the flat progression of the expansion curves and the index F.

It is advantageous when the differential CTE has a plateau close to 0 ppm/K, meaning that the differential CTE within a temperature interval $T_p$ having a width of at least 40 K, preferably at least 50 K, is less than 0±0.025 ppm/K. The temperature interval of the CTE plateau is defined as $T_P$. Advantageously, the differential CTE within a temperature interval $T_P$ having a range of at least 40 K may be less than 0±0.015 ppm/K.

A CTE plateau is thus understood to mean a range extending over a section of the CTE-T curve in which the differential CTE does not exceed a value of 0±0.025 ppm/K, preferably 0±0.015 ppm/K, more preferably 0±0.010 ppm/K, further preferably 0±0.005 ppm/K, i.e. a CTE close to 0 ppb/K.

Advantageously, the differential CTE within a temperature interval $T_p$ having a range of at least 40 K is less than 0±0.015 ppm/K, i.e. 0±15 ppb/K. In a preferred embodiment, a CTE plateau of 0±0.01 ppm/K, i.e. 0±10 ppb/K, may be formed over a temperature interval of at least 50 K.

It may be advantageous when the temperature interval $T_p$ is within a range from −10 to +100° C., preferably 0 to 80° C.

The position of the CTE plateau of the glass ceramic is preferably matched to the application temperature $T_A$ of the precision component. Preferred application temperatures $T_A$ are in the range of –60° C. to +100° C., more preferably of –40° C. to +80° C. Particular variants of the present invention relate to precision components and glass ceramics with application temperatures $T_A$ of 0° C., 5° C., 10° C., 22° C., 40° C., 60° C., 80° C. and 100° C. The CTE plateau, i.e. the curve region having the low variance of the differential CTE within the temperature interval $T_p$, may also be within the temperature range of [–10; 100]; [0; 80], [0; 30° C.], [10; 40° C.], [20; 50° C.], [30; 60° C.], [40; 70° C.] and/or [50; 80° C.].

Figure 21:
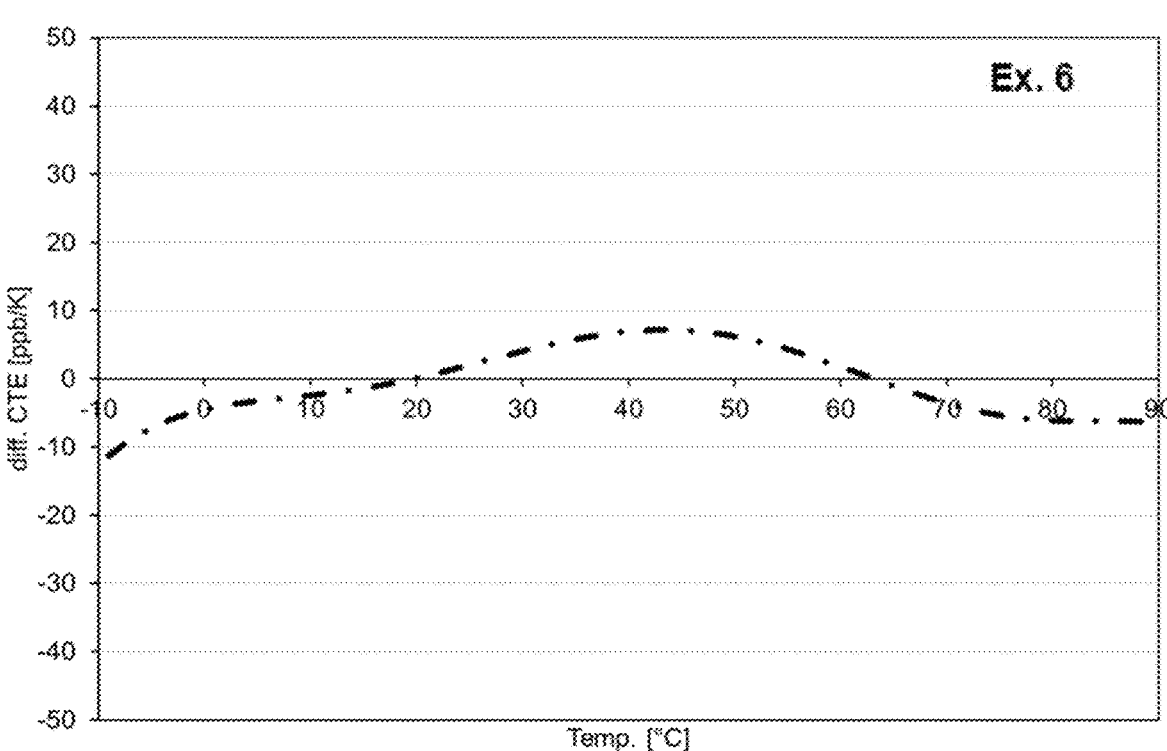
FIGS. 21, 23 and 25 show that the CTE-T curves of glass ceramics according to the invention (compositions according to Ex. 6, Ex. 7 and Ex. 9 in Table 1), which can be used for production of advantageous precision components, advantageously have a CTE "plateau".
Figure 22:
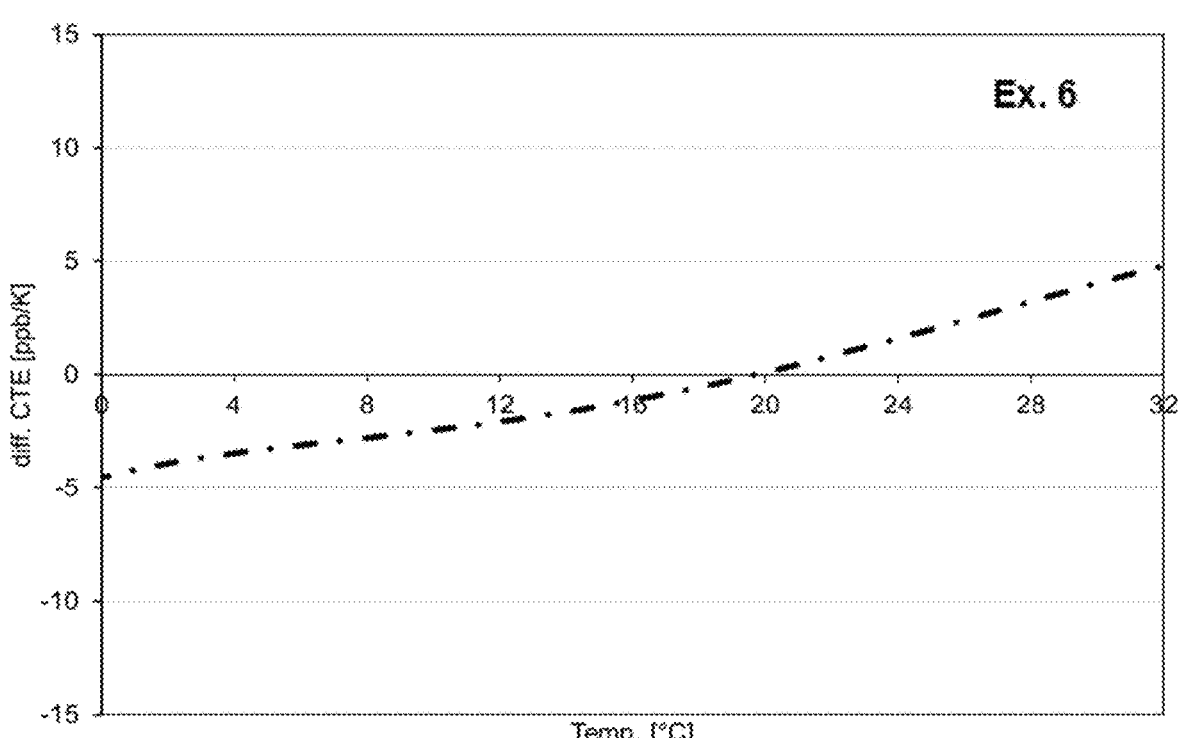
FIGS. 22 and 24 show details from FIGS. 21 and 23.

FIG. 21 shows, with reference to Example 6 from Table 1, that this glass ceramic has a CTE of 0±0.010 ppm/K, i.e. a 10 ppb plateau, over the entirety of the temperature range from –10° C. to 90° C. shown. On detailed assessment of a section of this curve (see FIG. 22), it is apparent that the glass ceramic has a CTE of 0±0.005 ppm/K within temperature range from –5° C. to 32° C. This glass ceramic meets the demands on the average CTE (19; 25) that are specified in standard SEMI P37-1109 for EUVL substrates and blanks.

Figures 23, 24:
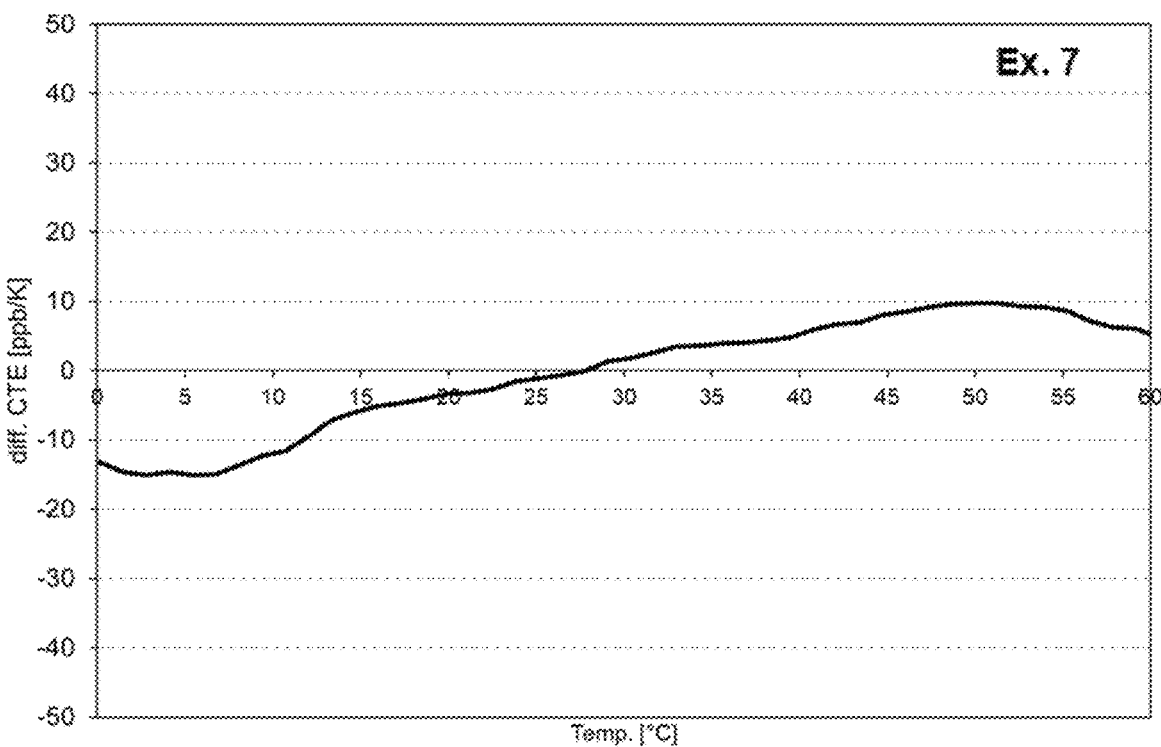

FIG. 23 shows, for Example 7 from Table 1, that has been ceramized at temperatures of not more than 825° C. for 3 days, that the glass ceramic, starting from 12° C., has a CTE of 0±0.010 ppm/K, i.e. a 10 ppb plateau, the width of which is >40 K. As apparent in FIG. 24, the example in the range between 16° C. and 40° C. actually has a CTE of 0±0.005 ppm/K and hence meets the demands on the average CTE (19; 25) that are specified in standard SEMI P37-1109 for EUVL substrates and blanks.

Figure 25:
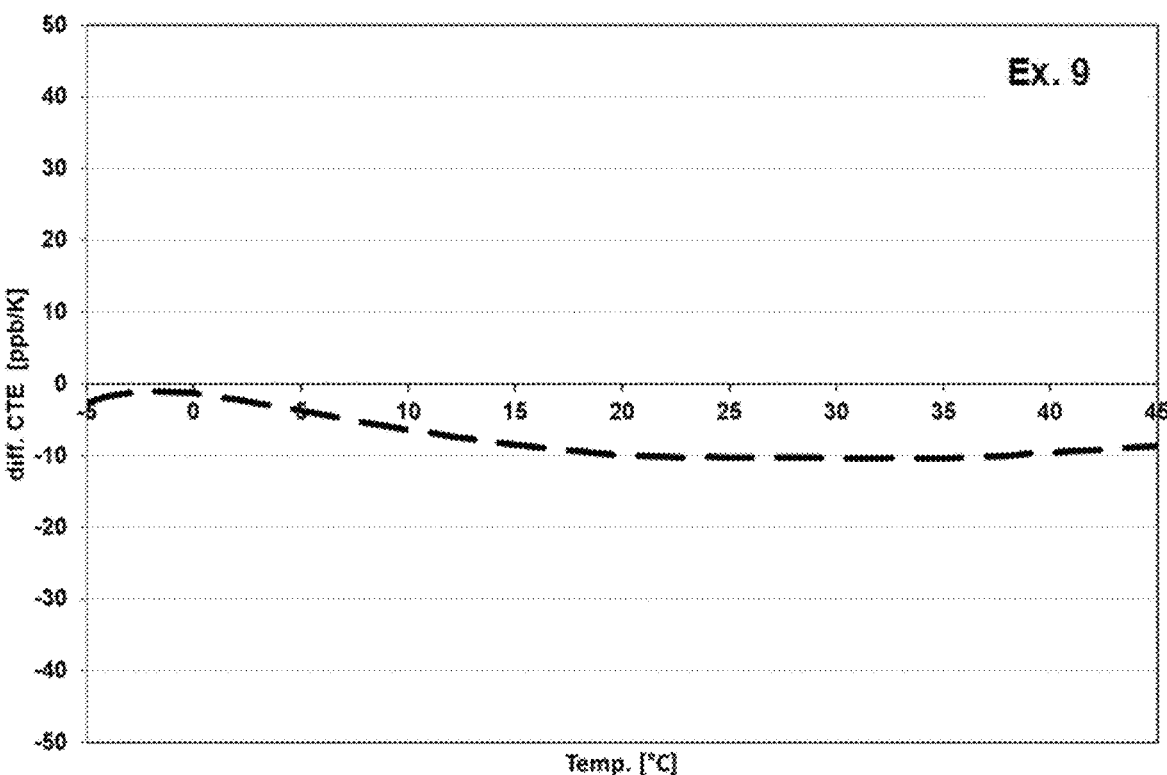

FIG. 25 shows, for Example 9 from Table 1, that has been ceramized at temperatures of not more than 830° C. for 3 days, that the glass ceramic within the range between –5° C. and 45° C. shown, has a CTE of 0±0.010 ppm/K, i.e. a 10 ppb plateau.

In an advantageous embodiment of the invention, the CTE-T curve of the glass ceramic or precision component within a temperature interval having at least a width of 30 K, preferably at least a width of 40 K, more preferably at least a width of 50 K, has at least one curve-section with low slope, especially a slope of at most 0±2.5 ppb/$K^2$, advantageously of at most 0±2 ppb/$K^2$, advantageously of at most 0±1.5 ppb/$K^2$, preferably of at most 0±1 ppb/$K^2$, preferably of at most 0±0.8 ppb/$K^2$, and in specific variants even of at most 0±0.5 ppb/$K^2$.

The temperature interval with low slope is preferably matched to the application temperature $T_A$ of the precision component. Preferred application temperatures $T_A$ are in the range of –60° C. to +100° C., more preferably from –40° C. to +80° C. Particular variants of the present invention relate to glass ceramics and precision components for application temperatures $T_{A\ of}$ 0° C., 5° C., 10° C., 22° C., 40° C., 60° C., 80° C. and 100° C. The temperature interval with low slope may also be within the temperature range of [–10; 100]; [0; 80], [0; 30° C.], [10; 40° C.], [20; 50° C.], [30; 60° C.], [40; 70° C.] and/or [50; 80° C.].

Figure 26:
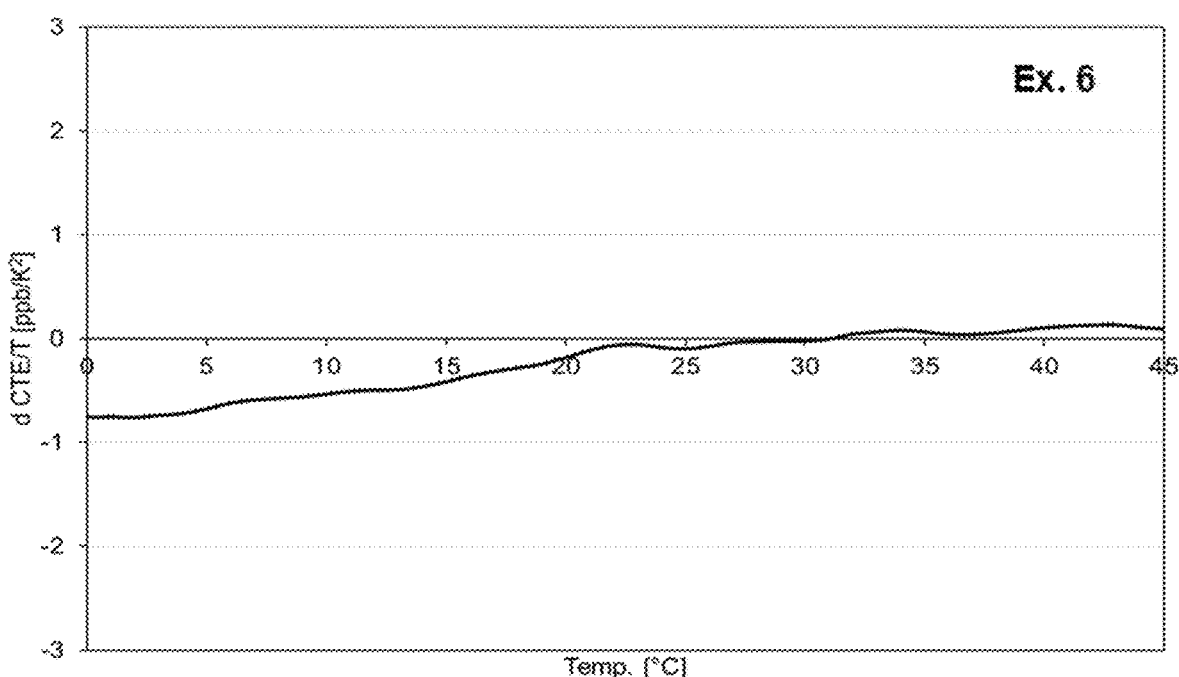
FIGS. 26 and 27 show slopes of CTE-T curves for glass ceramics having compositions according to Ex. 6 and Ex. 7 in Table 1.

FIG. 26 shows the slope of a CTE-T curve within the temperature range from 0° C. to 45° C. for an advantageous glass ceramic or precision component using the composition of Example 6 from Table 1. The CTE slope over the entire temperature range is below 0±1 ppb/$K^2$, and in an interval ranging over at least 30 K (from about 12° C.) even below 0±0.5 ppb/$K^2$.

Figure 27:
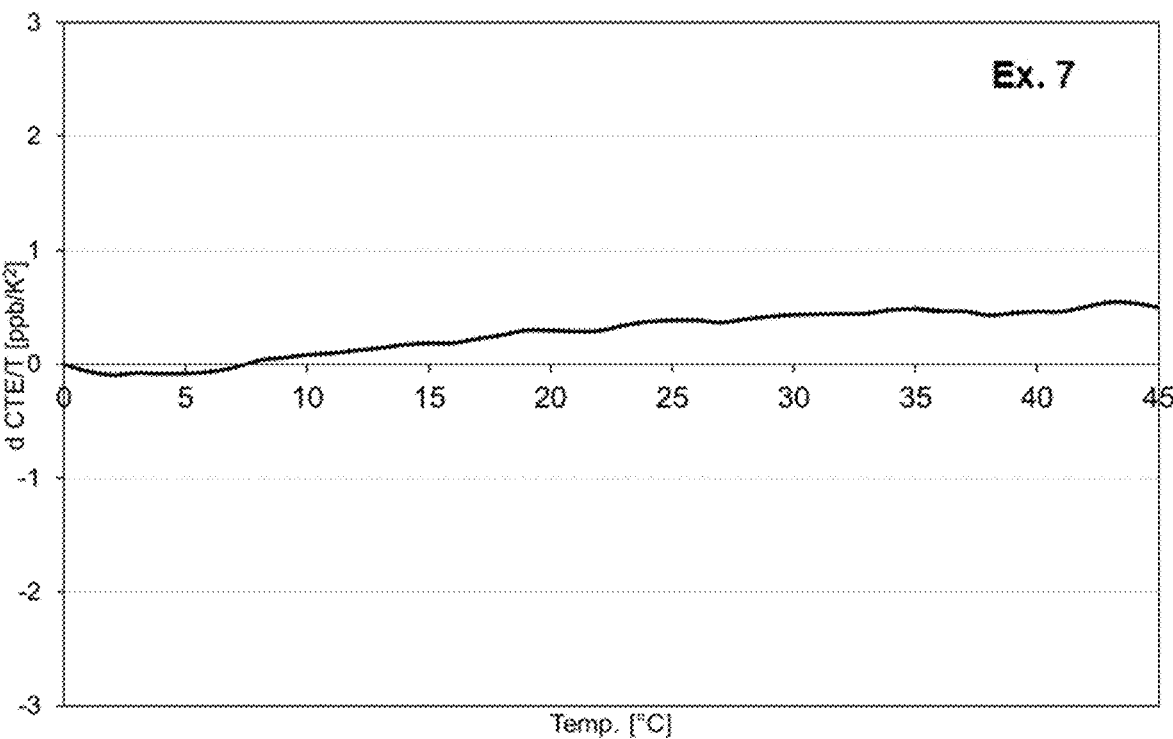

In FIG. 27, it is apparent that the CTE slope of an advantageous glass ceramic and precision component corresponding to Example 7 from Table 1 over the entire temperature range from 0° C. to 45° C. with a width of at least 45 K is below 0±1.0 ppb/$K^2$, and in an interval ranging over at least 40 K (in the range shown between 0 and 42° C.) even below 0±0.5 ppb/$K_2$.

Glass ceramics and precision components having such expansion characteristics are of particularly good suitability for EUV lithography applications (for example as mirror or substrates for mirrors or masks or mask blanks), since the demands on the materials and precision components used for the optical components in this sector are becoming ever higher with regard to extremely low thermal expansion, a zero crossing of the CTE-T curve close to the application temperature and, in particular, on a low slope of the CTE-T curve. In the context of the invention, advantageous embodiments of a glass ceramic or precision component have a very flat CTE progression, with the progression showing both a zero crossing and a very low CTE slope, and possibly a very flat plateau.

The feature of low slope may exist with or without formation of an advantageous CTE plateau.

Figure 28:
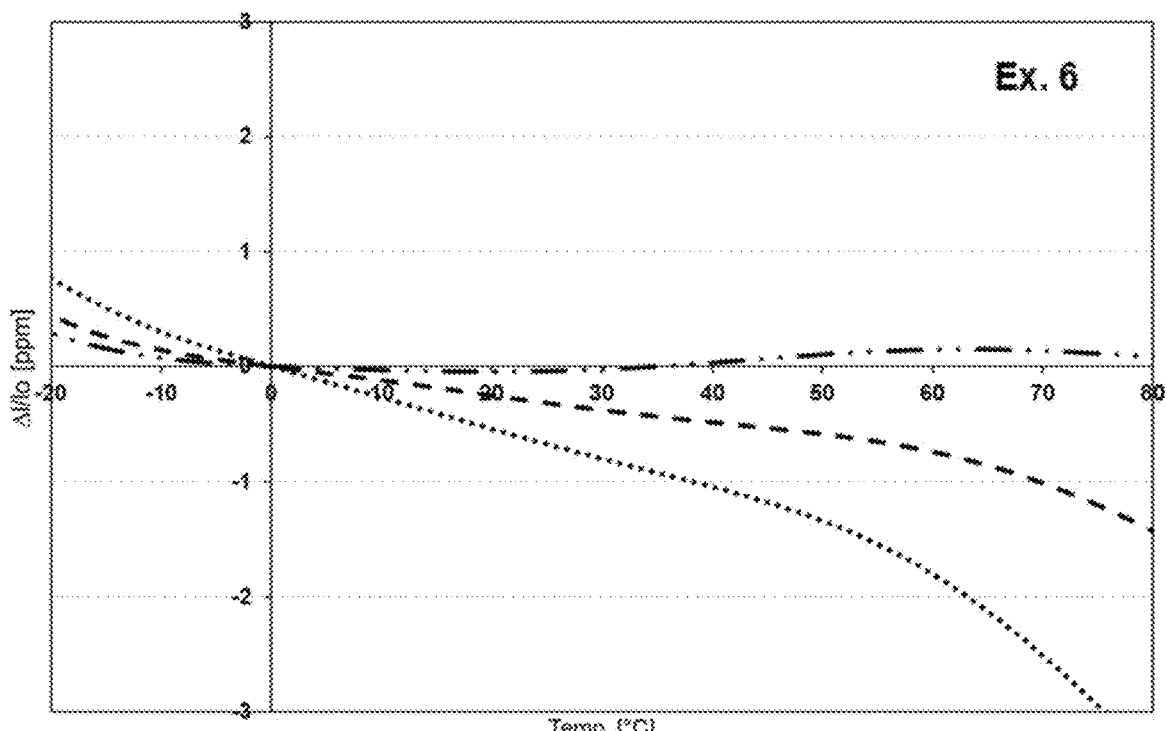
FIGS. 28 and 29 show different expansion curves for glass ceramics of the invention having compositions according to Ex. 6 and Ex. 7 in Table 1, established by different ceramization parameters.
Figure 29:
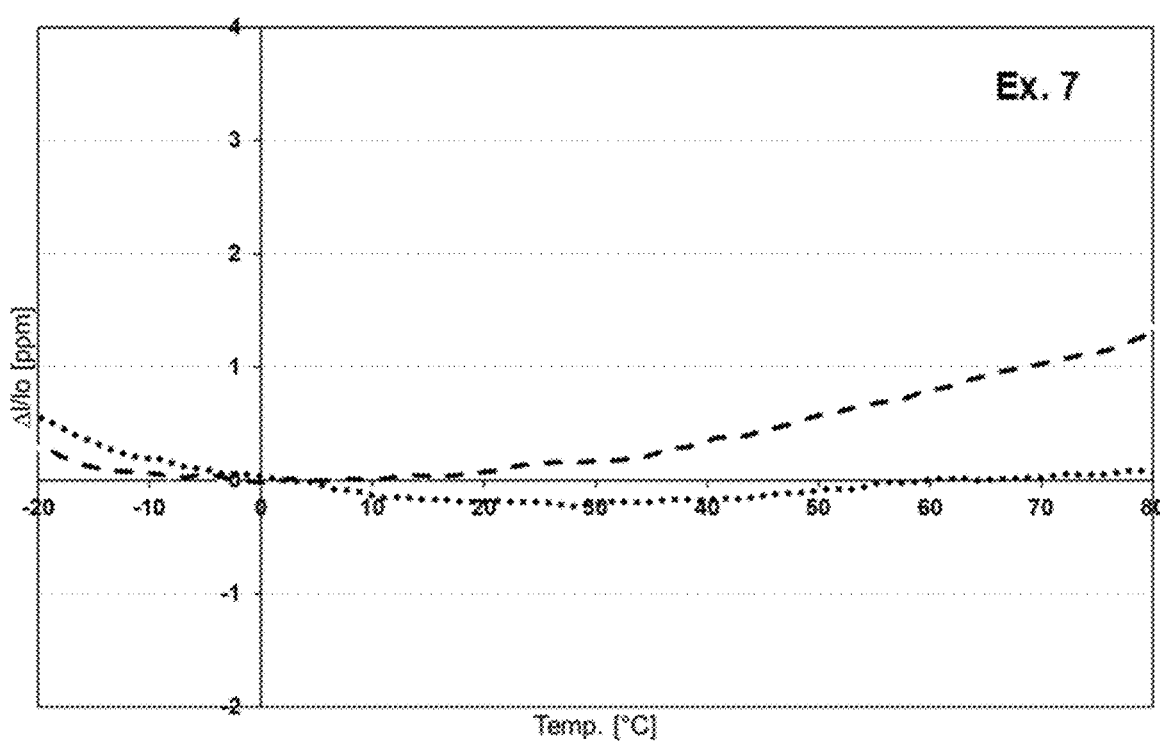

FIGS. 28 and 29 show how variation of ceramization temperature and/or ceramization time can be used to adjust the expansion curve to different application temperatures.

FIG. 28 shows, with reference to Example 6, that the resulting expansion curves of the glass ceramic can be influenced in a controlled manner via the choice of the maximum ceramization temperature with which the initial green glass is treated. The dotted curve shows the expansion curve of a glass ceramic, the parent green glass of which has been ceramized at not more than 810° C. for 2.5 days, while the dashed and dotted curve shows the expansion curve of a glass ceramic, the parent green glass of which has been ceramized at not more than 820° C. for 2.5 days. FIG. 28 also shows by way of example that the glass ceramics of the invention are post-ceramizable, which means that controlled fine adjustment of the expansion curve of the glass ceramic is possible by subjecting already ceramized material to a further thermal treatment. In this case, material of the glass ceramic that had been ceramized at not more than 810° C. for 2.5 days was post-ceramized again at 810° C. for 1.25 days, i.e. with shortened hold time. The effect of this post-ceramization is shown in the form of the dashed expansion curve. Comparison of the expansion curves shows that the expansion curves and hence the average CTE (0; 50) are different before and after the post-ceramization. However, XRD analyses of the samples before and after the post-ceramization, within the scope of measurement accuracy, each show the same results in relation to average crystal size and crystal phase content.

FIG. 29 shows, for Example 7, the adjustability of the expansion curve via different maximum ceramization temperatures in the ceramization of the same initial green glass. Shown as a dashed line: ceramization at not more than 830° C. for 3 days; shown as a dotted line: ceramization at not more than 825° C. for 3 days.

As an alternative to an increase in the ceramization temperature, it is also possible to correspondingly prolong the ceramization time.

Advantageous glass ceramics and precision components also have good internal quality. They preferably have at most 5 inclusions per 100 $cm^3$, more preferably at most 3 inclusions per 100 $cm^3$, most preferably at most 1 inclusion per 100 $cm^3$. Inclusions are understood in accordance with the invention to mean both bubbles and crystallites having a diameter of more than 0.3 mm.

In one variant of the invention, precision components having a diameter or edge length of at most 800 mm and a thickness of at most 100 mm and having at most 5, preferably at most 3, more preferably at most 1, inclusion(s) for each 100 cm$^3$ with a diameter of a size of more than 0.03 mm are provided.

As well as the number of inclusions, the maximum diameter of the inclusions detected also serves as a measure of the level of internal quality. The maximum diameter of individual inclusions in the total volume of a precision component having a diameter of less than 500 mm is preferably at most 0.6 mm, and in the critical volume for the application, for example close to the surface, preferably at most 0.4 mm. The maximum diameter of individual inclusions in glass ceramic components having a diameter of 500 mm to less than 2 m is preferably at most 3 mm, and in the critical volume for the application, for example close to the surface, preferably at most 1 mm.

The invention further relates to the use of a glass ceramic according to the invention in a precision component. The glass ceramic may, for example, form a substrate for the precision component.

The invention further relates to the use of an LAS glass ceramic according to the invention in a precision component, especially for use in metrology, spectroscopy, measurement technology, lithography, astronomy or observation of the Earth from space, for example as mirror or mirror substrate for segmented or monolithic astronomical telescopes or else as lightweight or ultralight mirror substrates, for example for space-based telescopes or as high-precision structure components for measurement of distance, for example in space, or optics for observation of the Earth, as precision components, such as standards for precision measurement technology, precision measurement scales, reference plates in interferometers, as mechanical precision parts, for example for ring laser gyroscopes, spiral springs for the clock industry, for example as mirrors and prisms in LCD lithography, and, for example, as mask holders, wafer stages, reference plates, reference frames and grid plates in microlithography and in EUV (extreme UV) microlithography, and additionally as mirrors or mirror substrates and/or photomask substrates or photomask blanks or reticle mask blanks in EUV microlithography.

A glass ceramic according to the invention can be used to produce precision components of different sizes:

One embodiment relates to precision components having relatively low dimensions, especially in the case of (rect) angular shapes having a length (with and/or depth) or in the case of round areas having diameters of at least 100 mm and/or not more than 1500 mm and/or a thickness of less than 50 mm, preferably less than 10 mm and/or at least 1 mm, more preferably at least 2 mm. Such precision components can be employed, for example, in microlithography and EUV lithography.

Another embodiment relates to precision components having very small dimensions, especially having edge lengths (with and/or depth) or diameters and/or thickness of a few mm (for example at most 20 mm or at most 10 mm or at most 5 mm or at most 2 mm or at most 1 mm) to a few tenths of a mm (for example at most 0.7 mm or at most 0.5 mm). These precision elements may, for example, be a spacer, for example in an interferometer, or a component for ultrastable clocks in quantum technology.

It is alternatively possible to produce very large precision components. One embodiment of the invention thus relates to components of larger volume. In the context of this application, this shall be understood to mean a component having a mass of at least 300 kg, preferably at least 400 kg, preferably at least 500 kg, preferably at least 1 t, more preferably at least 2 t, and in one variant of the invention at least 5 t, or having edge lengths (with and/or depth) in the case of (rect)angular shapes of at least 0.5 m, more preferably at least 1 m, and a thickness (height) of at least 50 mm, preferably at least 100 mm, or in the case of round shapes having a diameter of at least 0.5 m, more preferably at least 1 m, more preferably at least 1.5 m, and/or having a thickness (height) of at least 50 mm, preferably at least 100 mm. In specific embodiments of the invention, the components may be even larger with, for example, a diameter of at least 3 m or at least 4 m or larger. In one variant, the invention also relates to rectangular components, with at least one surface preferably having an area of at least 1 m$^2$, preferably at least 1.2 m$^2$, more preferably at least 1.4 m$^2$. In general, large-volume components having a distinctly greater base area than height are produced. However, components may also be large-volume components having a shape approximating to a cube or sphere.

Precision components may, for example, be optical components, specifically what is called a normal-incidence mirror, i.e. a mirror which is operated close to the perpendicular angle of incidence, or what is called a grazing-incidence mirror, i.e. a mirror which is operated at a grazing angle of incidence. Such a mirror comprises, as well as the substrate, a coating that reflects the instant radiation. Especially in the case of a mirror or x-radiation, the reflective coating is, for example, a multilayer system having a multitude of layers having high reflectivity in the x-ray range in the case of non-grazing incidence. Preferably, such a multilayer system of a normal-incidence mirror comprises 40 to 200 pairs of layers, consisting of alternating layers, for example of one of the material pairs Mo/Si, Mo/Bi, Ru/Si and/or MoRu/Be.

In particular, the optical elements according to the invention may be x-ray-optical elements, i.e. optical elements that are used in conjunction with x-radiation, especially soft x-radiation or EUV radiation, especially reticle masks or photomasks operated in reflection, especially for EUV microlithography. These may advantageously be mask blanks. Further advantageously, the precision component is usable as a mirror for EUV lithography or as a substrate for a mirror for EUV lithography.

In addition, the precision component of the invention may be a component, especially a mirror, for astronomy applications. Such components for use in astronomy may be used either terrestrially or in space. High-precision structure components for measurement of distance, for example in space, are a further advantageous field of use.

The precision component of the invention may be a lightweight structure. The component of the invention may also comprise a lightweight structure. This means that, in some regions of the component, cavities are provided for lightening the weight. The weight of a component is preferably reduced by lightweight processing by at least 80%, more preferably at least 90%, compared to the unprocessed component.

The invention further provides a precision component comprising an LAS glass ceramic according to the invention. Details in this regard have already been described above in connection with the glass ceramic and use thereof in precision components. This disclosure is fully incorporated into the description of the precision component.

It will be apparent that the features of the invention mentioned above and still to be elucidated hereinafter are usable not just in the particular combination specified but also in other combinations without leaving the scope of the invention.

EXAMPLES

Tables 1 and 2 show compositions of examples of glass ceramics according to the invention and compositions of comparative examples, and the properties thereof.

The compositions given in Table 1 were melted from commercial raw materials, such as oxides, carbonates and nitrates in customary production processes, using different refining agents or refining agent combinations. In the context of the invention, $As_2O_3$ as refining agent was distinctly reduced, or refining agents without $As_2O_3$ were used. In Example 7, refined with $SnO_2$ and sulfate, 0.19 mol % of $SO_3$ was added to the synthesis as $Na_2SO_4$, corresponding to an equivalent of 0.22 mol % of $SO_4^{2-}$. In the x-ray fluorescence analysis of the green glass or of the glass ceramic, the $SO_3$ content was below the detection limit of <0.02% by weight. The green glasses produced according to Table 1 were first ceramized at the particular maximum temperature specified over the time specified. For Examples 6 and 7, samples that were ceramized with different ceramization parameters (especially different maximum temperatures) were also created, as already described in connection with the FIGURES.

The production of a glass ceramic for a precision component, especially a large precision component, is described, for example, in WO 2015/124710 A1.

Table 1 shows 15 examples (Ex.) of the invention which are hysteresis-free at least within a temperature range of 10° C. to 35° C. and have zero expansion. Examples 1, 8 and 13 show incipient thermal hysteresis only from about 5° C., Examples 2 and 9 only from about −5° C. Examples 3, 5, 6 and 7 are hysteresis-free over the entire temperature range from −5° C. to 45° C. Moreover, the index F is <1.2, i.e. the progression of the expansion curve within the temperature range of 0° C. to 50° C., is advantageously flat for all examples. In addition, the examples have a processing temperature of 1330° C., such that the glass ceramics can be produced with high homogeneity in industrial scale production plants. The processing temperatures as reported in Tables 1 and 2 were ascertained according to DIN ISO 7884-1 (2014—source: Schott Techn. Glas-Katalog).

In the case of Example 7, after ceramization at not more than 810° C. over a period of 2.5 days, the average CTE was determined for further temperature intervals with the following result: CTE (20; 300° C.): +0.13 ppm/K, CTE (20; 500° C.): +0.34 ppm/K, CTE (20; 700° C.): +0.59 ppm/K.

For Examples 6 and 7, the average CTE was determined for the temperature range of 19° C. to 25° C., with Example 6 having a CTE (19; 25) of 0.77 ppb/K and Example 7 having a CTE (19; 25) of 0.37 ppb/K.

Example 10 was refined with $SnO_2$. In addition, nitrate was present as oxidizing agent, and the BaO and $Na_2O$ components were each used as nitrate raw materials in order to make the melt oxidizing.

Example 15 was refined with $SnO_2$. $SnO_2$ serves simultaneously as nucleating agent. A further nucleating agent was $ZrO_2$.

Table 2 shows comparative examples (Comp. Ex.). Comparative Examples 1, 2, 5 and 6 include neither MgO nor ZnO, but the average CTE(0; 50) is greater than 0±0.1× $10^{-6}$/K, i.e. these comparative examples do not have zero expansion. In addition, Comparative Examples 1 and 2 have a processing temperature of >1330° C. These materials are very viscous, and so it is not possible to use these to manufacture components having high homogeneity in industrial scale production plants.

Comparative Examples 7 to 16 all contain MgO and/or ZnO, and most of them have zero expansion. However, these comparative examples, at least within the temperature range of 10° C. to 35° C., show thermal hysteresis of significantly more than 0.1 ppm. At room temperature, i.e. 22° C., this group of comparative examples has thermal hysteresis apart from Comparative Examples 14 and 16. Comparative Example 9, even though it has zero expansion, also has a disadvantageously steep progression of the expansion curve in the temperature range of 0° C. to 50° C., which is apparent from the high value of the index F.

Empty fields in the tables below in the FIGURES for the composition mean that this/these component(s) was/were not added deliberately or is/are not present.

Table 3 shows, for some advantageous examples of the invention and one comparative example, the alternative index $f_g$ calculated for different temperature intervals, from which it is apparent that the expansion curves of the examples within the temperature ranges defined each have a flatter progression than the comparative example.

It will be clear to a person skilled in the art that—depending on the application temperature of the glass ceramic or precision component comprising the glass ceramic—a glass ceramic having the desired properties, especially with regard to thermal hysteresis and/or average CTE, is being chosen.

TABLE 1

| | | | | | | | |
|---|---|---|---|---|---|---|---|
| Compositions, ceramization and properties (mol %) | | | | | | | |
| | Example No. (Ex.) | | | | | | |
| | 1 | 2 | 3 | 4 | 5 | 6 | 7 |
| $Li_2O$ | 8.9 | 8.35 | 8.9 | 8.6 | 9.1 | 9.15 | 9.1 |
| $Na_2O$ | | 1.1 | 0.45 | 0.7 | 0.6 | 0.6 | 0.65 |
| $K_2O$ | | | 1.0 | 1.65 | 0.9 | 0.85 | 0.9 |
| MgO | | | | | | | |
| ZnO | | | | | 0.21 | | |
| CaO | 2.5 | 1.1 | 1.25 | | 0.9 | 0.9 | 1.05 |
| BaO | | 0.85 | 1.05 | | 0.5 | 0.5 | 0.55 |
| SrO | 0.6 | 0.8 | | | | | |
| $Al_2O_3$ | 17.2 | 17.4 | 16.95 | 16.35 | 18.1 | 18.1 | 18.05 |
| $SiO_2$ | 64.35 | 66.15 | 67.2 | 67.95 | 63.8 | 63.8 | 63.7 |
| $P_2O_5$ | 2.9 | 0.8 | | 1.5 | 2.65 | 2.65 | 2.7 |

TABLE 1-continued

| Compositions, ceramization and properties (mol %) | | | | | | |
|---|---|---|---|---|---|---|
| TiO$_2$ | 2.1 | 2.0 | 2.0 | 2.05 | 2.05 | 2.0 | 2.05 |
| ZrO$_2$ | 1.05 | 1.0 | 1.0 | 1.0 | 1.0 | 1.05 | 1.05 |
| SnO$_2$ | 0.2 | | | | | 0.2 | 0.2 |
| Cl | | 0.2 | | | | | |
| Sb$_2$O$_3$ | 0.2 | 0.25 | 0.2 | 0.2 | 0.2 | 0.2 | |
| As$_2$O$_3$ | | | | | | | |
| Sum | 100.0 | 100.0 | 100.0 | 100.0 | 100.0 | 100.0 | 100.0 |
| SiO$_2$ + (5xLi$_2$O) | 108.85 | 107.90 | 111.70 | 110.95 | 109.30 | 109.55 | 109.20 |
| MgO + ZnO | | | | | 0.21 | | |
| ΣR$_2$O (R = Na, K, Cs, Rb) | | 1.1 | 1.45 | 2.35 | 1.5 | 1.45 | 1.55 |
| ΣRO (R = Ca, Ba, Sr) | 3.1 | 2.75 | 2.30 | | 1.4 | 1.4 | 1.60 |
| Va [° C.] | 1258 | | | 1312 | | | |
| Ceram. temperature [° C.] | 800 | 790 | 815 | 800 | 820 | 820 | 825 |
| Ceram. time [days] | 2.5 | 2.5 | 2.5 | 2.5 | 2.5 | 2.5 | 3 |
| Cryst. phase [% by vol.] | 64 | 52 | 53 | 52 | 57 | 58 | 58 |
| Cryst. size [nm] | 45 | 47 | 46 | 45 | 47 | 49 | 49 |
| Av. CTE(0; +50° C.) [ppm/K] | −0.08 | 0.02 | 0.10 | 0.07 | −0.04 | 0.00 | −0.002 |
| TCL (0; +50° C.) | 3.88 | 1.18 | 4.14 | 3.54 | 2.19 | 0.1 | 0.08 |
| |Expansion at 50° C.| | 3.78 | 1.18 | 4.14 | 3.54 | 2.19 | 0.1 | 0.08 |
| Index F | 1.03 | 1.00 | 1.00 | 1.00 | 1.00 | 1.00 | 1.00 |
| Hyst @ 45° C. [ppm] | <0.1 | <0.1 | <0.1 | <0.1 | <0.1 | <0.1 | <0.1 |
| Hyst @ 35° C. [ppm] | <0.1 | <0.1 | <0.1 | <0.1 | <0.1 | <0.1 | <0.1 |
| Hyst @ 30° C. [ppm] | <0.1 | <0.1 | <0.1 | <0.1 | <0.1 | <0.1 | <0.1 |
| Hyst @ 22° C. [ppm] | <0.1 | <0.1 | <0.1 | <0.1 | <0.1 | <0.1 | <0.1 |
| Hyst @ 10° C. [ppm] | <0.1 | <0.1 | <0.1 | <0.1 | <0.1 | <0.1 | <0.1 |
| Hyst @ +5° C. [ppm] | 0.12 | <0.1 | <0.1 | <0.1 | <0.1 | <0.1 | <0.1 |
| Hyst @ 0° C. [ppm] | 0.2 | <0.1 | <0.1 | | <0.1 | <0.1 | <0.1 |
| Hyst @ −5° C. [ppm] | 0.3 | 0.15 | <0.1 | | <0.1 | <0.1 | <0.1 |
| Ceram. temperature [° C.] | 800 | 780 | 830 | 800 | 820 | 820 | 830 |
| Ceram. time [days] | 2.5 | 2.5 | 2.5 | 2.5 | 2.5 | 2.5 | 2.5 |
| Av. CTE (−30; +70° C.) [ppm/K] | −0.08 | −0.05 | 0.08 | 0.05 | −0.06 | −0.01 | −0.04 |
| Av. CTE (−40; +80° C.) [ppm/K] | −0.10 | −0.05 | 0.08 | n.d. | −0.07 | −0.02 | −0.05 |

| | Example No. (Ex.) | | | | | | |
|---|---|---|---|---|---|---|---|
| | 8 | 9 | 10 | 11 | 12 | 13 | 14 |
| Li$_2$O | 9.2 | 8.95 | 8.85 | 8.9 | 8.1 | 9.35 | 9.2 |
| Na$_2$O | | 0.6 | 0.4 | 0.55 | 0.4 | 0.7 | 0.45 |
| K$_2$O | | 0.8 | 0.9 | 0.8 | 1.0 | 0.25 | 0.6 |
| MgO | | 0.17 | | 0.35 | | | |
| ZnO | | 0.13 | | 0.15 | | | |
| CaO | 2.5 | 1.0 | 1.3 | 0.9 | 2.3 | 1.25 | 0.8 |
| BaO | | 0.5 | 0.85 | 0.45 | | 1.1 | 0.8 |
| SrO | 0.7 | | | | | | |
| Al$_2$O$_3$ | 18.7 | 18.1 | 18.05 | 17.9 | 15.5 | 16.8 | 16.8 |
| SiO$_2$ | 62.45 | 63.7 | 62.3 | 63.8 | 68.1 | 64.45 | 67.3 |
| P$_2$O$_5$ | 3.1 | 2.8 | 4.0 | 2.9 | 1.5 | 3.3 | |
| TiO$_2$ | 2.0 | 2.0 | 2.0 | 2.0 | 1.9 | | 3.85 |
| ZrO$_2$ | 1.05 | 1.05 | 1.05 | 1.05 | 1.0 | 2.55 | |
| SnO$_2$ | 0.2 | 0.2 | 0.3 | | | | |
| Cl | 0.1 | | | | | | |
| Sb$_2$O$_3$ | | | | 0.25 | 0.2 | 0.25 | 0.2 |
| As$_2$O$_3$ | | 0.025 | | | | | |
| Sum | 100.0 | 100.0 | 100.0 | 100.0 | 100.0 | 100.0 | 100.0 |
| SiO$_2$ + (5xLi$_2$O) | 108.45 | 108.45 | 106.55 | 108.30 | 108.60 | 111.20 | 113.30 |
| MgO + ZnO | | 0.30 | | 0.50 | | | |
| ΣR$_2$O (R = Na, K, Cs, Rb) | | 1.4 | 1.3 | 1.35 | 1.4 | 0.95 | 1.05 |
| ΣRO (R = Ca, Ba, Sr) | 3.2 | 1.5 | 2.15 | 1.35 | 2.3 | 2.35 | 1.6 |
| Va [° C.] | | | | | | | |
| Ceram. temperature [° C.] | 830 | 830 | 800 | 830 | 780 | 800 | 815 |
| Ceram. time [days] | 3.75 | 2.5 | 2.5 | 2.5 | 2.5 | 2.5 | 2.5 |
| Cryst. phase [% by vol.] | 67 | 57 | 57 | 60 | 52 | | 64 |
| Cryst. size [nm] | 39 | 50 | 51 | 49 | 33 | | 33 |
| Av. CTE(0; +50° C.) [ppm/K] | 0.04 | −0.008 | 0.05 | 0.06 | 0.06 | 0.02 | −0.09 |
| TCL (0; +50° C.) | 4.64 | 0.4 | 2.61 | 3.2 | 3.19 | 1.02 | 4.55 |
| |Expansion at 50° C.| | 4.16 | 0.4 | 2.61 | 3.2 | 3.19 | 1.02 | 4.55 |
| Index F | 1.12 | 1.00 | 1.00 | 1.00 | 1.00 | 1.00 | 1.00 |
| Hyst @ 45° C. [ppm] | <0.1 | <0.1 | <0.1 | <0.1 | <0.1 | <0.1 | <0.1 |
| Hyst @ 35° C. [ppm] | <0.1 | <0.1 | <0.1 | <0.1 | <0.1 | <0.1 | <0.1 |
| Hyst @ 30° C. [ppm] | <0.1 | <0.1 | <0.1 | <0.1 | <0.1 | <0.1 | <0.1 |
| Hyst @ 22° C. [ppm] | <0.1 | <0.1 | <0.1 | <0.1 | <0.1 | <0.1 | <0.1 |
| Hyst @ 10° C. [ppm] | <0.1 | <0.1 | <0.1 | <0.1 | <0.1 | <0.1 | <0.1 |
| Hyst @ +5° C. [ppm] | 0.16 | <0.1 | <0.1 | <0.1 | <0.1 | 0.13 | <0.1 |
| Hyst @ 0° C. [ppm] | 0.26 | <0.1 | <0.1 | 0.14 | 0.1 | 0.22 | |
| Hyst @ −5° C. [ppm] | 0.4 | 0.11 | 0.11 | 0.205 | 0.17 | 0.27 | |

TABLE 1-continued

Compositions, ceramization and properties (mol %)

| | | | | | | |
|---|---|---|---|---|---|---|
| Ceram. temperature [° C.] | 830 | 830 | 830 | 830 | 780 | 815 |
| Ceram. time [days] | 3.75 | 2.5 | 2.5 | 2.5 | 2.5 | 2.5 |
| Av. CTE (−30; +70° C.) [ppm/K] | 0.18 | 0.01 | 0.05 | 0.05 | 0.05 | −0.03 |
| Av. CTE (−40; +80° C.) [ppm/K] | 0.18 | 0.00 | 0.04 | 0.04 | 0.04 | −0.01 |

| | Example No. (Ex.) 15 |
|---|---|
| $Li_2O$ | 9.0 |
| $Na_2O$ | 0.65 |
| $K_2O$ | 0.7 |
| $MgO$ | |
| $ZnO$ | |
| $CaO$ | 1.0 |
| $BaO$ | 1.55 |
| $SrO$ | |
| $Al_2O_3$ | 18.1 |
| $SiO_2$ | 64.65 |
| $P_2O_5$ | 2.15 |
| $TiO_2$ | |
| $ZrO_2$ | 1.6 |
| $SnO_2$ | 0.6 |
| $Cl$ | |
| $Sb_2O_3$ | |
| $As_2O_3$ | |
| Sum | 100.0 |
| $SiO_2 + (5xLi_2O)$ | 109.65 |
| $MgO + ZnO$ | |
| $\Sigma R_2O$ (R = Na, K, Cs, Rb) | 1.35 |
| $\Sigma RO$ (R = Ca, Ba, Sr) | 2.55 |
| Va [° C.] | |
| Ceram. temperature [° C.] | 840 |
| Ceram. time [days] | 2.5 |
| Cryst. phase [% by vol.] | 52 |
| Cryst. size [nm] | 61 |
| Av. CTE(0; +50° C.) [ppm/K] | −0.10 |
| TCL (0; +50° C.) | 5.04 |
| \|Expansion at 50° C.\| | 5.04 |
| Index F | 1.00 |
| Hyst @ 45° C. [ppm] | <0.1 |
| Hyst @ 35° C. [ppm] | <0.1 |
| Hyst @ 30° C. [ppm] | <0.1 |
| Hyst @ 22° C. [ppm] | <0.1 |
| Hyst @ 10° C. [ppm] | <0.1 |
| Hyst @ +5° C. [ppm] | <0.1 |
| Hyst @ 0° C. [ppm] | 0.13 |
| Hyst @ −5° C. [ppm] | 0.18 |
| Ceram. temperature [° C.] | |
| Ceram. time [days] | |
| Av. CTE (−30; +70° C.) [ppm/K] | |
| Av. CTE (−40; +80° C.) [ppm/K] | |

TABLE 2

Compositions, ceramization and properties (mol %)

| | Comparative Example No. (Comp. Ex.) | | | |
|---|---|---|---|---|
| | 1 | 2 | 5 | 6 |
| $Li_2O$ | 8.1 | 9.15 | 9.45 | 9.5 |
| $Na_2O$ | 0.4 | 0.4 | 0.2 | 0.1 |
| $K_2O$ | 0.15 | 0.2 | 0.7 | 0.55 |
| $MgO$ | | | | |
| $ZnO$ | | | | |
| $CaO$ | 4.15 | | 2.2 | 0.4 |
| $BaO$ | | 0.6 | | 1.75 |
| $SrO$ | | | | |
| $Al_2O_3$ | 12.45 | 14.2 | 16.75 | 16.6 |
| $SiO_2$ | 72.3 | 71.7 | 64.15 | 65.55 |
| $P_2O_5$ | | 0.62 | 3.3 | 2.2 |
| $TiO_2$ | 1.3 | 1.75 | 2.05 | 2.1 |

TABLE 2-continued

| Compositions, ceramization and properties (mol %) | | | | |
|---|---|---|---|---|
| ZrO₂ | 1.0 | 1.2 | 1.0 | 1.05 |
| As₂O₃ | 0.15 | 0.15 | 0.2 | 0.2 |
| | | | | |
| Sum | 100.0 | 100.0 | 100.0 | 100.0 |
| SiO₂ + (5xLi₂O) | | | | |
| MgO + ZnO | | | | |
| ΣR₂O (R = Na, K, Cs, Rb) | 0.55 | 0.6 | 0.9 | 0.65 |
| ΣRO (R = Ca, Ba, Sr) | 4.15 | 0.6 | 2.2 | 2.15 |
| Va [° C.] | 1345 | 1340 | | |
| Ceram. temperature [° C.] | 760 | | 800 | 800 |
| Ceram. time [days] | 10 | | 2.5 | 2.5 |
| Cryst. phase [% by vol.] | 60 | | 66 | 58 |
| Cryst. size [nm] | 63 | | 45 | 47 |
| Av.CTE(0; +50° C.) [ppm/K] | −0.25 | | −0.27 | −0.46 |
| TCL (0; +50° C.) | | | | |
| \|Expansion at 50° C.\| | | | | |
| Index F | | | | |
| Hyst @ 45° C. [ppm] | | | | |
| Hyst @ 35° C. [ppm] | | | | |
| Hyst @ 30° C. [ppm] | | | | |
| Hyst @ 22° C. [ppm] | <0.1 | | | |
| Hyst @ 10° C. [ppm] | <0.1 | | | |
| Hyst @ +5° C. [ppm] | <0.1 | | | |
| Hyst @ 0° C. [ppm] | 0.13 | | | |
| Hyst @ −5° C. [ppm] | 0.24 | | | |
| Ceram. temperature [° C.] | | | | |
| Ceram. time [days] | | | | |
| Av. CTE (−30; +70° C.) [ppm/K] | | | | |
| Av. CTE (−40; +80° C.) [ppm/K] | | | | |

| | Comparative Example No. (Comp. Ex.) | | | | | |
|---|---|---|---|---|---|---|
| | 7 | 8 | 9 | 10 | 11 | 12 |
| Li₂O | 8.5 | 7.78 | 9.32 | 9.2 | 9.4 | 9.0 |
| Na₂O | 0.1 | 0.8 | | 0.1 | 0.2 | 0.1 |
| K₂O | 0.5 | | | | | |
| MgO | 1.8 | | 1.2 | 1.6 | 1.2 | 1.6 |
| ZnO | 1.3 | 1.8 | 0.4 | 0.6 | 0.6 | 0.4 |
| CaO | | 2.42 | 1.0 | 1.2 | 1.0 | 1.3 |
| BaO | | 1.07 | 0.36 | 0.4 | 0.3 | 0.5 |
| SrO | | | | | | |
| Ak₂O₃ | 16.9 | 15.39 | 19.11 | 16.2 | 19.0 | 16.4 |
| SiO₂ | 64.3 | 65.42 | 61.4 | 63.3 | 61.4 | 63.9 |
| P₂O₅ | 3.4 | 2.47 | 3.97 | 3.8 | 3.9 | 3.5 |
| TiO₂ | 1.9 | 1.67 | 1.92 | 2.2 | 1.9 | 2.1 |
| ZrO₂ | 1.1 | 0.92 | 1.07 | 1.1 | 1.1 | 1.2 |
| As₂O₃ | 0.2 | 0.26 | 0.25 | 0.2 | 0.2 | 0.1 |
| | | | | | | |
| Sum | 100.0 | 100.0 | 100.0 | 100.0 | 100.0 | 100.1 |
| SiO₂ + (5xLi₂O) | | | | | | |
| MgO + ZnO | 3.1 | 1.8 | 1.6 | 2.2 | 1.8 | 2.0 |
| ΣR₂O (R = Na, K, Cs, Rb) | 0.6 | 0.8 | | 0.1 | 0.2 | 0.1 |
| ΣRO (R = Ca, Ba, Sr) | | 3.49 | 1.36 | 1.6 | 1.3 | 1.8 |
| Va [° C.] | | | | | | |
| Ceram. temperature [° C.] | 810 | | | 760 | 810 | 760 |
| Ceram. time [days] | 10 | | | 10 | 5 | 10 |
| Cryst. phase [% by vol.] | 76 | | | | | |
| Cryst. size [nm] | 72 | | | | | |
| Av. CTE(0; +50° C.) [ppm/K] | 0.03 | 0.02 | 0.002 | −0.15 | 0.03 | −0.05 |
| TCL (0; +50° C.) | | | 1.19 | 3.68 | 1.32 | 0.35 |
| \|Expansion at 50° C.\| | | | 0.11 | 3.68 | 1.28 | 0.35 |
| Index F | | | 10.82 | 1.00 | 1.03 | 1.00 |
| Hyst @ 45° C. [ppm] | 0.11 | <0.1 | <0.1 | <0.1 | <0.1 | <0.1 |
| Hyst @ 35° C. [ppm] | 0.14 | <0.1 | 0.12 | <0.1 | <0.1 | <0.1 |
| Hyst @ 30° C. [ppm] | 0.18 | <0.1 | 0.16 | <0.1 | 0.1 | 0.11 |
| Hyst @ 22° C. [ppm] | 0.27 | 0.14 | 0.24 | 0.14 | 0.16 | 0.17 |
| Hyst @ 10° C. [ppm] | 0.61 | 0.42 | 0.54 | 0.38 | 0.85 | 0.43 |
| Hyst @ +5° C. [ppm] | 0.85 | 0.61 | 0.74 | 0.56 | 0.61 | 0.61 |
| Hyst @ 0° C. [ppm] | 1.1 | 0.81 | 0.92 | 0.76 | 0.85 | 0.82 |
| Hyst @ −5° C. [ppm] | 1.2 | 0.96 | 1.16 | 0.93 | 1.04 | 0.97 |
| Ceram. temperature [° C.] | | | | | | |
| Ceram. time [days] | | | | | | |
| Av. CTE (−30; +70° C.) [ppm/K] | | | | | | |
| Av. CTE (−40; +80° C.) [ppm/K] | | | | | | |

TABLE 2-continued

| Compositions, ceramization and properties (mol %) | | | | |
| --- | --- | --- | --- | --- |
| | Comparative Example No. (Comp. Ex.) | | | |
| | 13 | 14 | 15 | 16 |
| $Li_2O$ | 8.4 | 8.2 | 9.4 | 9.3 |
| $Na_2O$ | 0.05 | 0.35 | 0.1 | 0.25 |
| $K_2O$ | | | 0.6 | 0.25 |
| MgO | | | 1.8 | |
| ZnO | 0.95 | 1.2 | | 0.60 |
| CaO | 2.3 | 2.35 | | 1.0 |
| BaO | | | | 0.85 |
| SrO | | | | |
| $Al_2O_3$ | 16.55 | 16.5 | 17 | 18.95 |
| $SiO_2$ | 65.15 | 64.8 | 64.4 | 61.5 |
| $P_2O_5$ | 3.4 | 3.3 | 3.5 | 4.05 |
| $TiO_2$ | 2.0 | 2.0 | 1.95 | 2.05 |
| $ZrO_2$ | 1.1 | 1.1 | 1.05 | 1.05 |
| $As_2O_3$ | 0.15 | 0.2 | 0.2 | 0.15 |
| Sum | 100.0 | 100.0 | 100.0 | 100.0 |
| $SiO_2 + (5xLi_2O)$ | | | | |
| MgO + ZnO | 0.95 | 1.2 | 1.8 | 0.60 |
| $\Sigma R_2O$ (R = Na, K, Cs, Rb) | 0.05 | 0.35 | 0.7 | 0.50 |
| $\Sigma RO$ (R = Ca, Ba, Sr) | 2.25 | 2.35 | | 1.85 |
| Va [° C.] | | | | |
| Ceram. temperature [° C.] | 770 | 810 | 790 | 830 |
| Ceram. time [days] | 5 | 1 | 5 | 2.5 |
| Cryst. phase [% by vol.] | 73 | 69 | 74 | 66 |
| Cryst. size [nm] | 43 | 47 | 56 | 41 |
| Av. CTE(0; +50° C.) [ppm/K] | −0.03 | −0.08 | −0.06 | 0.07 |
| TCL (0; +50° C.) | | | | 4.29 |
| \|Expansion at 50° C.\| | | | | 3.55 |
| Index F | | | | 1.21 |
| Hyst @ 45° C. [ppm] | <0.1 | <0.1 | <0.1 | <0.1 |
| Hyst @ 35° C. [ppm] | <0.1 | <0.1 | <0.1 | <0.1 |
| Hyst @ 30° C. [ppm] | <0.1 | <0.1 | <0.1 | <0.1 |
| Hyst @ 22° C. [ppm] | 0.13 | <0.1 | 0.16 | <0.1 |
| Hyst @ 10° C. [ppm] | 0.44 | 0.3 | 0.44 | 0.15 |
| Hyst @ +5° C. [ppm] | 0.67 | 0.55 | 0.63 | 0.23 |
| Hyst @ 0° C. [ppm] | 0.97 | 0.84 | 0.85 | 0.35 |
| Hyst @ −5° C. [ppm] | 1.3 | 1.13 | 1.0 | 0.5 |
| Ceram. temperature [° C.] | | | | |
| Ceram. time [days] | | | | |
| Av. CTE (−30; +70° C.) [ppm/K] | | | | |
| Av. CTE (−40; +80° C.) [ppm/K] | | | | |

TABLE 3

| Alternative index $f_{T.i.}$ for selected examples and one comparative example | | | | |
| --- | --- | --- | --- | --- |
| $f_{T.i.}$ [ppm/K] | Ti-dop. $SiO_2$ | Ex. 6 | Ex. 7 | Ex. 9 |
| 20-40° C. | 0.024 | 0.004 | 0.0015 | 0.007 |
| 20-70° C. | 0.039 | 0.0036 | 0.005 | 0.023 |
| −10-30° C. | 0.015 | 0.003 | 0.012 | |

The invention claimed is:

1. LAS glass ceramic having an average coefficient of thermal expansion CTE in the range from 0 to 50° C. of not more than $0\pm0.1\times10^{-6}$/K and thermal hysteresis at least within the temperature range from 10° C. to 35° C. of <0.1 ppm, and a main crystal phase of a high quartz solid solution, and comprising the following components (in mol % based on oxide):

| | |
| --- | --- |
| $SiO_2$ | 60-71 |
| $Li_2O$ | 7-9.4 |
| MgO + ZnO | 0-<0.6 | at least one component selected from the group consisting of $P_2O_5$, $R_2O$, and RO, where $R_2O$ may be $Na_2O$ and/or $K_2O$ and/or $Cs_2O$ and/or $Rb_2O$, and where RO may be CaO and/or BaO and/or SrO, and a nucleating agent in a content of 1.5 to 6 mol %, where the nucleating agent is at least one component selected from the group consisting of $TiO_2$, $ZrO_2$, $Ta_2O_5$, $Nb_2O_5$, $SnO_2$, $MoO_3$, $WO_3$, and $HfO_2$, wherein the LAS glass ceramic contains not more than 0.05 mol % of $As_2O_3$ as a refining agent.

2. LAS glass ceramic according to claim 1, further containing $Al_2O_3$ in a content of 10 to 22 mol % and/or $P_2O_5$ in a content of 0.1 to 6 mol %.

3. LAS glass ceramic according to claim 1, wherein the content of the sum of ZnO+MgO is ≤0.55 mol % and/or the content of MgO is ≤0.35 mol % and/or the content of ZnO is ≤0.5 mol %.

4. LAS glass ceramic according to claim 1, wherein the content of the sum of ZnO+MgO is ≤0.5 mol %.

5. LAS glass ceramic according to claim 1, wherein the content of the sum of RO is ≥0.1 mol % and/or ≤6 mol %.

6. LAS glass ceramic according to claim 1, wherein the content of the sum of $R_2O$ is ≥0.1 mol % and/or ≤6 mol %.

7. LAS glass ceramic according to claim 1, wherein the content of the sum of the nucleating agent is ≥2 mol % and/or ≤5 mol %.

8. LAS glass ceramic according to claim 1, wherein the following condition is applicable: molar content of $SiO_2$+ (5× molar content of $Li_2O$)≥106 and/or wherein the following condition is applicable: molar content of $SiO_2$+(5× molar content of $Li_2O$)≤115.5.

9. LAS glass ceramic according to claim 1, wherein a processing temperature Va is not more than 1330° C.

10. LAS glass ceramic according to claim 1, wherein the high quartz solid solution has an average crystallite size of <100 nm, and/or a crystal phase content is less than 70% by volume.

11. LAS glass ceramic according to claim 1, wherein an index F is <1.2, where F=TCL (0; 50° C.)/|expansion (0; 50° C.)|, wherein the index F is calculated by forming a quotient of TCL (0; 50) [in ppm] and a difference in expansion between temperature points of 0° C. and 50° C. [in ppm];

wherein TCL is a distance between a highest $dl/l_0$ value and a lowest $dl/l_0$ value within the temperature points and TCL (0; 50° C.)=|$dl/l_0$ max.|+|$dl/l_0$ min.|; and where "dl" denotes a change in length at a respective temperature and "$l_0$" a length of a test specimen at 0° C. and the calculation is based in each case on absolute values of the $dl/l_0$ values.

12. LAS glass ceramic according to claim 1, wherein an alternative index $f_{(20; 40)}$ is <0.024 ppm/K and/or an alternative index $f_{(20; 70)}$ is <0.039 ppm/K and/or an alternative index $f_{(-10; 30)}$ is <0.015 ppm/K, wherein an alternative index $f_{T.i.}$ (ppm/K) is defined as $f_{T.i.}$=$TCL_{(T.i.)}$/width of a temperature interval (T.i.), wherein T.i. describes a considered temperature interval in each case;

wherein $TCL_{(T.i.)}$ is a distance between a highest $dl/l_0$ value and a lowest $dl/l_0$ value within a considered temperature range (T.i.) in each case, and wherein an expansion curve for determination of the $TCL_{(T.i.)}$ is normalized by definition such that a change in length is 0 ppm at 0° C.

13. LAS glass ceramic according to claim 1, which has a relative change in length ($dl/l_0$) of ≤|0.10| ppm within the temperature range from 20° C. to 30° C. and/or a relative change in length ($dl/l_0$) of ≤|0.17| ppm within the temperature range from 20° C. to 35° C., where "dl" denotes a change in length at a respective temperature and "10" is a length of a test specimen at 0° C., in each case on absolute values of the $dl/l_0$ values.

14. LAS glass ceramic according to claim 1, which has a relative change in length ($dl/l_0$) of ≤|0.30| ppm within the temperature range from 20° C. to 40° C., wherein "dl" denotes a change in length at a respective temperature and "10" is a length of a test specimen at 0° C., in each case on absolute values of the $dl/l_0$ values.

15. LAS glass ceramic according to claim 1, wherein a CTE-T curve within a temperature interval having a width of at least 30 K has a slope of ≤0±2.5 ppb/$K^2$, wherein CTE-T curve is a graph of a function of a development of a Coefficient of Thermal Expansion (CTE) versus a Temperature T.

16. LAS glass ceramic according to claim 1, having thermal hysteresis of <0.1 ppm at least within the temperature range from 5° C. to 45° C.

17. LAS glass ceramic according to claim 1, containing $As_2O_3$ in a content of 0.04 mol % of being essentially $As_2O_3$ free.

18. LAS glass ceramic according to claim 1, containing, as refining agent, in place of $As_2O_3$ or in addition to not more than 0.05 mol % of $As_2O_3$, at least one alternative redox refining agent and/or at least one evaporating refining agent and/or at least one decomposing refining agent.

19. LAS glass ceramic according to claim 18, wherein the alternative redox refining agent is at least one component selected from the group consisting of $Sb_2O_3$, $SnO_2$, $MnO_2$, $CeO_2$, and $Fe_2O_3$ and/or wherein the evaporating refining agent comprises a halogen with refining action and/or wherein the decomposing refining agent comprises a sulfate component.

20. A precision component, for use in metrology, spectroscopy, measurement technology, lithography, astronomy or observation of the Earth from space comprising the LAS glass ceramic according to claim 1.

21. LAS glass ceramic according to claim 1, wherein the content of fluorine is 0 to 0.5 mol %.

22. LAS glass ceramic according to claim 1, wherein the content of fluorine is 0 to 0.3 mol %.

* * * * *